United States Patent
Sherman

(10) Patent No.: US 11,615,112 B2
(45) Date of Patent: Mar. 28, 2023

(54) INTERACTIVE VISUAL ANALYSIS OF DATASETS USING A SPECIALIZED VIRTUAL MACHINE

(71) Applicant: Tableau Software, Inc., Seattle, WA (US)

(72) Inventor: Scott Sherman, Seattle, WA (US)

(73) Assignee: TABLEAU SOFTWARE, INC., Seattle, WA (US)

( * ) Notice: Subject to any disclaimer, the term of this patent is extended or adjusted under 35 U.S.C. 154(b) by 69 days.

(21) Appl. No.: 17/374,880

(22) Filed: Jul. 13, 2021

(65) Prior Publication Data

US 2022/0004561 A1 Jan. 6, 2022

Related U.S. Application Data

(63) Continuation of application No. 16/726,175, filed on Dec. 23, 2019, now Pat. No. 11,061,923, which is a
(Continued)

(51) Int. Cl.
*G06F 16/26* (2019.01)
*G06T 11/20* (2006.01)
(Continued)

(52) U.S. Cl.
CPC .......... *G06F 16/26* (2019.01); *G06F 9/45558* (2013.01); *G06F 16/212* (2019.01);
(Continued)

(58) Field of Classification Search
None
See application file for complete search history.

(56) References Cited

U.S. PATENT DOCUMENTS 6,701,294 B1 3/2004 Ball et al.
7,720,779 B1 5/2010 Perry et al.
(Continued)

OTHER PUBLICATIONS

Jeffrey Heer and Adam Perer, Orion: A system for modeling transformation and visualization of multidimensional heterogeneous networks, Oct. 17, 2014, Information Visualization, vol. 13, pp. 111-133, (Year: 2014), 23 pgs.
(Continued)

*Primary Examiner* — Robert W Beausoliel, Jr.
*Assistant Examiner* — Cheryl M Shechtman
(74) *Attorney, Agent, or Firm* — Morgan, Lewis & Bockius LLP

(57) ABSTRACT

A method of interactive visual analysis is performed at a computer. The computer generates a data visualization by executing a data visualization data flow graph comprising a directed graph having a plurality of nodes. Each of the nodes specifies either a data retrieval operation or a data transformation operation and the data visualization comprises visual marks having a first set of characteristics, including a first mark type and one or more first visual mark encodings. A user specifies a second mark type and/or one or more second visual mark encodings. In response, the computer updates a portion, less than all, of the data flow graph according to the second mark type and/or the one or more second visual mark encodings, and generates an updated data visualization by executing updated nodes of the data flow graph without executing nodes not updated according to the user input.

20 Claims, 68 Drawing Sheets

Related U.S. Application Data continuation of application No. 14/954,942, filed on Nov. 30, 2015, now Pat. No. 10,515,093.

(51) Int. Cl.
  *G06F 16/21*  (2019.01)
  *G06F 16/25*  (2019.01)
  *G06F 16/901* (2019.01)
  *G06F 9/455*  (2018.01)

(52) U.S. Cl.
  CPC ........ *G06F 16/258* (2019.01); *G06F 16/9024* (2019.01); *G06T 11/206* (2013.01); *G06F 2009/45579* (2013.01); *G06F 2009/45591* (2013.01)

(56) References Cited

U.S. PATENT DOCUMENTS

| | | | |
|---|---|---|---|
| 9,256,969 B2* | 2/2016 | Krajec | G06T 11/206 |
| 9,911,211 B1* | 3/2018 | Damaraju | G06F 16/9024 |
| 10,565,749 B1* | 2/2020 | Gove | G06T 1/20 |
| 2002/0111841 A1 | 8/2002 | Leymann et al. | |
| 2004/0167791 A1 | 8/2004 | Rodrigo et al. | |
| 2005/0097536 A1 | 5/2005 | Bernstein et al. | |
| 2006/0206512 A1 | 9/2006 | Hanrahan et al. | |
| 2009/0228830 A1 | 9/2009 | Herz et al. | |
| 2012/0047100 A1 | 2/2012 | Lehner | |
| 2013/0073306 A1 | 3/2013 | Shlain et al. | |
| 2013/0103719 A1* | 4/2013 | Gotz | G06T 11/206 |
| | | | 707/E17.011 |
| 2014/0267287 A1* | 9/2014 | Dodgen | G06F 3/048 |
| | | | 345/440 |
| 2015/0261881 A1 | 9/2015 | Wensel | |
| 2016/0018962 A1* | 1/2016 | Low | G06F 3/048 |
| | | | 715/771 |
| 2017/0221240 A1 | 8/2017 | Stetson et al. | |
| 2017/0330357 A1* | 11/2017 | Siegel | G06F 16/248 |
| 2018/0329956 A1 | 11/2018 | Mittal et al. | |
| 2020/0401581 A1* | 12/2020 | Eubank | G06F 16/2456 |

OTHER PUBLICATIONS

Sherman, Office Action, U.S. Appl. No. 14/954,957, dated Jul. 17, 2018, 26 pgs.

Sherman, Final Office Action, U.S. Appl. No. 14/954,957, dated Mar. 13, 2019, 16 pgs.

Sherman, Notice of Allowance, U.S. Appl. No. 14/954,957, dated Jun. 4, 2019, 7 pgs.

Sherman, Office Action, U.S. Appl. No. 14/954,942, dated Oct. 25, 2018, 20 pgs.

Sherman, Final Office Action, U.S. Appl. No. 14/954,942, dated May 16, 2019, 22 pgs.

Sherman, Notice of Allowance, U.S. Appl. No. 14/954,942, dated Sep. 19, 2019, 8 pgs.

Sherman, Notice of Allowance, U.S. Appl. No. 16/726,175, dated Mar. 31, 2021, 14 pgs.

* cited by examiner

| operator | fields | description |
|---|---|---|
| reduce | iof | array -> value |
| map | iof | array -> array' |
| map-state | iof | array -> array', but state maintained, e.g. running totals |
| sort | if | arrays -> arrays', sorted based on one array |
| filter | if | arrays -> arrays', filtered based on one array |
| restrict | i | remove all keys except specified ones (destroys immutability) |
| index | io | -> [0, 1, 2...] where new array has same cardinality as old |
| set | of | f() -> new value (note that the function may take input from the data model) |
| transform | ioc | pass given inputs to a list of transforms |
| tuple | ioc | ->(i1[c], i2[c]...) creates a tuple from a row pulled from multiple columns |
| use | f | run a function for its side effects, e.g. rendering or logging |

Figure 8

Notation 902

| symbol | description | what's specified |
|---|---|---|
| T | a value of type T (U and V indicate different type) | key |
| [T] | an array where values are of type T | key |
| * | a dictionary (set of key/value pairs, where values can be of varying types) | keys |
| # | a table (set of key/array pairs where each array has the same size) | key |
| #T | an array where values are of type T, which lives in a table | key to array, parent key is the table |
| [#]n | n-dimensional array of tables | key |
| {T} | a set where values are of type T | key |
| \| | "or", e.g. [T] \| (T) | |
| int bool | specific type | |
| c | constant value | key or value |
| s | strategy for traversing elements in an array of tables | strategy enum value |
| f T -> U | a function that takes a type T and returns a type U | function name |
| g ^ -> f | a function that takes input and returns another function | function name |

Figure 9A

Summary of array, table, and set operations (part I) 904

| inputs | operator | transform function | output | description |
|---|---|---|---|---|
| [ ] c | constant | | [c] | creates an array with every value a constant value, where the array is the same size as the input array |
| # c | constant | | #[c] | same as the array version, but creates a table with the constant array added |
| [#] c | constant | | [#][c] | same as the array version, but creates an array of tables with the constant array added |
| [T] | {T} | filter | f T -> bool | [T] | {T} | applies a filter function to an array or set, producing a new array or set with rows removed |
| #T | filter | f T -> bool | # | same as the array version, but creates a table with rows removed |
| [#]T | filter | f T -> bool | [#] | same as the array version, but creates an array of tables with rows removed |
| [T] | index | | [int] | creates a new array containing the index of each row from the original array |
| # | index | | #int | same as the array version, but creates a table with a new array added to it |
| [#] s | index | | [#] | same as the array version, but creates an array of tables with a new array added to it |
| [T] | {T} | map | f T -> U | [U] | {U} | applies a function to every element of an array or set to create a new array or set |
| #T | map | f T -> U | #U | same as the array version, but creates a table with a new array added to it |
| [#]T | map | f T -> U | [#]U | same as the array version, but creates an array of tables with a new array added to it |

Figure 9B

Summary of array, table, and set operations (part II) 906

| inputs | operator | transform function | output | description |
|---|---|---|---|---|
| [T] | scan | f T T -> T | [T] | same as reduce, but outputs the intermediate values |
| #T | scan | f T T -> T | #T | same as the array version, but creates a table with a new array added to it |
| [#]T s | scan | f T T -> T | [#]T | same as the array version, but creates an array of tables with a new array added to it |
| [T] | slice | f int -> bool | [T] | transform function uses index to figure out which rows to include in new array |
| # | slice | f int -> bool | # | same as the array version, but creates a table with rows removed |
| [#] s | slice | f int -> bool | [#] | same as the array version, but creates an array of tables with rows removed |
| [T] | {T} | sort | f T T -> int | [T] | applies a sort function to an array or set, producing a new array with the items in order |
| #T | sort | f T T -> int | # | same as the array version, but creates a table with rows in order |
| [#]T s | sort | f T T -> int | [#] | same as the array version, but creates an array of tables with rows in order |
| [T] [U] | zip | | [(T,U)] | creates an array of tuples |
| #TU | zip | | #(T,U) | same as the array version, but creates a table with a new array added to it |
| [#]T | zip | | [#]T | same as the array version, but creates an array of tables with a new array added to it |
| [T] [U] | zipWith | f T U -> V | [V] | applies a function to every pair of elements from two arrays to create a new array |
| #TU | zipWith | f T U -> V | #V | same as the array version, but creates a table with a new array added to it |
| [#]TU | zipWith | f T U -> V | [#]V | same as the array version, but creates an array of tables with a new array added to it |

Figure 9C

Summary of table operations 908

| inputs | operator | transform function | output | description |
|---|---|---|---|---|
| #T | partition | f T -> int | [#] | applies a partition function to an array in a table, producing multiple tables |
| # * | partition | f * -> int | [#]n | produces an n-dimensional array of tables |
|  |  |  |  |  |
| # [keys] | restrict |  | # | restricts table to the specified list of arrays |

Figure 9D

Summary of array operations 910

| inputs | operator | transform function | output | description |
|---|---|---|---|---|
| {T} | distinct |  | {T} | create a new set consisting of all the unique elements in the original array |
|  |  |  |  |  |
| [T] \| {T} | reduce | f T U -> U | U | recursively combine elements of an array using a function to produce a single value, works on set if function is commutative |
| [#]T s | reduce | f T U -> U | U | use the given strategy across an array of tables, combining elements to produce a single value |

Figure 9E

Summary of miscellaneous operations 912

| inputs | operator | transform function | output | description |
|---|---|---|---|---|
| T | copy | | T | copy the specified value |
| [(,)] key | createDict | | {} | take an array of tuples and create a dictionary using the given key |
| * | createTable | | # | take tables and arrays and create a new table |
| T | setValue | f T -> U | U | take a single input and apply a function to create a single output |
| * | setValue | f * -> U | U | take multiple inputs and apply a function to create a single output |
| * | transforms | * -> R -> * | * | apply a series of transformations to a set of inputs to create a set of outputs |

Figure 9F

Summary of "impure" operations 914

| inputs | operator | transform function | output | description |
|---|---|---|---|---|
| * | input | f * | T | may produce different output every time it's called, e.g. reading a file, querying a database |
| * | output | f * | | takes input and does work that isn't put in the data model, e.g. outputting a file, drawing |

Figure 9G usage of "constant" operator 1002

| inputs | operator | transform function | output | description |
|---|---|---|---|---|
| [ ] c | constant | | [c] | creates an array with every value a constant value, where the array is the same size as the input array |
| # c | constant | | #[c] | same as the array version, but creates a table with the constant array added |
| [#] c | constant | | [#][c] | same as the array version, but creates an array of tables with the constant array added |

Figure 10A-1 example of "constant" operator 1004

```
"someValues": { 1, 2, 4, 8 }
"value": 10 someValues  -> constant (id value)  -> newArray

"newArray": { 10, 10, 10, 10 }
```

Figure 10A-2 usage of "copy" operator 1006

| inputs | operator | transform function | output | description |
|---|---|---|---|---|
| T | copy | | T | copy the specified value |

Figure 10B-1 example of "copy" operator 1008

```
"someValues": [ 3, 7 ]

copy: someValues -> myCopy

"myCopy": [ 3, 7 ]
```

Figure 10B-2 usage of "createDict" operator 1010

| inputs | operator | transform function | output | description |
|---|---|---|---|---|
| [(.)] key | createDict | | {} | take an array of tuples and create a dictionary using the given key |

Figure 10C-1 example of "createDict" operator 1012

```
"someNames": [ "joe", "matilda" ],
"someValues": [ 3, 7 ]

zip:        someNames someValues    -> arrayOfTuples
createDict: arrayOfTuples 0   -> result "result": {
  "joe": ( "joe", 3 ),
  "matilda": ( "matilda", 7 )
}
```

Figure 10C-2 usage of "createTable" operator 1014

| inputs | operator | transform function | output | description |
|---|---|---|---|---|
| * | createTable | | # | take tables and arrays and create a new table |

Figure 10D-1 example of "createTable" operator 1016

```
"info": {
  "value": [ 1, 2, 3 ],
  "name": [ "a", "b", "c" ]
}
"totals": [ 1, 3, 6 ]

createTable: info totals  -> result

"result": {
  "value": [ 1, 2, 3 ],
  "name": [ "a", "b", "c" ],
  "totals": [ 1, 3, 6 ]
}
```

Figure 10D-2 usage of "distinct" operator 1020

| inputs | operator | transform function | output | description |
|---|---|---|---|---|
| [T] | distinct | | [T] | create a new set consisting of all the unique elements in the original array |

Figure 10E-1 example of "distinct" operator 1022

```
"someValues": { 5, 4, 5, 3, 14, 4, 3, 9 } distinct: someValues -> newValues

"newValues": { 5, 4, 14, 3, 9 }
```

Figure 10E-2 usage of "filter" operator 1024

| inputs | operator | transform function | output | description |
|---|---|---|---|---|
| [T] \| (T) | filter | f T -> bool | [T] \| (T) | applies a filter function to an array or set, producing a new array or set with rows removed |
| #T | filter | f T -> bool | # | same as the array version, but creates a table with rows removed |
| [#]T | filter | f T -> bool | [#] | same as the array version, but creates an array of tables with rows removed |
| #T * | filter | g * -> (f T -> bool) | # | takes a function + inputs that create the actual transform function |

Figure 10F-1 first example of "filter" operator 1026

```
"myTable": {
  "someValues": [ 1, 2, 3, 4, 5 ],
  "otherValues": [ "a", "b", "c", "d", "e" ]
} filter: myTable (odd) -> newTable

"newTable": {
  "someValues": [ 1, 3, 5 ],
  "otherValues": [ "a", "c", "e" ]
}
```

Figure 10F-2 second example of "filter" operator 1028

```
"myTable": {
  "someValues": [ 1, 2, 3, 1, 3, 5 ],
  "otherValues": [ "a", "b", "c", "d", "e", "f" ]
},
"list": [ 1, 3 ]

filter: (keepOnly list) myTable/someValues -> newTable

"newTable": {
  "someValues": [ 1, 3, 1, 3 ],
  "otherValues": [ "a", "c", "d", "e" ]
}
```

Figure 10F-3 usage of "index" operator 1030

| inputs | operator | transform function | output | description |
|---|---|---|---|---|
| [T] | index | | [int] | creates a new array containing the index of each row from the original array |
| # | index | | #int | creates a new table with an additional array containing the index of each row |
| [#] s | index | | [#] | same as the array version, but creates an array of tables with a new array added to it |

Figure 10G-1 example of "index" operator 1032

```
"myTable": {
  "someValues": [ 5, 4, 6, 3, 2 ],
  "otherValues": [ "a", "b", "c", "d", "e" ]
} index: myTable -> newTable/newId

"newTable": {
  "someValues": [ 5, 4, 6, 3, 2 ],
  "otherValues": [ "a", "b", "c", "d", "e" ],
  "newId": [ 1, 2, 3, 4, 5 ]
}
```

Figure 10G-2 usage of "input" operator 1034 example of "input" operator 1036 usage of "map" operator 1038

| inputs | operator | transform function | output | description |
|---|---|---|---|---|
| [T] \| {T} | map | f T -> U | [U] \| {U} | applies a function to every element of an array or set to create a new array or set |
| [T] * | map | g * -> (f T -> U) | [U] | takes a function + inputs that create the actual transform function |
| #T | map | f T -> U | #U | same as the array version, but creates a table with a new array added to it |
| [#]T | map | f T -> U | [#]U | same as the array version, but creates an array of tables with a new array added to it |

Figure 10I-1 first example of "map" operator 1040

```
"someValues": [ 1, 2, 3, 4 ]

map: (double) someValues -> newValues

"newValues": [ 2, 4, 6, 8 ]
```

Figure 10I-2 second example of "map" operator 1042

```
"someValues": [ 1, 2, 3, 4 ], "factor": 5 map: (multiply factor) someValues -> newValues

"newValues": [ 5, 10, 15, 20 ]
```

Figure 10I-3 usage of "output" operator 1044

| inputs | operator | transform function | output | description |
|---|---|---|---|---|
| * | output | f * | | takes input and does work that isn't put in the data model, e.g. outputting a file, drawing |

Figure 10J-1 example of "output" operator 1046

```
"someValues": [ 1, 2, 3, 4 ], "file": "output.txt"

output: (writeFile someValues file)
```

Figure 10J-2 usage of "partition" operator 1048

| inputs | operator | transform function | output | description |
|---|---|---|---|---|
| #T | partition | f T -> int | [#] | applies a partition function to an array in a table, producing multiple tables |
| #* | partition | f * -> int | [#]n | produces an n-dimensional array of tables |

Figure 10K usage of "reduce" operator 1050

| inputs | operator | transform function | output | description |
|---|---|---|---|---|
| [T] \| (T) | reduce | f T U -> U | U | recursively combine elements of an array using a function to produce a single value, works on set if function is commutative |
| [T] * | reduce | g * -> (f T U -> U) | U | take a function + inputs that create the actual transform function |
| [#]T s | reduce | f T U -> U | U | use the given strategy across an array of tables, combining elements to produce a single value |

Figure 10L-1 example of "reduce" operator 1052

```
"someValues": [ 1, 2, 3, 4 ]

reduce: sum someValues -> result

"result": 10
```

Figure 10L-2 usage of "restrict" operator 1054

| inputs | operator | transform function | output | description |
|---|---|---|---|---|
| # [keys] | restrict | | # | restricts table to the specified list of arrays |

Figure 10M-1 example of "restrict" operator 1056

```
"myTable": {
   "first":  [ 1, 2, 3, 4 ]
   "second": [ 1, 2, 3, 4 ]
   "third":  [ 1, 2, 3, 4 ]
}
"only": { "first", "third" } restrict: myTable only -> newTable

"newTable": {
   "first": [ 1, 2, 3, 4 ]
   "third": [ 1, 2, 3, 4 ]
}
```

Figure 10M-2 usage of "scan" operator 1058

| inputs | operator | transform function | output | description |
|---|---|---|---|---|
| [T] | scan | f T T -> T | [T] | same as reduce, but outputs the intermediate values |
| [T] * | scan | g * -> (f T T -> T) | [T] | takes a function + inputs that create the actual transform function |
| #T | scan | f T T -> T | #T | same as the array version, but creates a table with a new array added to it |
| [#]T s | scan | f T T -> T | [#]T | same as the array version, but creates an array of tables with a new array added to it |

Figure 10N-1 example of "scan" operator 1060

```
"someValues": [ 1, 2, 3, 4 ]

scan: (runningTotal) someValues -> newValues

"newValues": [ 1, 3, 6, 10 ]
```

Figure 10N-2 usage of "setValue" operator 1062

| inputs | operator | transform function | output | description |
|---|---|---|---|---|
| T | setValue | f T -> U | U | take a single input and apply a function to create a single output |
| * | setValue | f * -> U | U | take multiple inputs and apply a function to create a single output |

Figure 10O-1 first example of "setValue" operator 1064

```
"something": 7 setValue: (double something) -> other

"other": 14
```

Figure 10O-2 second example of "setValue" operator 1066

```
"a": 7, "b": 3 setValue: (add a b) -> result

"result": 10
```

Figure 10O-3 usage of "slice" operator 1068

| inputs | operator | transform function | output | description |
|---|---|---|---|---|
| [T] | slice | f int -> bool | [T] | transform function uses index to figure out which rows to include in new array |
| # | slice | f int -> bool | # | transform function uses index to figure out which rows to include in new table |
| # * | slice | g * -> (f int -> bool) | # | takes a function + inputs that create the actual transform function |
| [#] s | slice | f int -> bool | [#] | same as the array version, but creates an array of tables with rows removed |

Figure 10P-1 example of "slice" operator 1070

```
"myTable": {
  "someValues": [ 1, 2, 3, 4 ],
  "otherValues": [ "a", "b", "c", "d" ]
} slice: (everyOther) myTable -> newTable

"newTable": {
  "someValues": [ 1, 3 ],
  "otherValues": [ "a", "c" ]
}
```

Figure 10P-2 usage of "sort" operator 1072

| inputs | operator | transform function | output | description |
|---|---|---|---|---|
| [T] \| (T) | sort | f T T -> int | [T] | applies a sort function to an array or set, producing a new array with the items in order |
| #T | sort | f T T -> int | # | applies a sort function to an array in a table, producing a new table with rows rearranged |
| #T * | sort | g * -> (f T T -> int) | # | takes a function + inputs that create the actual transform function |
| [#]T s | sort | f T T -> int | [#] | same as the array version, but creates an array of tables with rows rearranged |

Figure 10Q-1 example of "sort" operator 1074

```
"myTable": {
  "someValues": { 4, 3, 5, 2, 1 },
  "otherValues": { 1, 2, 3, 4, 5 }
} sort: (compare) myTable -> newTable

"newTable": {
  "someValues": { 1, 2, 3, 4, 5 },
  "otherValues": { 5, 4, 2, 1, 3 }
}
```

Figure 10Q-2 usage of "transforms" operator 1076

| inputs | operator | transform function | output | description |
|---|---|---|---|---|
| * | transforms | * -> R -> * | * | apply a series of transformations to a set of inputs to create a set of outputs |

Figure 10R-1 example of "transforms" operator 1078

```
"dataIn": {
  "Company": [ "Tableau", "Autodesk", "EA" ],
  "Segment": [ "Business Intelligence", "CAD", "Entertainment" ],
  "YearsTo50": [ 9, 5, 6 ]
},
"KeepSegments": [ "Business Intelligence", "Entertainment" ],
"GrowthTable": {
  "Input":  [ 0, 6, 12 ],
  "Output": [ "Rocket Ship", "Hot Company", "Slow Burner" ]
}
"dataTransforms": [
  index:                            table              -> table:1/id
  filter: (keepOnly KeepSegments)   table:1/Segment    -> table:2
  map:    (calc GrowthTable)        table:2/YearsTo50  -> table:3/GrowthGroup
  sort:   (compare)                 table:3/YearsTo50  -> table:4
]

transforms: dataTransforms
  (dataIn, KeepSegments, GrowthTable) -> (table, SegmentList, GrowthTable)
  -> (table:4 -> dataOut)

"dataOut": {
  "Company": [ "EA", "Tableau" ],
  "Segment": [ "Entertainment", "Business Intelligence" ],
  "YearsTo50": [ 6, 9 ],
  "GrowthGroup": [ "Rocket Ship", "Hot Company" ],
  "id": [ 3, 1 ]
}
```

Figure 10R-2 usage of "zip" operator 1080

| inputs | operator | transform function | output | description |
|---|---|---|---|---|
| [T] [U] | zip | | [(T,U)] | creates an array of tuples |
| #T,U | zip | | #(T,U) | same as the array version, but creates a table with a new array added to it |
| [#]T | zip | | [#]T | same as the array version, but creates an array of tables with a new array added to it |

Figure 10S-1 example of "zip" operator 1082

```
"someValues": [ 1, 2, 3, 4 ]
"otherValues": [ 3, 4, 5, 6 ]

zip: someValues otherValues -> newValues

"newValues": [ (1,3), (2,4), (3,5), (4,6) ]
```

Figure 10S-2 usage of "zipWith" operator 1084

| inputs | operator | transform function | output | description |
|---|---|---|---|---|
| [T] [U] | zipWith | f T U -> V | [V] | applies a function to every pair of elements from two arrays to create a new array |
| [T] [U] * | zipWith | g * -> (f T U -> V) | [V] | takes a function + inputs that create the actual transform function |
| #T U | zipWith | f T U -> V | #V | same as the array version, but creates a table with a new array added to it |
| [#]T U | zipWith | f T U -> V | [#]V | same as the array version, but creates an array of tables with a new array added to it |

Figure 10T-1 example of "zipWith" operator 1086

```
"someValues": [ 1, 2, 3, 4 ]
"otherValues": [ 3, 4, 5, 6 ]

zipWith: add someValues otherValues -> newValues

"newValues": [ 4, 6, 8, 10 ]
```

Figure 10T-2

| type | edit | nodes? | data? | run? | which producer? |
|---|---|---|---|---|---|
| DataSource | DataSource | · | · | · | viz |
| | DataSourceStyles | | · | · | viz |
| Workbook | StyleTheme | | · | · | viz, dashboard |
| | Locale | | · | · | viz, dashboard |
| BaseSheetDoc | Init | · | · | · | viz, dashboard |
| | LockUpdates | | | · | viz |
| | ForceUpdate | | | · | viz |
| | IgnoreAO | | | · | viz |
| | Invalidate | | | · | viz |
| | VisualStylesheet | | · | · | viz (do we ever need to recreate nodes?) |
| | VizLayoutOptions | | · | · | viz, dashboard (do we ever need to recreate nodes?) |
| | Clear | · | · | · | viz, dashboard |
| | ClearUndo | · | · | · | viz, dashboard |
| | ValidateIfVisible | | | · | viz |
| Window | TabColor | | | | |
| | Hide | | | | |
| | Unhide | | | | |
| WorksheetDoc | VisualSpecification | · | · | · | viz |
| | Filters | | · | · | viz (subset) |
| | Sorts | | · | · | viz (subset) |
| | Annotations | · | · | · | viz (subset) |
| | Tooltips | | · | · | viz (subset) |
| | Labels | · | · | · | viz (subset) |
| | LockQuickFilters | | | · | |
| | UpdateQuickFilters | | | · | |
| | UpdateQuickFilterVisibility | | | | (worksheets send to stories) |
| | ActivePaneSpecification | | | | |

Figure 11A

| type | edit | nodes? | data? | run? | which producer? |
|---|---|---|---|---|---|
| DashboardDoc | DashboardOnlyStyles | | ✓ | ✓ | dashboard |
| | Zones | ✓ | ✓ | ✓ | dashboard |
| | ZonesUndo | ✓ | ✓ | ✓ | dashboard |
| | SheetsAdded | ✓ | ✓ | ✓ | dashboard |
| | SheetsRemoved | ✓ | ✓ | ✓ | dashboard |
| Visual | ZoomPan | | ✓ | ✓ | viz |
| | HighlightSpecification | ✓ | ✓ | ✓ | viz (subset) |
| | Selection | | ✓ | ✓ | viz |
| | Page | | ✓ | ✓ | viz |
| | Floating_Toolbar_Visibility | | | | |
| | WidgetCtrlMode | | | | (used by stories) |
| StoryboardDoc | StoryPointDelta | ✓ | ✓ | ✓ | story |
| | StoryPointDeltaUndo | ✓ | ✓ | ✓ | story |
| | StoryPointRevert | ✓ | ✓ | ✓ | story |
| | StoryPointRevertUndo | ✓ | ✓ | ✓ | story |
| | StoryPointCapture | ✓ | ✓ | ✓ | story |
| | StoryPointCaptureUndo | ✓ | ✓ | ✓ | story |
| | StoryPointNonDelta | ✓ | ✓ | ✓ | story |
| | StoryPointNonDeltaUndo | ✓ | ✓ | ✓ | story |

Figure 11B

Optimization Examples

Parallelize across nodes

```
Sales  -> reduce sum    -> SUM(Sales)
Profit -> reduce sum    -> SUM(Profit)
```

Figure 12A

Don't materialize intermediate tables

```
table               -> index                           -> table:1/id
table:1/Segment     -> filter (keepOnly KeepSegments)  -> table:2
table:2/YearsTo50   -> map (calc GrowthTable)          -> table:3/GrowthGroup
table:3/YearsTo50   -> sort compare                    -> table:4
```

Figure 12B

Leverage immutability when copying

```
table:1/Sales   -> map triple   -> table:2/TripleSales
```

Figure 12C

Combine operations

```
Sales -> reduce max     -> MAX(Sales)
Sales -> reduce min     -> MIN(Sales)
Sales -> reduce average -> AVG(Sales)
```

Figure 12D

Data

Transforms

| operator | transform function | func input | op input | output |
|---|---|---|---|---|
| index(1); | | | data | -> data:1/id |
| filter: | keepOnly | KeepSegments | data:1/Segment | -> data:2 |
| map; | rangeCheck | GrowthTable | data:2/YearsTo50 | -> data:3/GrowthGroup |
| sort; | compare | | data:3/YearsTo50 | -> data:4 |

Figure 13C-3

Output data

```
"data:4": {
  "Company": [ "EA", "Tableau" ],
  "Segment": [ "Entertainment", "Business Intelligence" ],
  "YearsTo50": [ 6, 8 ],
  "GrowthGroup": [ "Rocket Ship", "Hot Company" ],
  "id": [ 3, 1 ]
}
```

Figure 13C-4

Transform functions

- keepOnly: return (element is in set)
- rangeCheck: if element is in range defined by Input, return corresponding value in Output
- compare: standard comparison that returns <, =, or >

Figure 13C-5

Zones

Input data

```
"zones": {
    "zid":  [      1,      4,      6,     15,     17 ],
    "x":    [      0,  45065,  77143,      0,      0 ],
    "y":    [  10256,   5128,  55000,      0,   5128 ],
    "w":    [ 100000,  54935,  22857, 100000,  45065 ],
    "h":    [  44744,   5128,  40770,   5128,   5128 ],
    "type": [  "vis", "color", "filter", "title", "text" ],
    "name": [  "two",  "two",  "two", "Tale of 100 Entrepreneurs", nil ],
    "param":[    nil, "Growth Group", "Segment", nil, "Click to interact" ]
},
"window" : {
    "x": 0,
    "y": 0,
    "w": 500,
    "h": 400
}
```

Figure 13D-1

Transforms

| operator | transform function | func input | op input | output |
|---|---|---|---|---|
| map: | dashToPixels | window/x window/w | zones/x | -> ^x |
| map: | dashToPixels | window/y window/h | zones/y | -> ^y |
| map: | dashSizeToPixels | window/w | zones/w | -> ^w |
| map: | dashSizeToPixels | window/h | zones/h | -> ^h |
| zip: | | | zones/zid ^x ^y ^w ^h zones/name | -> ^zones |
| createDict: | | | ^zones zid | -> ^keyedZones |

Figure 13D-2

Output data

```
"^keyedZones": {
    1:  ( 1,     0,  41, 500, 179, "two" ),
    4:  ( 4,   225,  20, 274,  20, "two" ),
    6:  ( 6,   385, 220, 114, 163, "two" ),
    15: ( 15,    0,   0, 500,  20, "Tale of 100 Entrepreneurs" ),
    17: ( 17,    0,  20, 225,  20, nil )
}
```

Figure 13D-3

Transform functions

- dashToPixels: converts (0,100000) to (0,w) + x
- dashSizeToPixels: converts (0,100000) to (0,w)

Figure 13D-4

Visualization Title

Input data

"box": { "x": 0, "y": 0, "w": 500, "h": 50 }  Figure 13E-1

Transforms

| operator | transform function | func input | op input | output |
|---|---|---|---|---|
| setValue: | calcCenter | box/x box/w | | -> title/centerX |
| setValue: | calcCenter | box/y box/h | | -> title/centerY |

Figure 13E-2

Output data

"title": {
  "centerX": 250,
  "centerY": 25
}

Figure 13E-3

Transform functions

- calcCenter: x + w/2

Figure 13E-4

Visualization Layout

Input data

```
"box":   { "x":   0, "y":  0, "w": 400, "h": 300 },
"laxis": { "x":   0, "y":  0, "w": 100, "h": 300 },
"baxis": { "x": 100, "y": 50, "w": 400, "h":  50 }
```

Figure 13F-1

Transforms

| operator  | transform function | func input    | op input | output     |
|-----------|--------------------|---------------|----------|------------|
| setValue: | add                | box/x laxis/w |          | -> scene/x1|
| setValue: | add                | box/y box/h   |          | -> temp    |
| setValue: | subtract           | temp baxis/h  |          | -> scene/y2|
| copy:     |                    |               | box/y    | -> scene/y1|
| setValue: | add                | box/x box/w   |          | -> scene/x2|

Figure 13F-2

Output data

```
"scene": { "x1": 100, "x2": 400, "y1": 0, "y2": 250 }
```

Figure 13F-3

Transform functions

- add: a+b
- subtract: a-b

Figure 13F-4

Marks

Input data

```
"data": {
  "Year": [ 1, 30, 1, 3, 5, 1, 10 ],
  "Revenue": [ 1, 60, 5, 40, 250, 2, 60 ],
  "Ticker": [ "ACME", "ACME", "ZED", "ZED", "ZED", "JAX", "JAX" ],
  "Segment": ["CAD", "CAD", "ERP", "ERP", "ERP", "Database", "Database"],
  "GrowthGroup": ["Slow","Slow","Rocket","Rocket","Rocket","Hot","Hot"]
},
"scene": { "x1": 100, "x2": 400, "y1": 0, "y2": 250 },
"SegmentBrushed": { "CAD", "Database" },
"growthColor": {
  "Rocket Ship": "#dd0033",
  "Hot Company": "#ff6600",
  "Slow Burner": "#3322dd"
},
"growthBrushColor": {
  "Rocket Ship": "#ebd2ca",
  "Hot Company": "#f3deca",
  "Slow Burner": "#cfdbe8"
}
```

Figure 13G-2

Output data

```
"data:4": {
  "Year": [ 1, 30, 1, 3, 5, 1, 10 ],
  "Revenue": [ 1, 60, 5, 40, 250, 2, 60 ],
  "Ticker": [ "ACME", "ACME", "ZED", "ZED", "ZED", "JAX", "JAX" ],
  "Segment": ["CAD", "CAD", "ERP", "ERP", "ERP", "Database", "Database"],
  "GrowthGroup": ["Slow","Slow","Rocket","Rocket","Rocket","Hot","Hot"],
  "^x": [ 10, 300, 10, 30, 50, 10, 100 ],
  "^y": [ 249, 190, 245, 210, 0, 248, 190 ],
  "^lines": [ 1, 1, 2, 2, 2, 3, 3 ],
  "^brushed?": [ true, true, false, false, false, true, true ]
}
```

Figure 13G-3

Marks

Transforms

| operator | transform function | func input | agg input | output |
|---|---|---|---|---|
| reducer: | min | | data/Year | -> MIN(Year) |
| reducer: | max | | data/Year | -> MAX(Year) |
| reducer: | min | | data/Revenue | -> MIN(Revenue) |
| reducer: | max | | data/Revenue | -> MAX(Revenue) |
| setValue: | minOrZero | | MIN(Year) | -> "yearMin" |
| setValue: | minOrZero | | MIN(Revenue) | -> "revenueMin" |
| map: | genConvert | "yearMin MAX(YearNumber) scene/x1 scene/x2" | data/Year | -> data:1/'x |
| map: | genConvert | "revenueMin MAX(Revenue) scene/y1 scene/y2" | data:1/Revenue | -> data:2/'y |
| map: | incOrChange(1) | | data:2/Ticker | -> data:3/'line |
| // brushing & color | | | | |
| map: | isInSet | SegmentBrushed | data:3/Segment | -> data:4/"brushed? |
| reducer: | or | | data:4/"brushed? | -> "hasBrush?" |
| map: | genBrush | "hasBrush? groupValue groupBrushValue data:4/GroupGroup data:3/"brushed? | -> data:5/color |

Transform functions

- min & max & or: the obvious implementations
- minOrZero(s): min(s,0)
- genConvert: creates a function that converts between coordinate systems
- isInSet: return (element is in set)
- getBrush: creates a function that can determine the proper color to use based on whether the vis is being brushed & whether an individual row is brushed
- incOrChange: every time the input value changes, increment the int being output

Reference Line

Figure 13H-1

Input data

```
"revenueMin": 0,
"MAX(Revenue)": 250,
"scene": { "x1": 100, "x2": 400, "y1": 0, "y2": 250 },
"revenueRefLine": 50000
```

Transforms

| operator | transform function | func. input | op input | output |
|---|---|---|---|---|
| copy: | | | scene/x1 | -> refline/x1 |
| copy: | | | scene/x2 | -> refline/x2 |
| setValue: | convert | revenueRefline revenueMin MAX(Revenue) scene/y2 scene/y1 | | |
| copy: | | | scene/y1 | -> refline/y2 |

Figure 13H-2

Output data

```
"refline": { "x1": 100, "x2": 400, "y1": 200, "y2": 200 }
```

Figure 13H-3

Transform functions

• convert

Figure 13H-4

X axis

Input data

```
"MAX(Year)": 30,
"scene": { "x1": 100, "x2": 400, "y1": 0, "y2": 250 },
"tickSize": 24
```

Figure 13I-1

Transforms

| operator | transform function | func input | op input | output |
|---|---|---|---|---|
| // tick position | | | | |
| setValue: | calcTickSize | scene/x1 scene/x2 | | -> perTick |
| setValue: | makeTicks | MAX(Year) scene/x1 scene/x2 perTick | | -> xticks/x |
| constant: | id | scene/y2 | xticks/x | -> xticks/y |
| // tick text | | | | |
| index(0): | | | xticks/x | -> xticks/i |
| map: | genToTickString | perTick | xticks/i | -> xticks/string |
| constant: | add | scene/y tickSize | xticks/i | -> xticks/stringY |

Figure 13I-2

Output data

```
"xticks": {
  "x": [ 100, 150, 200, 250, 300, 350, 400 ],
  "y": [ 250, 250, 250, 250, 250, 250, 250 ],
  "i": [ 0, 1, 2, 3, 4, 5, 6 ],
  "string": [ "0", "5", "10", "15", "20", "25", "30" ],
  "stringY": [ 264, 264, 264, 264, 264, 264, 264 ]
}
```

Figure 13I-3

Transform functions

- calcTickSize(a,b): figure out how many pixels per tick mark we should have based on the overall size of the space
- makeTicks(maxValue,x1,x2,perTick): create an array of tick mark positions
- genToTickString: creates a function that multiples perTick * an element and creates a string

Figure 13I-4

Y axis

Input data

```
"MAX(Revenue)": 80,
"scene": { "x1": 100, "x2": 400, "y1": 0, "y2": 250 },
"tickSize": 28,
"format": "$%1m"
```
Figure 13J-1

Transforms

| operator | transform function | func input | op input | output |
|---|---|---|---|---|
| // tick position | | | | |
| setValues: | calcTickSize | scene/y2 scene/y1 | | -> perTick |
| setValues: | makeTicks | MAX(Revenue) scene/y2 scene/y1 perTick | | -> yticks/y |
| constant: | id | scene/x1 | yticks/y | -> yticks/x |
| // tick text | | | | |
| index(0); | | | yticks/y | -> yticks/i |
| map: | genFormatTickString | format perTick | yticks/i | -> yticks/string |
| constant: | subtract | scene/x tickSize | yticks/i | -> yticks/stringX |

Figure 13J-2

Output data

```
"yticks": {
  "x": [ 100, 100, 100, 100, 100, 100 ],
  "y": [ 250, 200, 150, 100, 50, 0 ],
  "i": [ 0, 1, 2, 3, 4, 5 ],
  "string": [ "$0m", "$50m", "$100m", "$150m", "$200m", "$250m" ],
  "stringX": [ 76, 76, 76, 76, 76, 76 ]
}
```
Figure 13J-3

Transform functions

• genFormatTickString: creates a function that multiplies perTick * an element and creates a string based on a format string

Figure 13J-4

Legend

Input data

```
"zone": {
  "did": 4,
  "x": 225,
  "y": 20,
  "w": 274,
  "h": 20,
  "name": "two"
},
"GrowthGroup": [ "Rocket Ship", "Hot Company", "Slow Burner" ],
"props": {
  "colWidth": 120,
  "swatchSize": 16,
  "inset": 3,
  "pad": 8
},
"growthColor": {
  "Rocket Ship": "#dd0033",
  "Hot Company": "#ff6600",
  "Slow Burner": "#3322dd"
}
```

Figure 13K-1

Transforms

| operator | transform function | func input | op input | output |
|---|---|---|---|---|
| index(0): | | | GrowthGroup | -> i |
| map: | genColX | zone/x props/colWidth | i | -> out/x |
| constant: | genColY | zone/y props/swatchSize props/inset | i | -> out/y |
| map: | genAdd | props/swatchSize props/pad | out/x | -> out/strX |
| constant: | id | zone/y | i | -> out/strY |
| copy: | | | GrowthGroup | -> out/str |
| map: | lookup | growthColor | GrowthGroup | ->out/color |

Figure 13K-2

Output data

```
"out": {
  "x": [ 225, 348, 465 ],
  "y": [ 6, 6, 6 ],
  "str": [ "Rocket Ship", "Hot Company", "Slow Burner" ],
  "strX": [ 244, 364, 484 ],
  "strY": [ 20, 20, 20 ],
  "color": ["#dd0033", "#ff6600", "#3322dd" ]
}
```

Figure 13K-3

Transform functions

- genColX(i) = x + i % w
- genColY(i) = y - s + inset
- getAdd(x) = x + s + p
- lookup: gets the value associated with the key in a dictionary

Figure 13K-4

Quick Filter

Input data

```
"zone": {
  "zid": 6,
  "x": 385,
  "y": 220,
  "w": 114,
  "h": 163,
  "name": "two"
},
"Segments": [ "Business Intelligence", "CAD", "Entertainment" ],
"filterStyle": {
  "textProps":   { "color": "#000000", "pointSize": 12 },
  "swatchProps": { "color": "#000000" },
  "brushProps":  { "color": "#cccccc" }
}
"filterProps": { "rowHeight": 16, "swatchSize": 10, "pad": 4 },
"filtered": [ "CAD" ],
"brushed": [ "Business Intelligence" ]
```

Figure 13L-1

Output data

```
"out": {
  "x": [ 385, 385, 385 ],
  "y": [ 220, 236, 252 ],
  "strX": [ 399, 399, 399],
  "strY": [ 220, 236, 252 ],
  "str": [ "Business Intelligence", "CAD", "Entertainment" ],
  "brushed?": [ true, false, false ],
  "unfiltered?": [ true, false, true ],
}
"metrics": {
  "lineW": 72,
  "lineH": -11,
  "checkW": 10,
  "checkH": -10
}
```

Figure 13L-2

Transform functions

- genA(i) = y + h * i
- funcB(x) = 5 - x
- neg(x) = -x

Figure 13L-3

Quick Filter

Transforms

| operator | transform function | func input | op input | output |
|---|---|---|---|---|
| index(0): | id | | segments | -> "row |
| constant: | genA | zone/x | segments | -> out/x |
| map: | | zone/y filterProps/rowHeight | "row | -> out/y |
| // text | | | | |
| constant: | genAxi | zone/x filterProps/swatchSize filterProps/pad | segments | -> out/swX |
| copy: | | | out/y | -> out/strY |
| copy: | | | segments | -> out/str |
| // brushing | | | | |
| map: | isInSet | brushed | segments | -> brushed? |
| reduce: | getMaxStringWidth | filterStyle/textProps | segments | -> metrics/lineW |
| setValue: | funcB | filterProps/rowHeight | | -> metrics/lineH |
| // filtering | | | | |
| map: | isNotInSet | filtered | segments | -> out/unfiltered? |
| copy: | | | filterProps/swatchSize | -> metrics/checkW |
| setValue: | neg | filterProps/swatchSize | | -> metrics/checkH |

Figure 13L-4

Input data                    Rendering

```
"window": { "w": 1000, "h": 800 },

"title": {
  "centerX": 250,
  "centerY": 25
}
"title": "Tale of 100 Entrepreneurs",
"title-style": {"font": "22px Times", align: "center", color: "#000000"}, "x": [ 10, 200, 10, 30, 50, 10, 100 ],
"y": [ 245, 190, 245, 215, 0, 245, 190 ],
"lines": [ 1, 1, 2, 2, 2, 3, 3 ],
"brushed?": [ true, true, false, false, false, true, true ],
"mark-style": { "width": 3, color: "#3344ff"}, "refline": { "x1": 100, "x2": 400, "y1": 200, "y2": 200 },
"refline-style": { "width": 2, "color": "#999999"}, "xticks": {
  "x": [ 100, 150, 200, 250, 300, 350, 400 ],
  "y": [ 250, 250, 250, 250, 250, 250, 250 ],
  "string": [ "0", "5", "10", "15", "20", "25", "30" ],
  "stringY": [ 254, 254, 254, 254, 254, 254, 254 ]
},
"yticks": {
  "x": [ 100, 100, 100, 100, 100, 100 ],
  "y": [ 250, 200, 150, 100, 50, 0 ],
  "string": [ "$0m", "$50m", "$100m", "$150m", "$200m", "$250m" ],
  "stringX": [ 76, 76, 76, 76, 76, 76 ]
},
"axis-style": { "color": "#aaaaaa" },
"xaxis-style": { align: "center", color: "#000000" },
"yaxis-style": { align: "right", color: "#000000" }, "legend": {
  "x": [ 225, 345, 465 ],
  "y": [ 5, 5, 5 ],
  "str": [ "Rocket Ship", "Hot Company", "Slow Burner" ],
  "strX": [ 244, 364, 484 ],
  "strY": [ 20, 20, 20 ],
  "color": ["#dd0033", "#ddff00", "#3322dd" ]
},
"legend-style": { color: "#000000" },
"swatch-size": 10, "gf": {
  "x": [ 365, 365, 365 ],
  "y": [ 206, 236, 250 ],
  "strX": [ 399, 399, 399 ],
  "strY": [ 210, 236, 250 ],
  "str": [ "Business Intelligence", "CAD", "Entertainment" ],
  "brushed?": [ true, false, false ],
  "unfiltered?": [ true, false, true ],
},
"metrics": {
  "lineY": 72,
  "lineX": -11,
  "checkY": 10,
  "checkX": -10
},
"filter-style": { color: "#000000" }
```

Figure 13M-1

Rendering

Transforms

| operator | function | func input | op input | output |
|---|---|---|---|---|
| // clear | | | | |
| output: | clear | window/x window/h | | |
| // title | | | | |
| output: | draw-string | title/^centerX title/^centerY title title-style | | |
| // marks | | | | |
| output: | draw-segments-on | ^x ^y ^lines ^brushed? mark-style | | |
| output: | draw-segments-off | ^x ^y ^lines ^brushed? mark-style | | |
| // refline | | | | |
| output: | draw-line | refline refline-style | | |
| // x axis | | | | |
| output: | draw-lines | xticks/x xticks/y axis-style | | |
| output: | draw-strings | xticks/x xticks/stringX xticks/string axis-style | | |
| // y axis | | | | |
| output: | draw-lines | yticks/x yticks/y axis-style | | |
| output: | draw-strings | yticks/stringX yticks/y yticks/string yaxis-style | | |
| // legend | | | | |
| output: | draw-strings | legend/strX legend/strY legend/str legend-style | | |
| output: | draw-rects | legend/x legend/y legend/color swatch-size | | |
| // qfilter | | | | |
| output: | draw-xs | qf/x qf/y metrics/checkX metrics/checkY qf/unfiltered? | | |
| output: | draw-rects2 | qf/strX qf/strY metrics/lineX metrics/lineY qf/brushed? | | |
| output: | draw-strings | qf/strX qf/strY qf/str filter-style | | |

Figure 13M-2

Output data

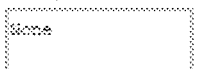

Figure 13M-3

INTERACTIVE VISUAL ANALYSIS OF DATASETS USING A SPECIALIZED VIRTUAL MACHINE

CROSS-REFERENCE TO RELATED APPLICATIONS

This application is a continuation of U.S. patent application Ser. No. 16/726,175, filed Dec. 23, 2019, entitled "Interactive Visual Analysis of Datasets Using A Specialized Virtual Machine," which is a continuation of U.S. patent application Ser. No. 14/954,942, filed Nov. 30, 2015, entitled "Systems and Methods for Interactive Visual Analysis Using A Specialized Virtual Machine," now U.S. Pat. No. 10,515,093, each of which is incorporated by reference in its entirety.

This application is related to U.S. patent application Ser. No. 14/954,957, filed Nov. 30, 2015, entitled "Systems and Methods for Implementing a Virtual Machine for Interactive Visual Analysis," now U.S. Pat. No. 10,380,140, which is incorporated by reference in its entirety.

TECHNICAL FIELD

The disclosed implementations relate generally to data visualization and more specifically to systems, methods, and user interfaces that implement a data visualization virtual machine for interactive visual analysis of a data set.

BACKGROUND

Data visualization applications enable a user to understand a data set visually, including distribution, trends, outliers, and other factors that are important to making business decisions. Some data sets are very large or complex, so the process of analyzing a data set, loading the data set, and displaying a corresponding data visualization can be slow. The process is also slow when a user chooses to change what data is displayed or how the data is displayed.

Data visualizations are often shared with others, sometimes in combination with other data visualizations as part of a dashboard. In some cases, the distributed data visualizations are static. To the extent a distributed data visualization or dashboard is dynamic, updates may be slow, particularly within a browser or on a mobile device.

SUMMARY

Disclosed implementations address the above deficiencies and other problems associated with interactive analysis of a data set.

Some implementations have designated shelf regions that determine the characteristics of the displayed data visualization. For example, some implementations include a row shelf region and a column shelf region. A user places field names into these shelf regions (e.g., by dragging fields from a schema region), and the field names define the data visualization characteristics. For example, a user may choose a vertical bar chart, with a column for each distinct value of a field placed in the column shelf region. The height of each bar is defined by another field placed into the row shelf region.

In accordance with some implementations, a method of building data visualization data flow graphs is performed at a computer having one or more processors and memory storing one or more programs configured for execution by the one or more processors. The process receives a visual specification that defines characteristics of a data visualization to be rendered based on data from one or more specified databases. The process also receives metadata for the specified databases. Using the received metadata and received visual specification, the process forms a data visualization data flow graph, which is a directed graph including a plurality of data nodes and a plurality of transform nodes. Each transform node specifies a respective set of one or more inputs for retrieval, where each input corresponds to a respective data node Each transform node also specifies a respective transformation operator that identifies a respective operation to be performed on the respective one or more inputs. Each of a subset of the transform nodes specifies a respective set of one or more outputs corresponding to respective data nodes and specifies a respective function for use in performing the respective operation of the respective transform node. In this way, the process builds a data visualization data flow graph that can be executed to render a data visualization according to the visual specification using the one or more databases.

In some implementations, the process displays a graphical user interface on a computer display. The graphical user interface includes a schema information region and a data visualization region. The schema information region includes multiple field names, where each field name is associated with a data field from the specified databases. The data visualization region includes a plurality of shelf regions that determine the characteristics of the data visualization. Each shelf region is configured to receive user placement of one or more of the field names from the schema information region. The process builds the visual specification according to user selection of one or more of the field names and user placement of each user-selected field name in a respective shelf region in the data visualization region.

In some implementations, after forming the data visualization data flow graph, the process receives user input to modify the visual specification. The process updates the data visualization data flow graph according to the modified visual specification. In some implementations, updating the data visualization data flow graph includes identifying one or more transformation nodes affected by the modified visual specification and updating only the identified one or more transformation nodes while retaining unaffected transformation nodes without change.

In some implementations, the process retrieves data from the one or more databases according to the plurality of data nodes and stores the retrieved data in a runtime data store distinct from the data visualization data flow graph.

In some implementations, forming the data visualization data flow graph uses one or more style sheets and/or one or more layout options.

In some implementations, the data visualization comprises a dashboard that includes a plurality of distinct component data visualizations. The visual specification comprises a plurality of component visual specifications, and each component data visualization is based on a respective one of the component visual specifications.

In some implementations, forming the data visualization data flow graph uses an analytic specification that defines one or more data visualization analytic features. The process forms one or more transform nodes corresponding to each analytic feature. These transform nodes are configured to construct visual representations corresponding to the analytic features for superposition on the data visualization. In some implementations, the analytic features are selected from among reference lines, trend lines, and reference bands.

In some implementations, the data visualization characteristics defined by the visual specification include mark type and zero or more encodings of the marks. In some implementations, the mark type is one of: bar chart, line chart, scatter plot, text table, or map. In some implementations, the encodings are selected from mark size, mark color, and mark label.

In some implementations, the process transmits the data visualization data flow graph to a computing device distinct from the computer, and the data visualization is subsequently rendered by the computing device according to the data visualization data flow graph.

In some implementations, the process retrieves data from the one or more specified databases according to the plurality of data nodes and stores the retrieved data in a runtime data store distinct from the data visualization data flow graph. The process then transmits the runtime data store to the computing device (e.g., along with the data visualization data flow graph).

In some implementations, the information describing each transform node is written in a visual transform language.

In some implementations, after forming the initial data visualization data flow graph, the process modifies the data visualization data flow graph to reduce subsequent runtime execution time when the data visualization is rendered. In some implementations, modifying the data visualization data flow graph includes performing one or more optimization steps. In some instances, the optimization steps include forming a parallel execution path of a first transform node and a second transform node when it is determined that the first transform node and the second transform node are independent. In some instances, the optimization steps include removing a processing step of saving to a data store when output data from a third transform is used only by subsequent transform nodes. In some instances, the optimization steps include combining two or more nodes into a single node when each of the two or more nodes operates on the same inputs and a single node can perform the operations corresponding to the two or more nodes in parallel.

In some implementations, each data node specifies a source that is either from the one or more databases or from output of a respective transform node.

In some implementations, a subset of the transform nodes specify graphical rendering of data visualization elements.

In accordance with some implementations, a system for building data visualization data flow graphs includes one or more processors, memory, and one or more programs stored in the memory. The programs are configured for execution by the one or more processors. The programs include instructions for performing any of the methods described above.

In accordance with some implementations, a non-transitory computer readable storage medium stores one or more programs configured for execution by a computer system having one or more processors and memory. The one or more programs include instructions for performing any of the methods described above.

In accordance with some implementations, a method of using a virtual machine for interactive visual analysis is performed at a computer having one or more processors and memory storing one or more programs configured for execution by the one or more processors. The process receives a data visualization data flow graph, which is a directed graph including a plurality of data nodes and a plurality of transform nodes. Each transform node specifies a respective set of one or more inputs for retrieval, where each input corresponding to a respective data node. Each transform node also specifies a respective transformation operator that identifies a respective operation to be performed on the respective one or more inputs. Each of a subset of the transform nodes specifies a respective set of one or more outputs corresponding to respective data nodes and specifies a respective function for use in performing the respective operation of the respective transform node. The process traverses the data flow graph according to directions of arcs between nodes in the data flow graph, thereby retrieving data corresponding to each data node and executing the respective transformation operator specified for each of the transform nodes. In this way, the process generates a data visualization according to a plurality of the transform nodes that specify graphical rendering of data visualization elements.

In some implementations, the process displays a graphical user interface on a computer display. The graphical user interface includes a schema information region and a data visualization region. The schema information region includes multiple field names, where each field name is associated with a data field from a data source. The data visualization region includes a plurality of shelf regions that determine characteristics of the data visualization, and each shelf region is configured to receive user placement of one or more of the field names from the schema information region. The data flow graph is built according to user selection of one or more of the field names and user placement of each user-selected field name in a respective shelf region in the data visualization region. The data visualization is displayed in the data visualization region.

In some implementations, after generating the data visualization the process receives one or more updates to the data flow graph and re-traverses the data flow graph according to directions of arcs between nodes in the data flow graph. In this way, the process retrieves data corresponding to each new or modified data node and executes the respective transformation operator specified for each new or modified transform node. Unchanged nodes are not re-executed. By re-traversing the data flow graph, the process generates an updated data visualization according to a plurality of the transform nodes that specify graphical rendering of data visualization elements.

In some implementations, the process retrieves data from the one or more databases according to the plurality of data nodes and stores the retrieved data in a runtime data store distinct from the data flow graph.

In some implementations, the data visualization uses data from a database for which the computer has no access permission. Retrieving data corresponding to each data node includes retrieving data from a received runtime data store that includes data previously retrieved from the database (e.g., retrieved by the computer system that generated the data flow graph).

In some implementations, the data flow graph includes one or more data nodes that contain style sheet information or layout options.

In some implementations, the data visualization comprises a dashboard that includes a plurality of distinct component data visualizations, and the data flow graph comprises a plurality of component data flow graphs, each corresponding to a respective component data visualization. In some instances, a plurality of nodes in the data flow graph are shared by two or more of the component data flow graphs.

In some implementations, the data flow graph includes one or more transform nodes that specify data visualization analytic features. Executing the corresponding respective transform operators renders graphical representations of the analytic features superimposed on the data visualization. In some implementations, the analytic features are selected from among reference lines, trend lines, and reference bands.

In some implementations, the transform nodes include one or more graphic rendering nodes that generate marks in the data visualization with a specified mark type. In some of these implementations, the mark type is one of bar chart, line chart, scatter plot, text table, or map.

In some implementations, the transform nodes include one or more graphic rendering nodes that generate marks in the data visualization with one or more specified mark encodings. In some implementations, the mark encodings are selected from among mark size, mark color, and mark label.

In some implementations, the computer is distinct from a computing device that generated the data flow graph.

In some implementations, the information describing each transform node is written in a visual transform language.

In some implementations, each data node specifies a source that is either from a source database or from output of a respective transform node.

In accordance with some implementations, a system for running a virtual machine for interactive visual analysis includes one or more processors, memory, and one or more programs stored in the memory. The programs are configured for execution by the one or more processors. The programs include instructions for performing any of the methods described above.

In accordance with some implementations, a non-transitory computer readable storage medium stores one or more programs configured for execution by a computer system having one or more processors and memory. The one or more programs include instructions for performing any of the methods described above.

Thus methods, systems, and graphical user interfaces are provided that implement a virtual machine for interactive visual analysis of a data set.

BRIEF DESCRIPTION OF THE DRAWINGS

For a better understanding of the aforementioned implementations of the invention as well as additional implementations, reference should be made to the Description of Implementations below, in conjunction with the following drawings in which like reference numerals refer to corresponding parts throughout the figures.

FIG. 8 provides a table of some common operators that are used in some implementations.

FIG. 9A provides a glossary of notation that is used herein with respect to operators and transform functions.

FIGS. 9B-9G provide summaries of operators and transform functions that are used in some implementations.

FIGS. 10A-1-10T-2 identify how some operators are used and examples of the usage, in accordance with some implementations.

FIGS. 11A and 11B provide a table that illustrates what happens when various parameters, features, or setup options are changed according to some implementations.

FIGS. 12A-12D identify some optimizations that are applied to a data flow graph in accordance with some implementations.

FIGS. 13A-13M-3 provide more details of one data visualization created using a data visualization compiler and a data visualization virtual machine, in accordance with some implementations.

Figure 1:
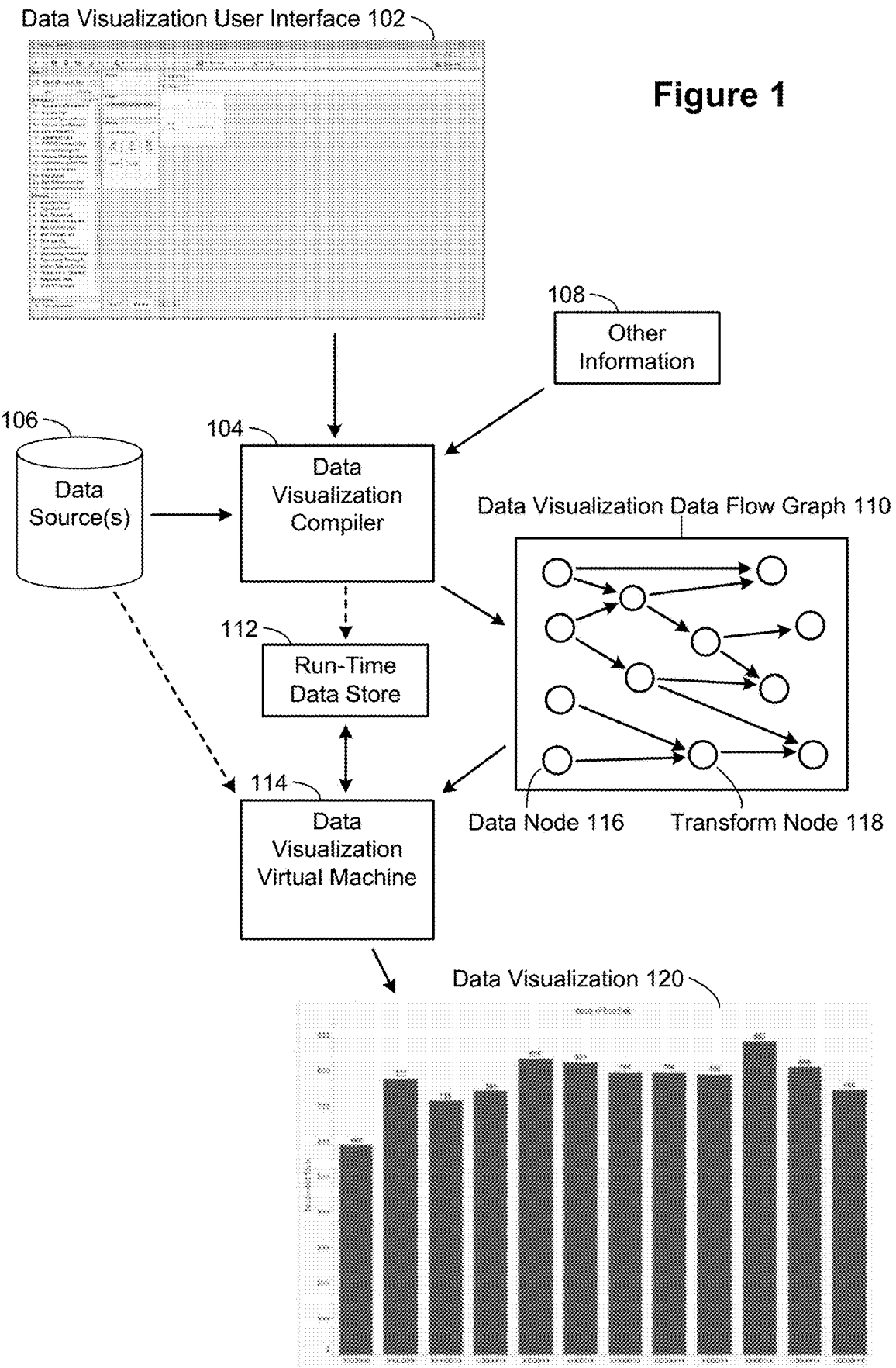
FIG. 1 illustrates conceptually a process of building a data flow graph and using a virtual machine to generate a data visualization corresponding to the data flow graph in accordance with some implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Disclosed implementations provide various benefits for interactive data analysis by providing a lightweight, portable runtime for computing visualizations with improved performance.

In order to display an interactive visualization, a data visualization application queries one or more databases and runs the retrieved data through a series of transformations. The transformations include densification, filtering, computing totals, forecasting, table calculations, various types of layout, annotations, figuring out legends, highlighting, and rendering. In many data visualization applications, the code that reasons about the model in order to figure out how to perform these transformations is tied together with the code that actually performs the transformations. The result is a large amount of code to generate a data visualization.

Disclosed implementations separate the code that reasons about the model and figures out the transformations from the code that performs the transformations. This results in a light weight runtime that is executed by a virtual machine to build and render a data visualization from its data inputs. This has multiple benefits.

One benefits is that a "do over" requires much less time. During interactive data analysis it is common for a user to modify some aspect of the desired data visualization (e.g. filtering, sorting, or changing other parameters). This is achieved by reapplying the transformations that were previously created rather than having to go through logic that reasons about the entire model again. These operations are sometimes referred to as "changes to input data" as opposed to "changes to the transformations".

Another benefit is that a small runtime runs well in a browser and can quickly recompute an entire dashboard when input data changes. In addition, the runtime knows all of the transformations and the dependencies between the transformation, so some implementations can limit the number of elements recomputed to those whose inputs have actually changed.

For a browser client, the data visualization virtual machine can provide fully interactive data visualizations without requiring roundtrips to a server.

Implementations also provide an offline mode (e.g., for a mobile client), which can respond to changes without requerying the data source. Some implementations implement this using a runtime data store, which is described in more detail below.

Because the transformations and their relationships are precompiled into the runtime, the runtime can provide faster updates when input data changes (e.g., on desktop and server clients).

Another benefit is server scalability. For some data visualization workbooks, the server can send fully interactive dashboards from the cache, which contains input data and transformations.

Incremental updates are another benefit of disclosed implementations. Rather than a complete "do-over" when anything changes, the runtime just redoes the subset of transformations that relate to the change in input without requiring specially targeted optimizations.

Another benefit of the disclosed implementations is a responsive browser user interface. Even with a relatively small amount of data, some dashboards can take a long time to compute. Keeping a single threaded JavaScript application responsive can thus be a challenge. When a dashboard comprises a large number of relatively small transformations (the runtime), some implementations time slice the activity and thus keep the user interface responsive.

FIG. 1 illustrates how some implementations build a data visualization data flow graph 110 (also referred to as a "data flow graph"), and then use a data visualization virtual machine 114 to build a data visualization 120 using the data flow graph 120. In some implementations, the starting point is a data visualization user interface 102, which enables a user to specify various characteristics of a desired data visualization. An example user interface 102 is provided in FIG. 4. Using the user interface, the user specifies the data sources 106. The subsequent display of a data visualization can also depend on other information 108, such as a style sheet.

The data visualization compiler 104 uses the visual specification 228, data and/or metadata from the data sources 106, and the other information 108 to build the data visualization data flow graph 110. The inputs to the data visualization compiler include a variety of sources, which determine the transformations specified in the data flow graph 110. In general, the sources can include: data from the database; a base sheet, which includes a style sheet and layout options; a visual specification, which specifies numerous parameters about the desired data visualization, including sorting and filtering; a dashboard specification, which includes zone layout and types; visual pages, panes, and user selection within the data visualization; other parameter values; bitmaps, map tiles, and other graphics such as icons; and window size and placement.

Some implementations use a run-time data store 112, which is distinct from the data sources 106. In some implementations, the run-time data store 112 is populated by the data visualization compiler 104 while building the data flow graph 110. The run-time data store is an organized data structure for data that will be used during the generation of the data visualization 120. The run-time data store is described in more detail below.

The generated data flow graph is a directed graph with data nodes 116 and transformation nodes 118, as described in more detail below. The data visualization virtual machine 114 traverses the data flow graph 110 to build the corresponding data visualization. In some implementations, the data visualization virtual machine 114 retrieves data from the data sources 106 according to some data nodes in the data flow graph 110. In some implementations, the virtual machine 114 reads the data it needs from the run-time data store 112. In either case, transformed data is stored to the run-time data store 112.

Figure 2:
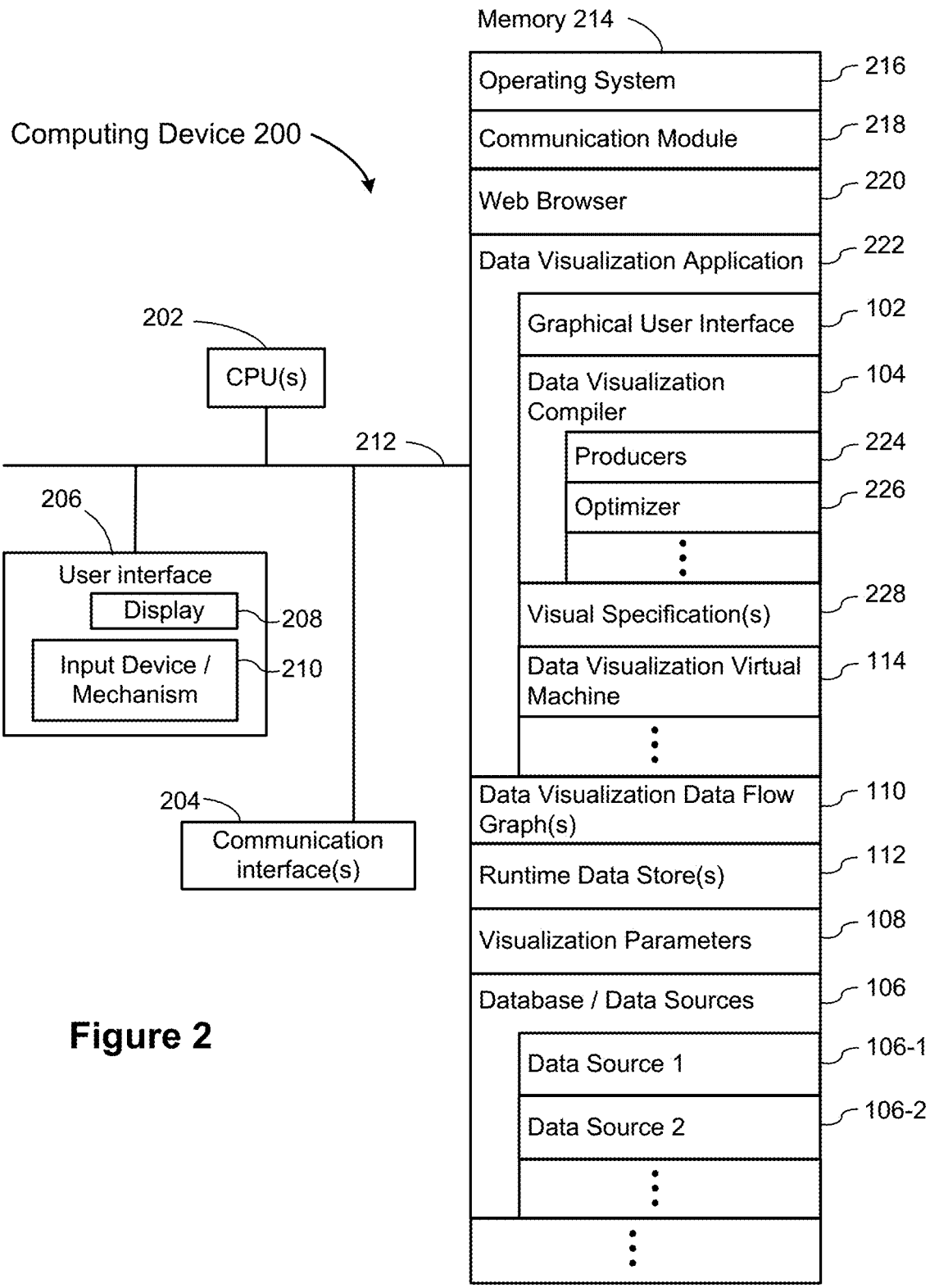
FIG. 2 is a block diagram of a computing device according to some implementations.

FIG. 2 is a block diagram illustrating a computing device 200 that can execute the data visualization compiler 104 and/or the data visualization virtual machine 114 to display a data visualization 120. A computing device may also display a graphical user interface 102 for the data visualization application 222. Computing devices 200 include desktop computers, laptop computers, tablet computers, and other computing devices with a display and a processor capable of running a data visualization application 222. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computing device 200 includes a user interface 206 comprising a display device 208 and one or more input devices or mechanisms 210. In some implementations, the input device/mechanism includes a keyboard; in some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on;

a web browser 220 (or other client application), which enables a user to communicate over a network with remote computers or devices;

a data visualization application 222, which provides a graphical user interface 102 for a user to construct visual graphics (e.g., an individual data visualization or a dashboard with a plurality of related data visualizations). In some implementations, the data visualization application 222 executes as a standalone application (e.g., a desktop application). In some implementations, the data visualization application 222 executes within the web browser 220 (e.g., as a web application 322);

a data visualization compiler 104, which reads in various sources of information that define a data visualization, and builds data flow graphs 110 that efficiently encode processes for building and rendering data visualizations. In some implementations, the data visualization compiler includes a plurality of producers 224, which read the source inputs (e.g., visual specification, data sources, and other information) to build the nodes of the data flow graph 110. In some implementations, each producer handles a different type of input data (e.g., one producer handles the data sources, a second producer handles data mark type and location, a third product handles filters, and so on). In some implementations, the data visualization compiler 104 includes an optimizer, which manipulates a data flow graph 110 in various ways so that the virtual machine 114 can process the graph more quickly;

visual specifications 228, which are used to define characteristics of a desired data visualization. In some implementations, a visual specification 228 is built using the user interface 102;

a data visualization virtual machine 114, which renders a data visualization 120 by traversing a data flow graph 110, as described in more detail below;

one or more data flow graphs 110, which are directed graphs containing data nodes and transform nodes, which specify how to render a data visualization;

one or more run time data stores 112, which store data for use by the virtual machine 114. Typically, each distinct data flow graph 110 has its own distinct run time data store 112;

visualization parameters 108, which contain information used by the data visualization compiler 104 other than the information provided by the visual specifications 228 and data sources 106;

zero or more databases or data sources 106 (e.g., a first data source 106-1 and a second data source 106-2), which are used by the data visualization application 222. In some implementations, the data sources can be stored as spreadsheet files, CSV files, XML files, flat files, or as tables in a relational database.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 may store a subset of the modules and data structures identified above. Furthermore, the memory 214 may store additional modules or data structures not described above.

Although FIG. 2 shows a computing device 200, FIG. 2 is intended more as functional description of the various features that may be present rather than as a structural schematic of the implementations described herein. In practice, and as recognized by those of ordinary skill in the art, items shown separately could be combined and some items could be separated.

Figure 3:
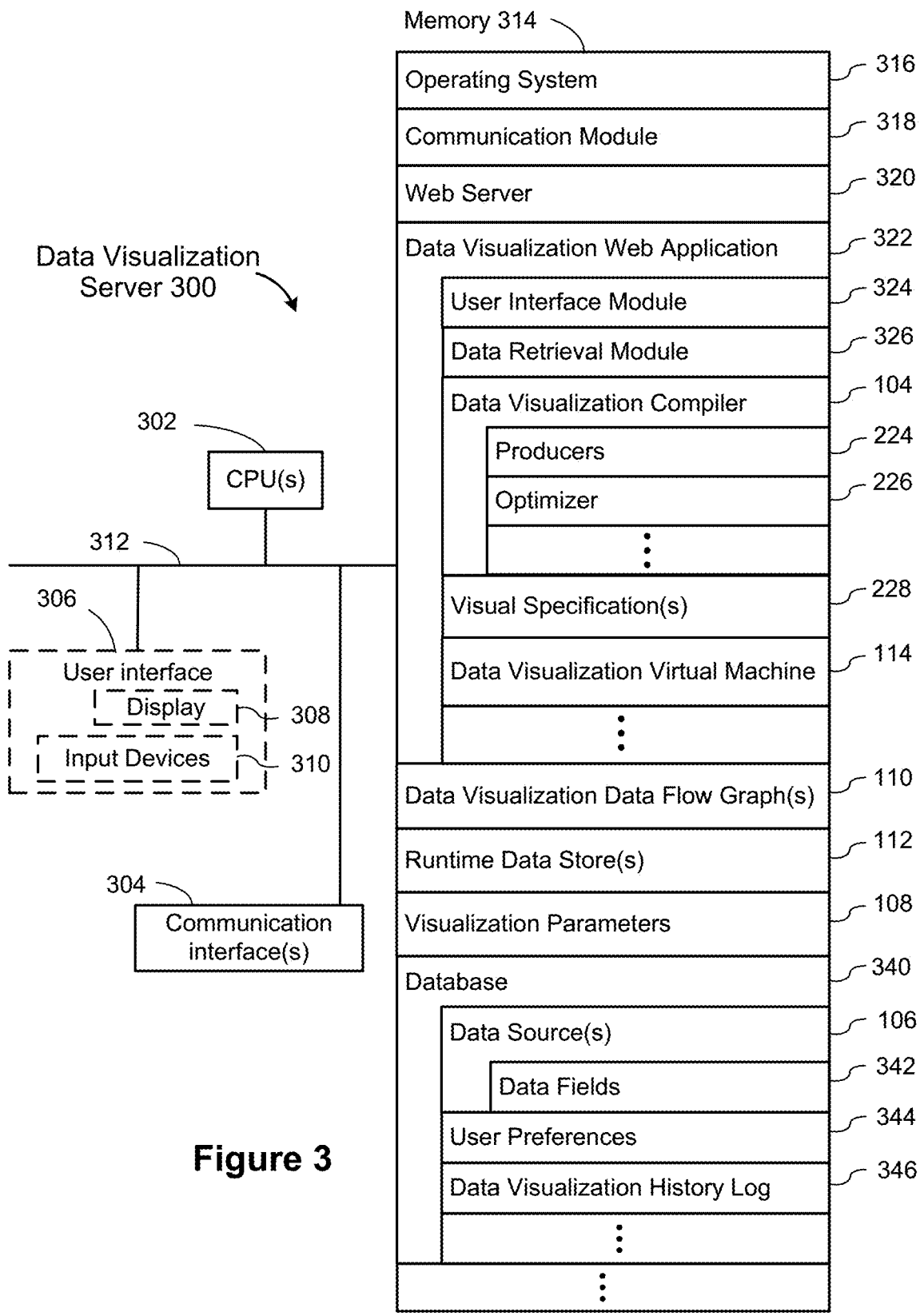
FIG. 3 is a block diagram of a data visualization server according to some implementations.

FIG. 3 is a block diagram of a data visualization server 300 in accordance with some implementations. A data visualization server 300 may host one or more databases 340 or may provide various executable applications or modules. A server 300 typically includes one or more processing units/cores (CPUs) 302, one or more network interfaces 304, memory 314, and one or more communication buses 312 for interconnecting these components. In some implementations, the server 104 includes a user interface 306, which includes a display device 308 and one or more input devices 310, such as a keyboard and a mouse. In some implementations, the communication buses 312 may include circuitry (sometimes called a chipset) that interconnects and controls communications between system components.

In some implementations, the memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within the memory 314, comprises a non-transitory computer readable storage medium.

In some implementations, the memory 314 or the computer readable storage medium of the memory 314 stores the following programs, modules, and data structures, or a subset thereof:

an operating system 316, which includes procedures for handling various basic system services and for performing hardware dependent tasks;

a network communication module 318, which is used for connecting the server 300 to other computers via the one or more communication network interfaces 304 (wired or wireless) and one or more communication networks, such as the Internet, other wide area networks, local area networks, metropolitan area networks, and so on;

a web server 320 (such as an HTTP server), which receives web requests from users and responds by providing responsive web pages or other resources;

a data visualization web application 322, which may be downloaded and executed by a web browser 220 on a user's computing device 200. In general, a data visualization web application 322 has the same functionality as a desktop data visualization application 222, but provides the flexibility of access from any device at any location with network connectivity, and does not require installation and maintenance. In some implementations, the data visualization web application 322 includes various software modules to perform certain tasks. In some implementations, the web application 322 includes a user interface module 324, which provides the user interface for all aspects of the web application 322. In some implementations, the web application includes a data retrieval module 326, which builds and executes queries to retrieve data from one or more data sources 106. The data sources 106 may be stored locally on the server 300 or stored in an external database 340. In some implementations, data from two or more data sources may be blended. In some implementations, the data retrieval module 326 uses a visual specification 228 to build the queries. In some implementations, the data visualization web application 322 includes a data visualization compiler 104, and a data visualization virtual machine 114. These software modules are described above with respect to FIG. 2, and are described in more detail below;

one or more data flow graphs 110, run time data stores 112, and/or visualization parameters 108, as described above with respect to FIG. 2; and one or more databases 340, which store data used or created by the data visualization web application 322 or data visualization application 222. The databases 340 may store data sources 106, which provide the data used in the generated data visualizations. In some implementations, the databases 340 store user preferences 344, which may be used as input by the data visualization compiler 104. In some implementations, the databases 340 include a data visualization history log 346. In some implementations, the history log 346 tracks each time the data visualization compiler 104 builds or updates a data flow graph 110. In some implementations, the history log tracks each time the virtual machine 114 runs to render a data visualization.

The databases 340 may store data in many different formats, and commonly includes many distinct tables, each with a plurality of data fields 342. Some data sources comprise a single table. The data fields 342 include both raw fields from the data source (e.g., a column from a database table or a column from a spreadsheet) as well as derived data fields, which may be computed or constructed from one or more other fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields 342 are stored separately from the data source 106. In some implementations, the database 340 stores a set of user preferences 344 for each user. The user preferences may be used when the data visualization web application 322 (or application 222) makes recommendations about how to view a set of data fields 342. In some implementations, the database 340 stores a data visualization history log 346, which stores information about each data visualization generated. In some implementations, the database 340 stores other information, including other information used by the data visualization application 222 or data visualization web application 322. The databases 340 may be separate from the data visualization server 300, or may be included with the data visualization server (or both).

In some implementations, the data visualization history log 346 stores the visual specifications selected by users, which may include a user identifier, a timestamp of when the data visualization was created, a list of the data fields used in the data visualization, the type of the data visualization (sometimes referred to as a "view type" or a "chart type"), data encodings (e.g., color and size of marks), the data relationships selected, and what connectors are used. In some implementations, one or more thumbnail images of each data visualization are also stored. Some implementations store additional information about created data visualizations, such as the name and location of the data source, the number of rows from the data source that were included in the data visualization, version of the data visualization software, and so on.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 may store a subset of the modules and data structures identified above. Furthermore, the memory 314 may store additional modules or data structures not described above.

Although FIG. 3 shows a data visualization server 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 300 may be stored or executed on a computing device 200. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically colocated (e.g., the individual physical devices could be spread throughout the United States or throughout the world).

Figure 4:
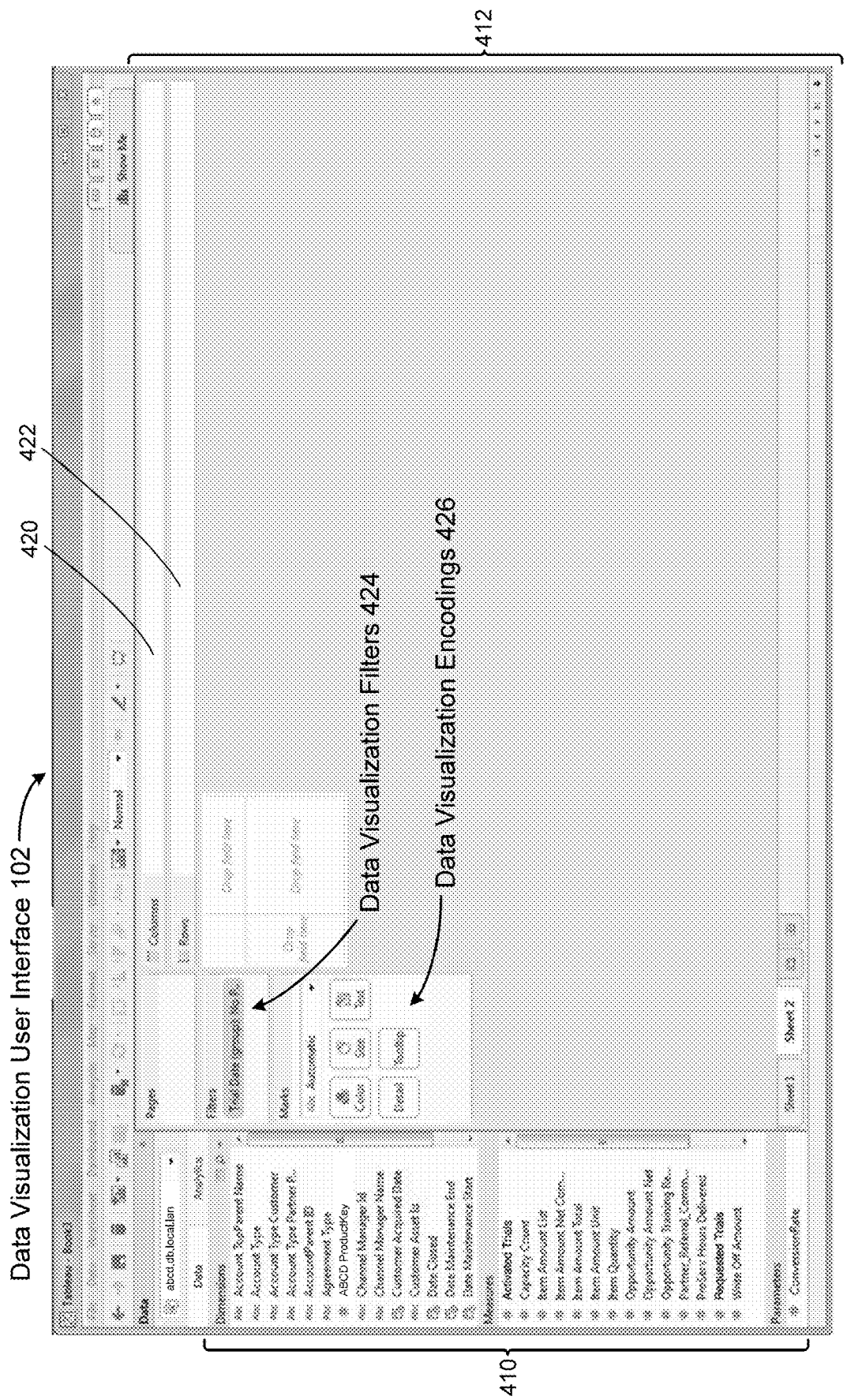
FIG. 4 provides an example data visualization user interface according to some implementations.

FIG. 4 shows a data visualization user interface 102 in accordance with some implementations. The user interface 102 includes a schema information region 410, which is also referred to as a data pane. The schema information region 410 provides named data elements (field names) that may be selected and used to build a data visualization. In some implementations, the list of field names is separated into a group of dimensions and a group of measures (typically numeric quantities). Some implementations also include a list of parameters. The graphical user interface 102 also includes a data visualization region 412. The data visualization region 412 includes a plurality of shelf regions, such as a columns shelf region 420 and a rows shelf region 422. These are also referred to as the column shelf 420 and the row shelf 422. As illustrated here, the data visualization region 412 also has a large space for displaying a visual graphic. Because no data elements have been selected yet, the space initially has no visual graphic.

A user selects one or more data sources 106 (which may be stored on the computing device 200 or stored remotely), selects data fields from the data source(s), and uses the selected fields to define a visual graphic. In some implementations, the information the user provides is stored as a visual specification 228. The data visualization application 222 includes a data visualization virtual machine 114, which takes a data flow graph 110, and renders a corresponding visual graphic (data visualization) 120. The data visualization application 222 displays the generated graphic in the data visualization region 412.

Figure 5A:
FIGS. 5A-5G illustrate various data visualizations that may be generated by a data visualization virtual machine using a data visualization data flow graph according to some implementations.
Figure 5B:
Figure 5C:
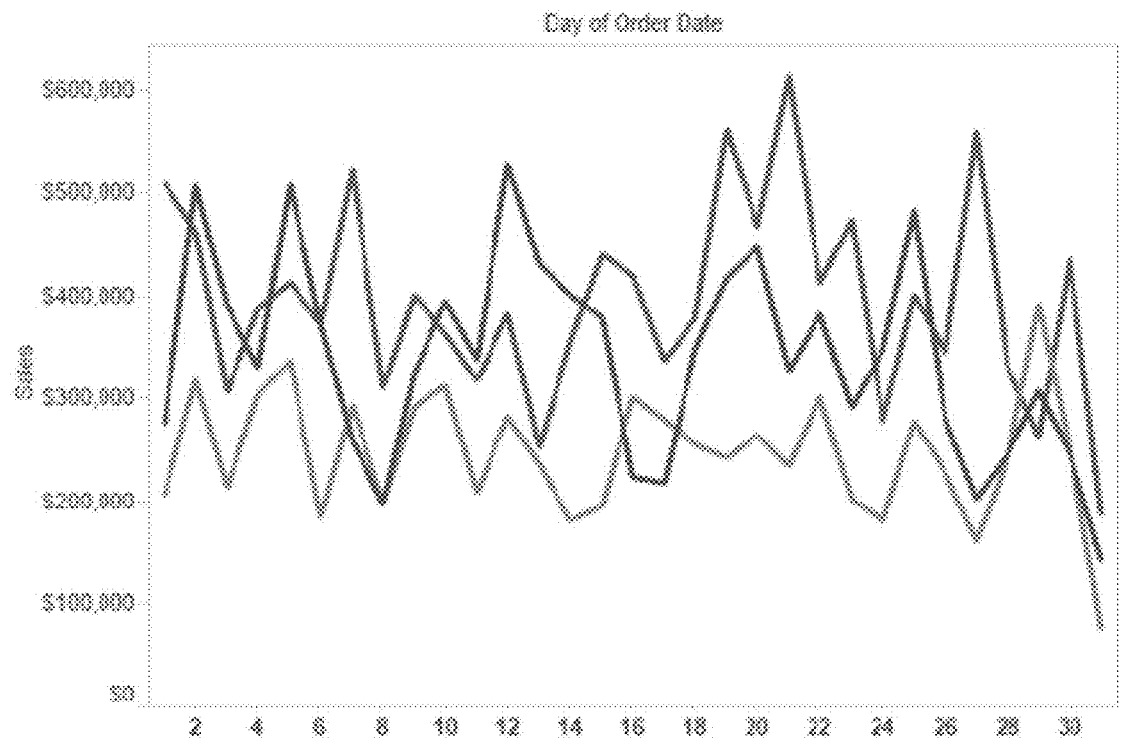
Figure 5D:
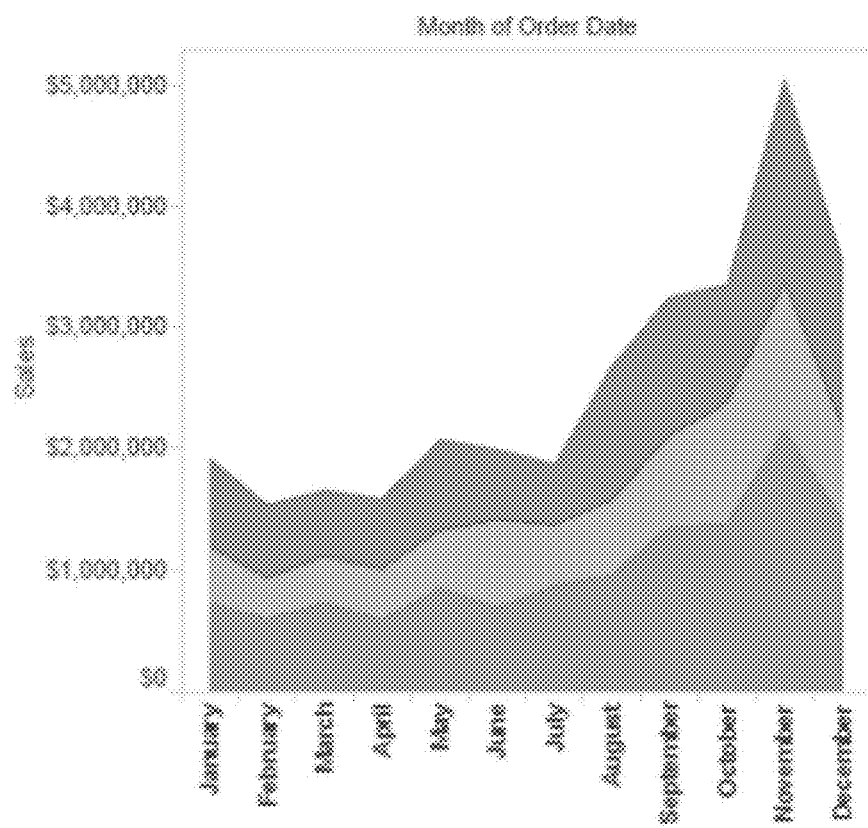
Figure 5E:
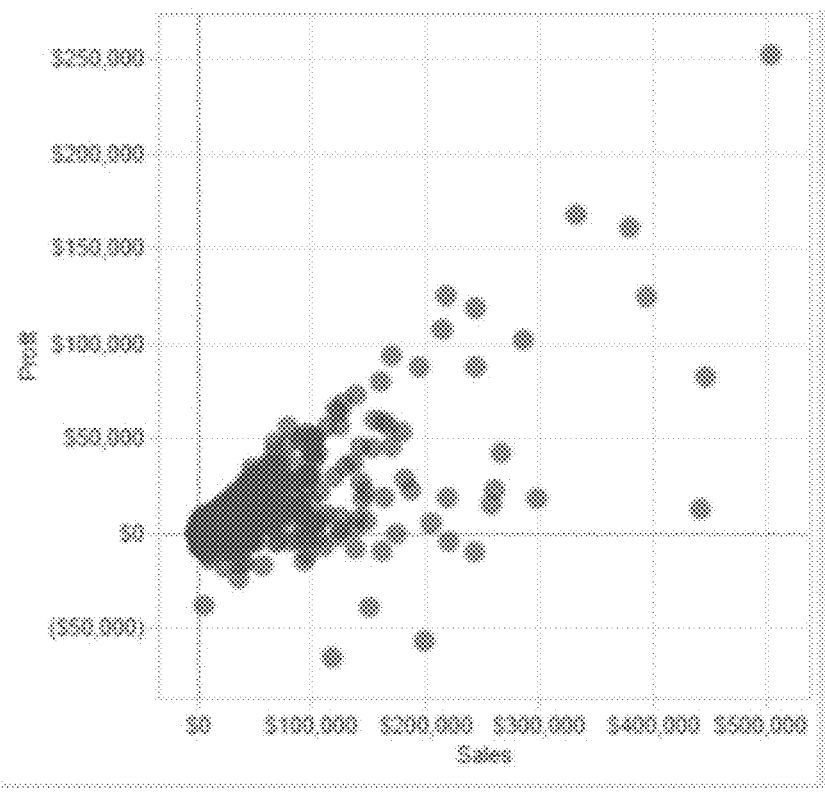
Figure 5F:
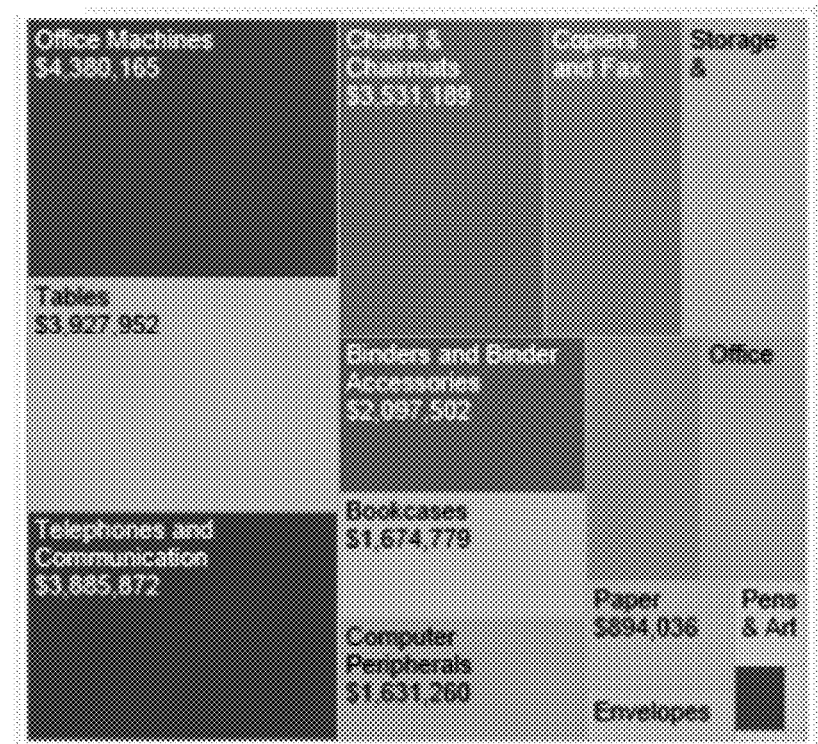
Figure 5G:
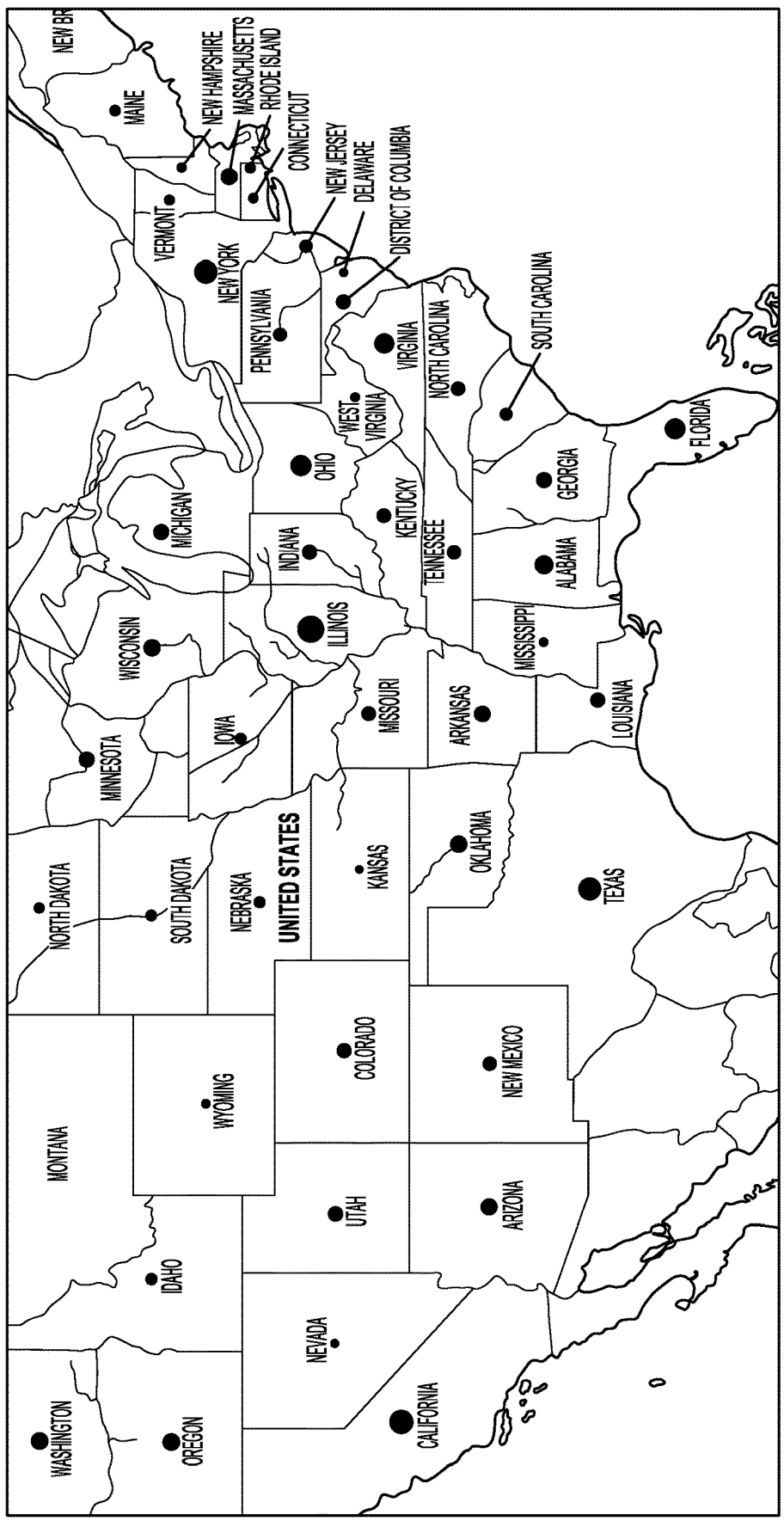

The data visualization compiler 104 and data visualization virtual machine 114 can work with a wide variety of data visualizations 120, as illustrated in FIGS. 5A-5G. FIGS. 5A and 5B illustrate two bar chart data visualization 120 that can be rendered by the data visualization virtual machine 114 in some implementations. FIGS. 5C and 5D illustrate line charts and filled line charts that can be rendered by the data visualization virtual machine 114 in some implementations. FIG. 5E illustrates a scatter plot data visualization that can be rendered by the data visualization virtual machine 114 in some implementations. FIG. 5F illustrates a treemap data visualization 120 that can be rendered by the data visualization virtual machine 114 in some implementations. And FIG. 5G illustrates a map data visualization 120 that can be rendered by the data visualization virtual machine 114 in some implementations.

Figure 5H:
FIGS. 5H-5J illustrate various analytic features that may be generated by a data visualization virtual machine using a data visualization data flow graph according to some implementations.
Figure 5I:
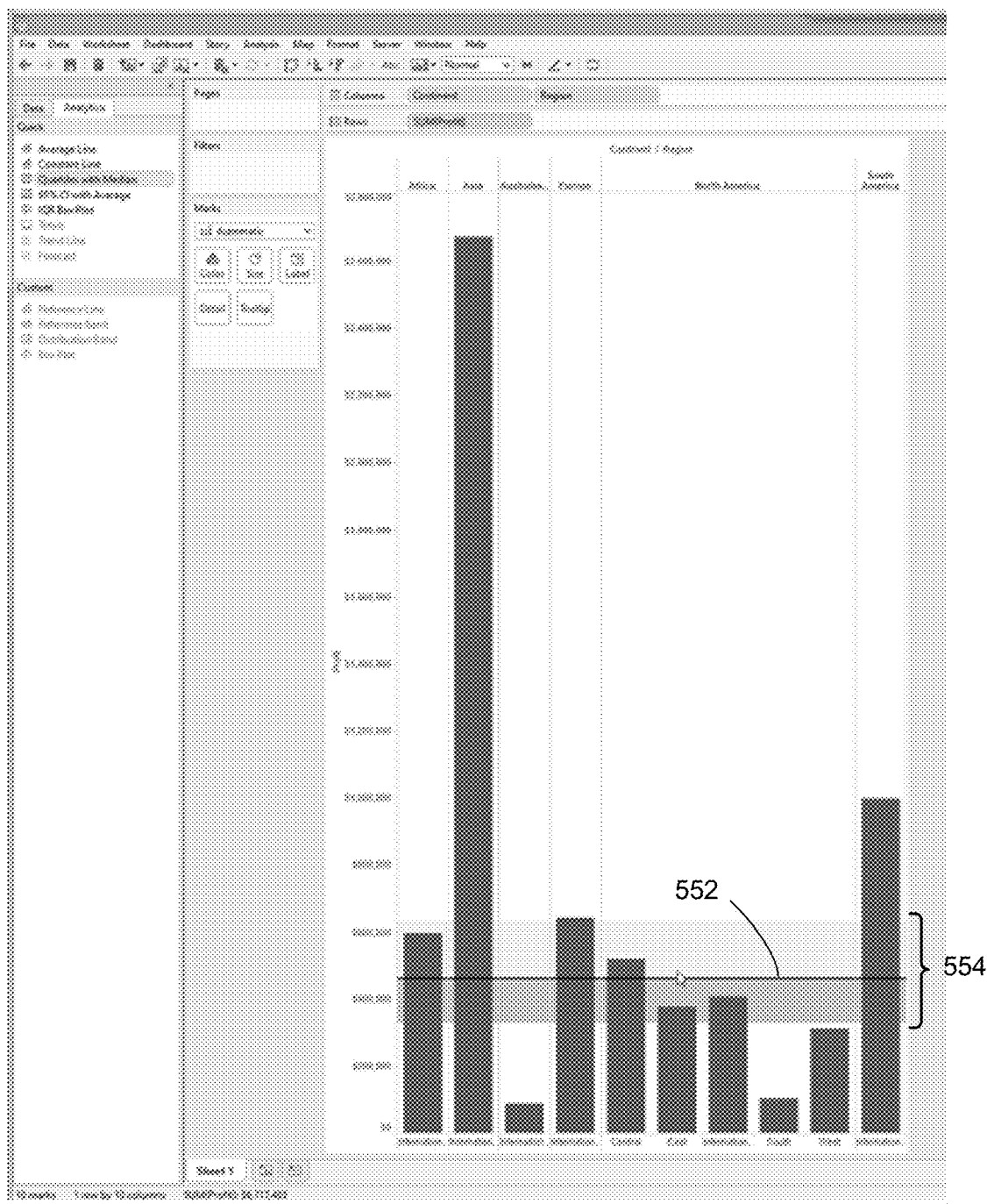
Figure 5J:
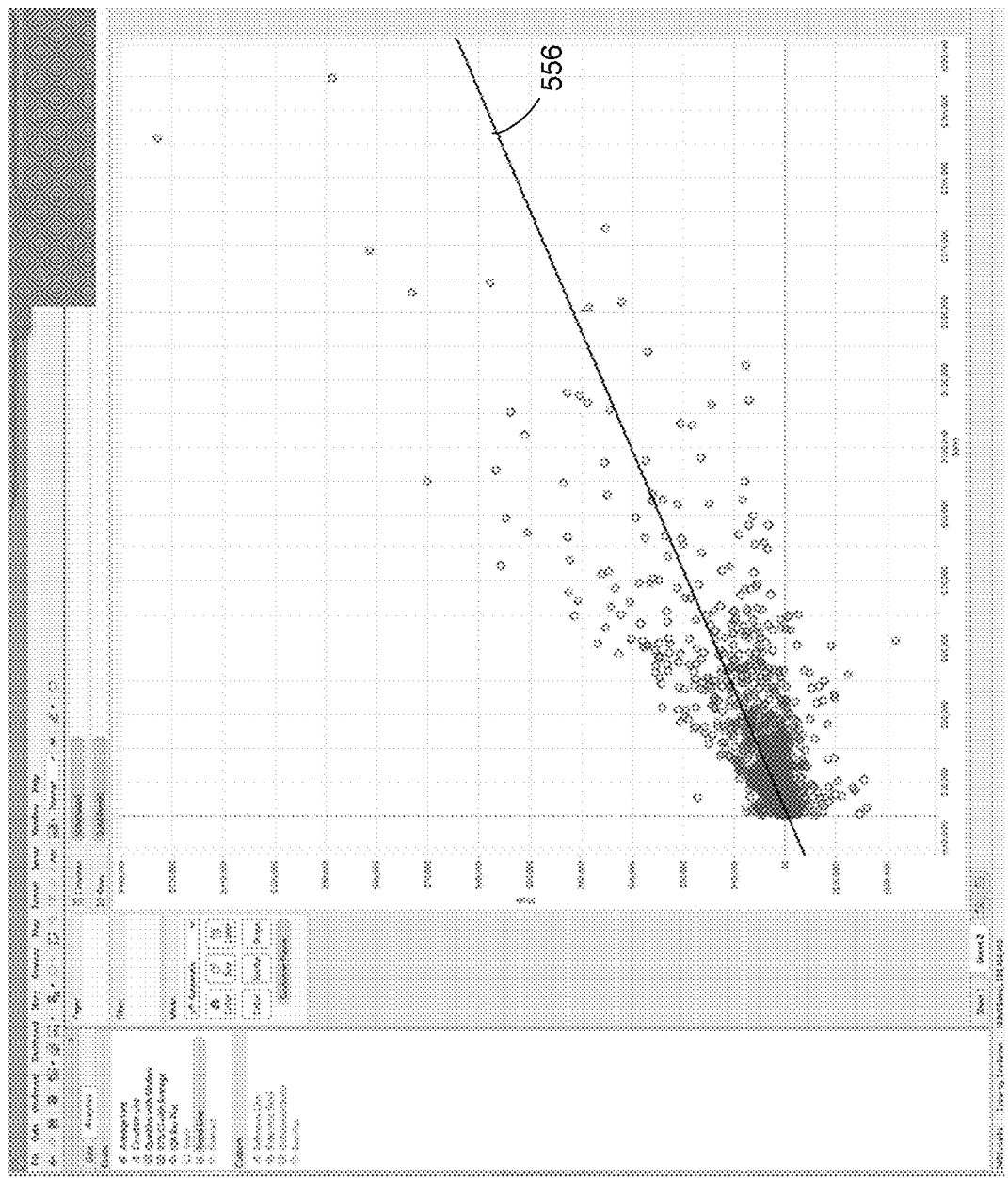
Figure 6A:
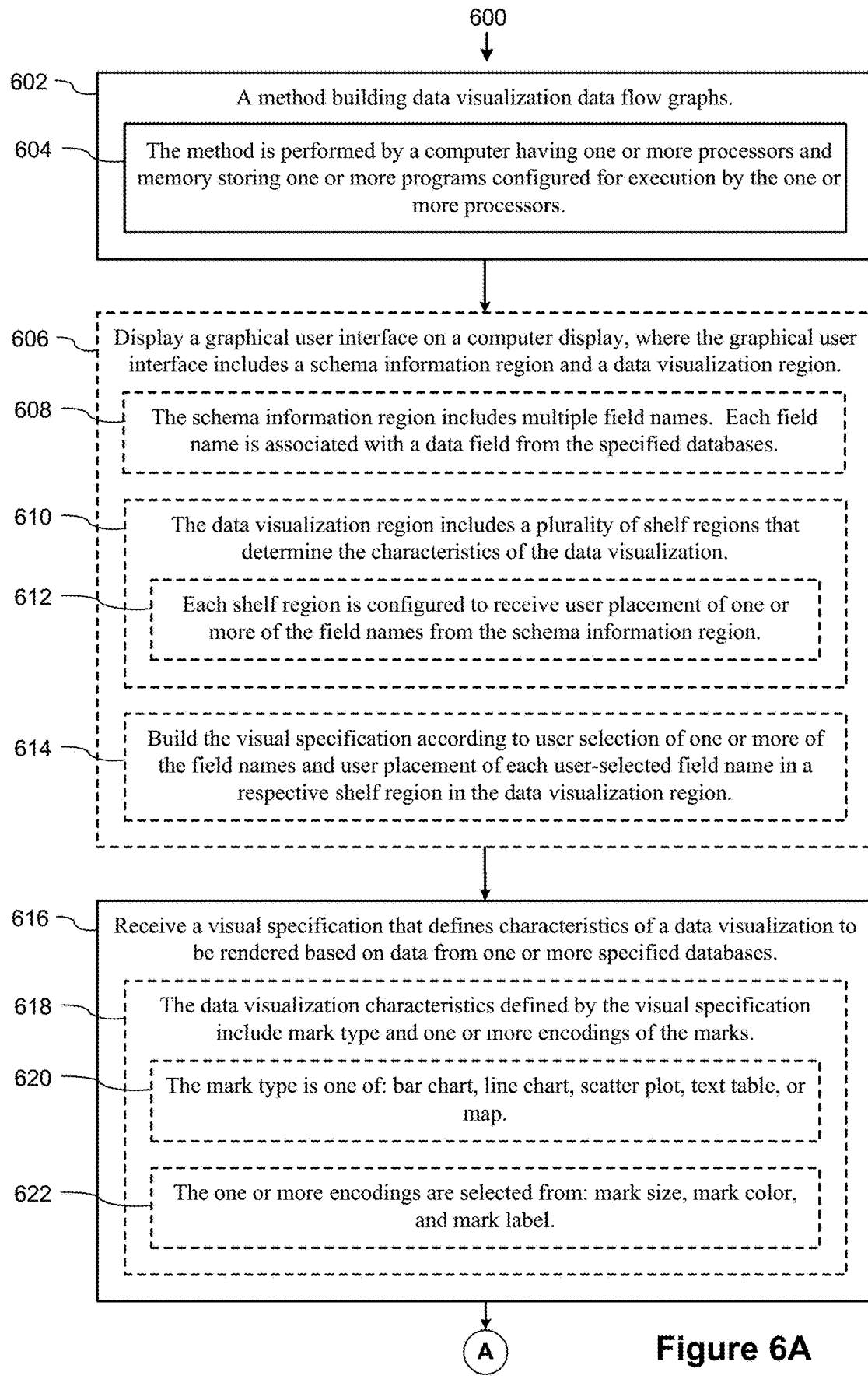
FIGS. 6A-6E provide a process flow for building a data visualization data flow graph according to some implementations.
Figure 6B:
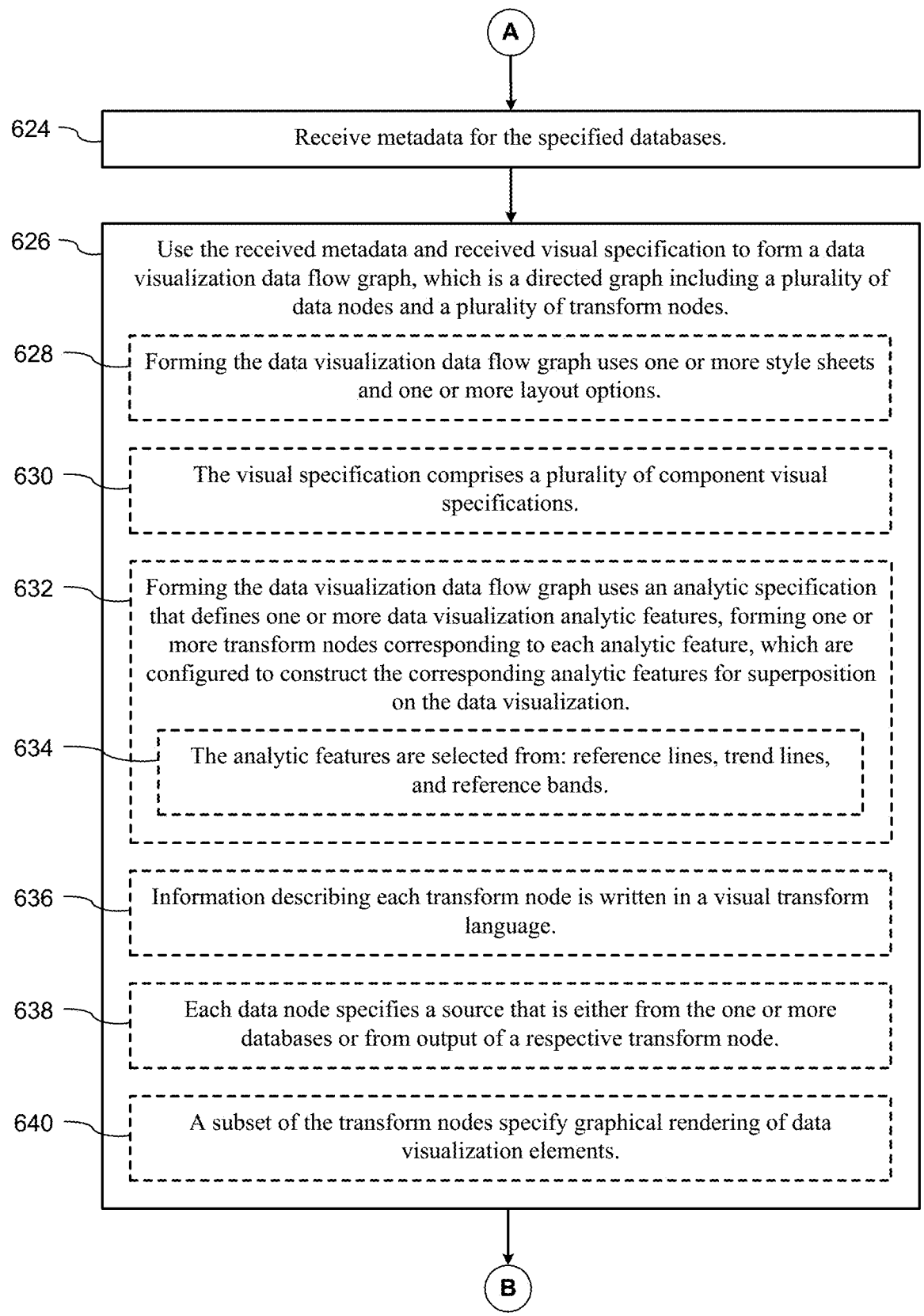
Figure 6C:
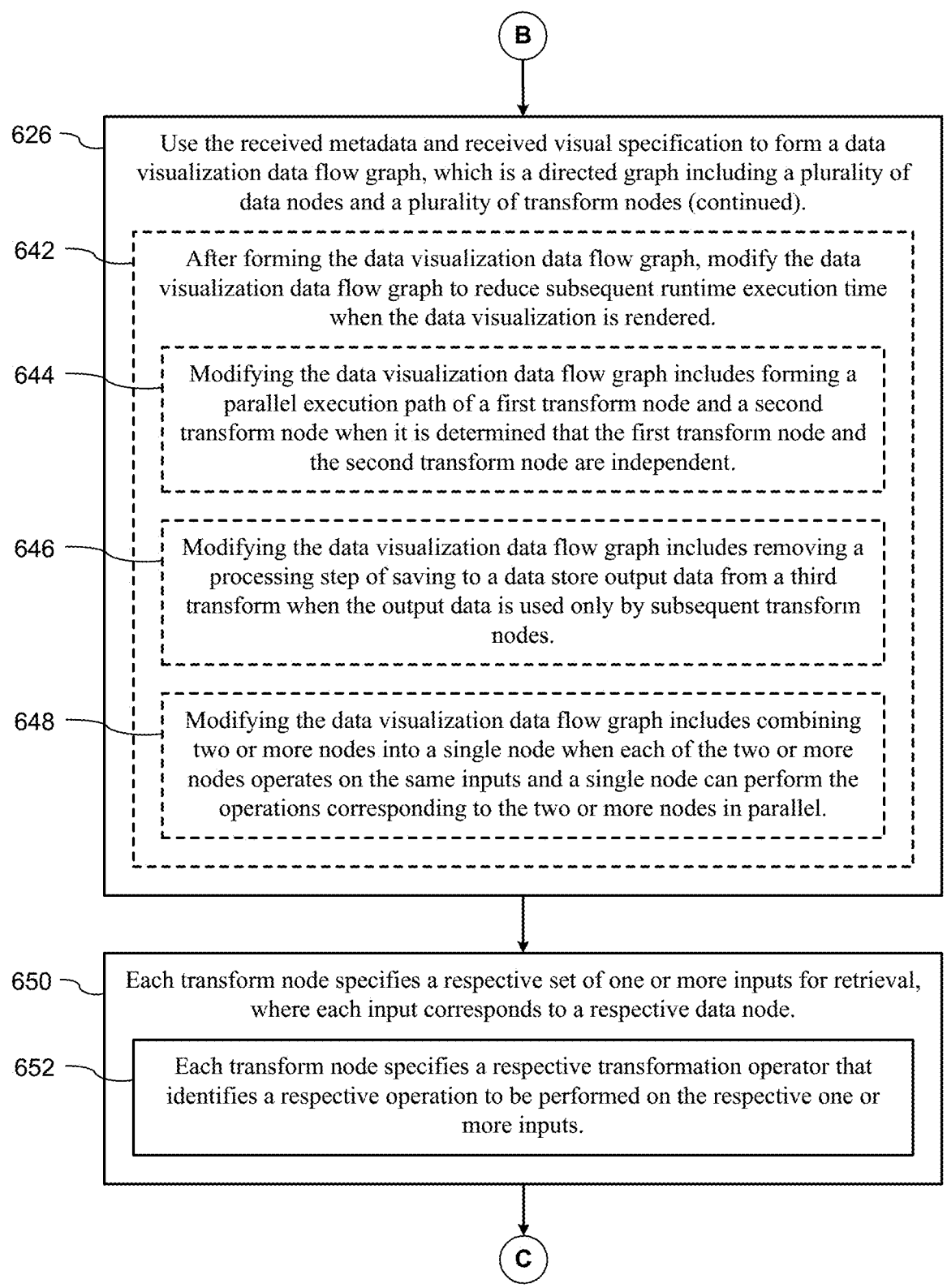
Figure 6D:
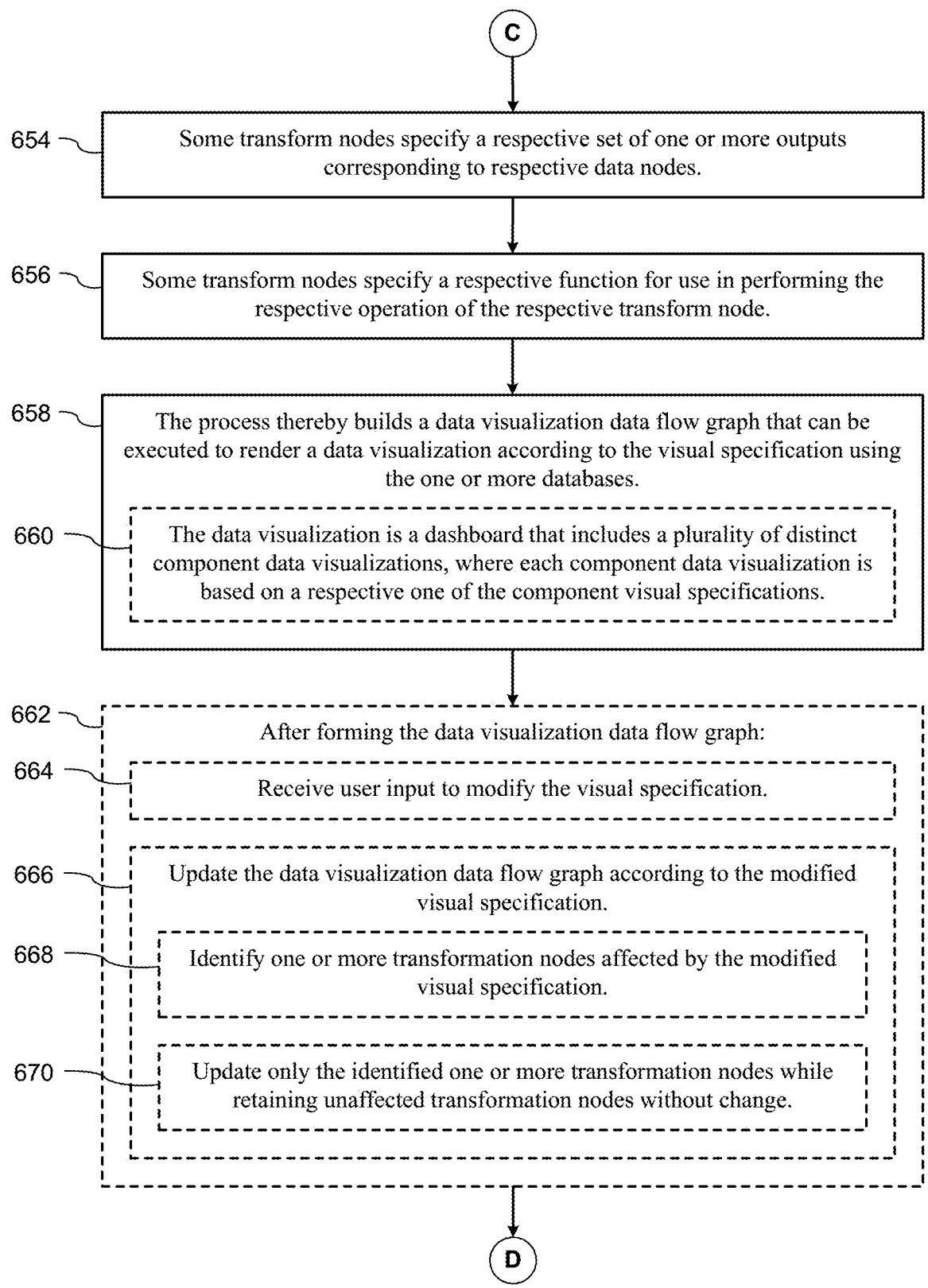
Figure 6E:
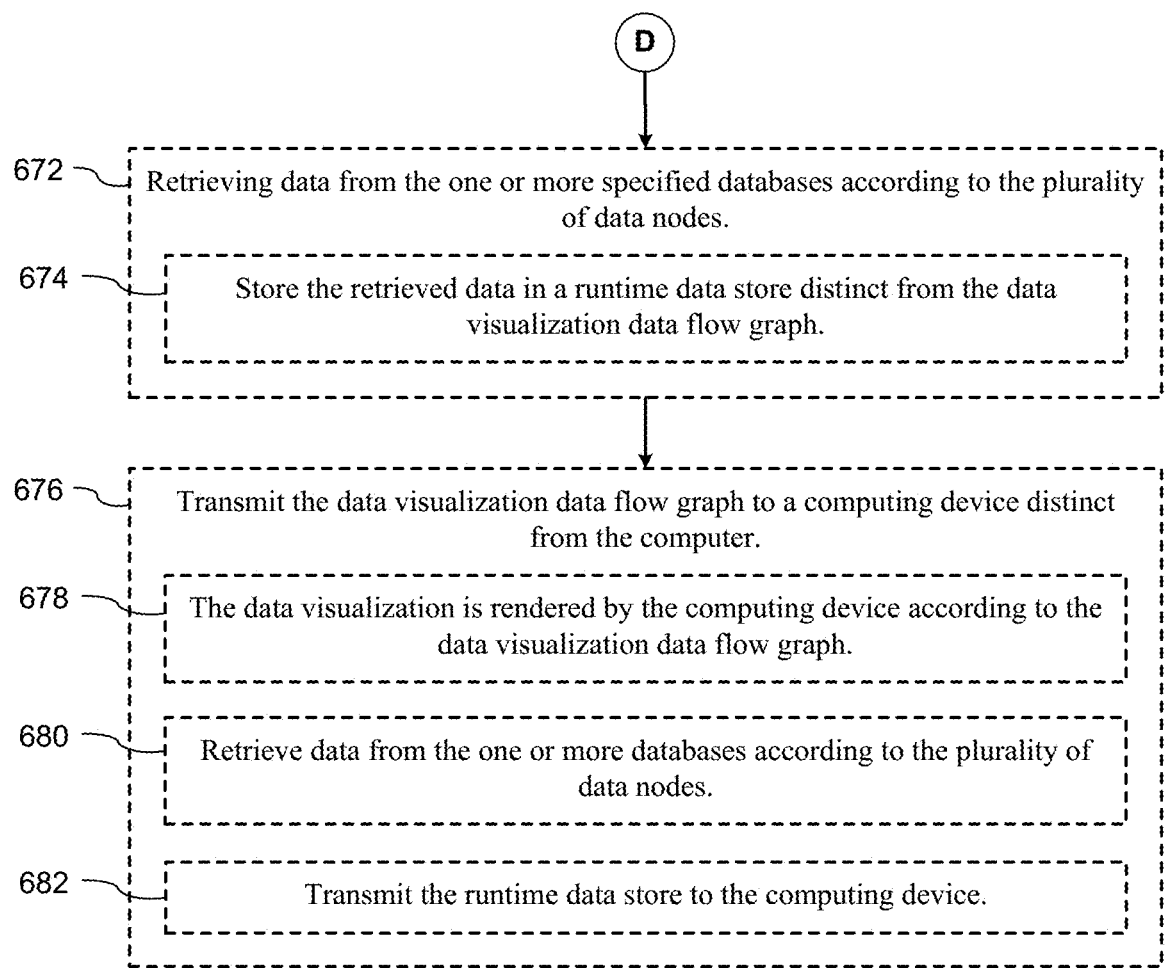
Figure 7A:
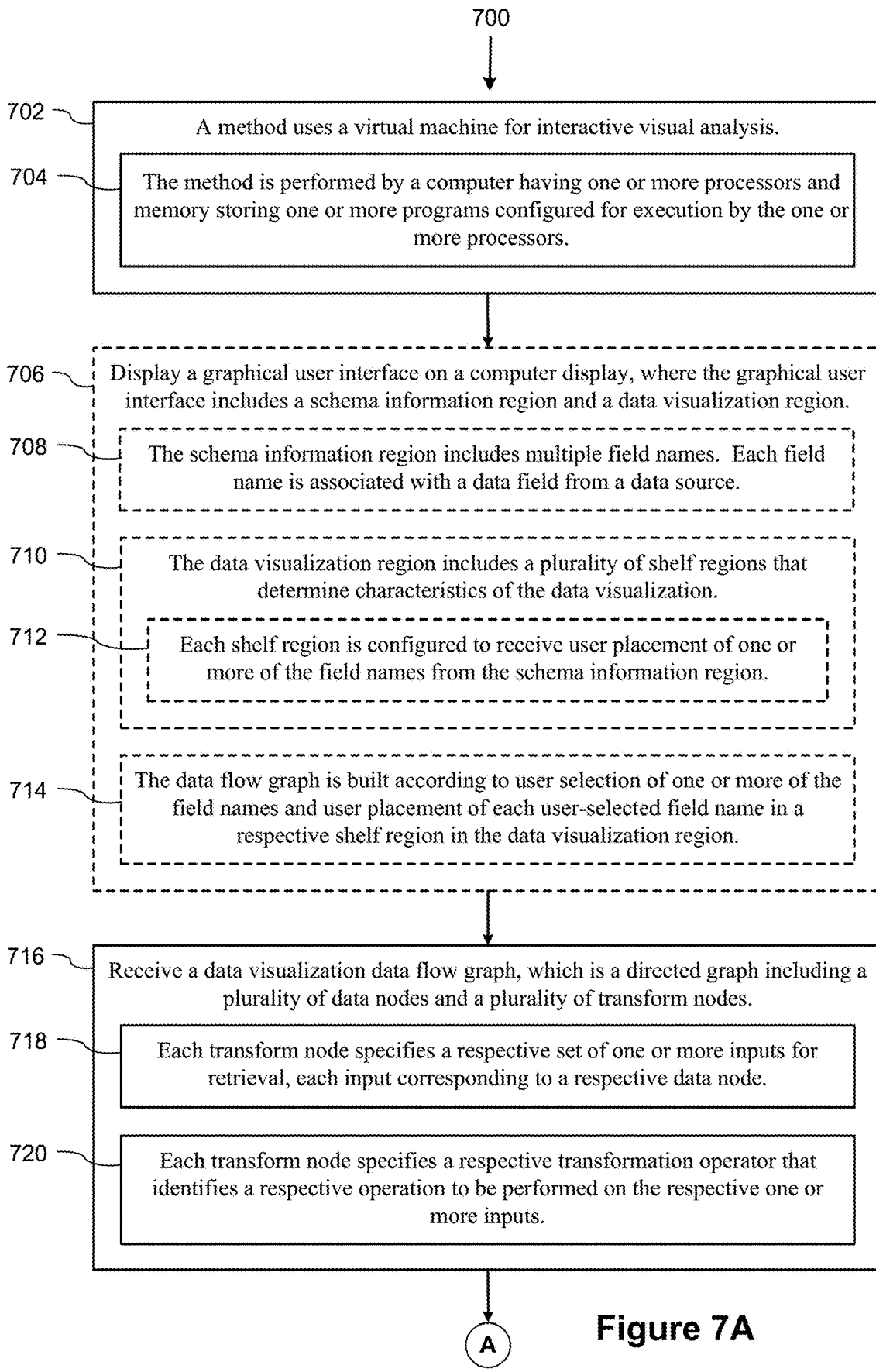
FIGS. 7A-7D provide a process flow for a data visualization virtual machine to generate a data visualization using a data visualization data flow graph according to some implementations.
Figure 7B:
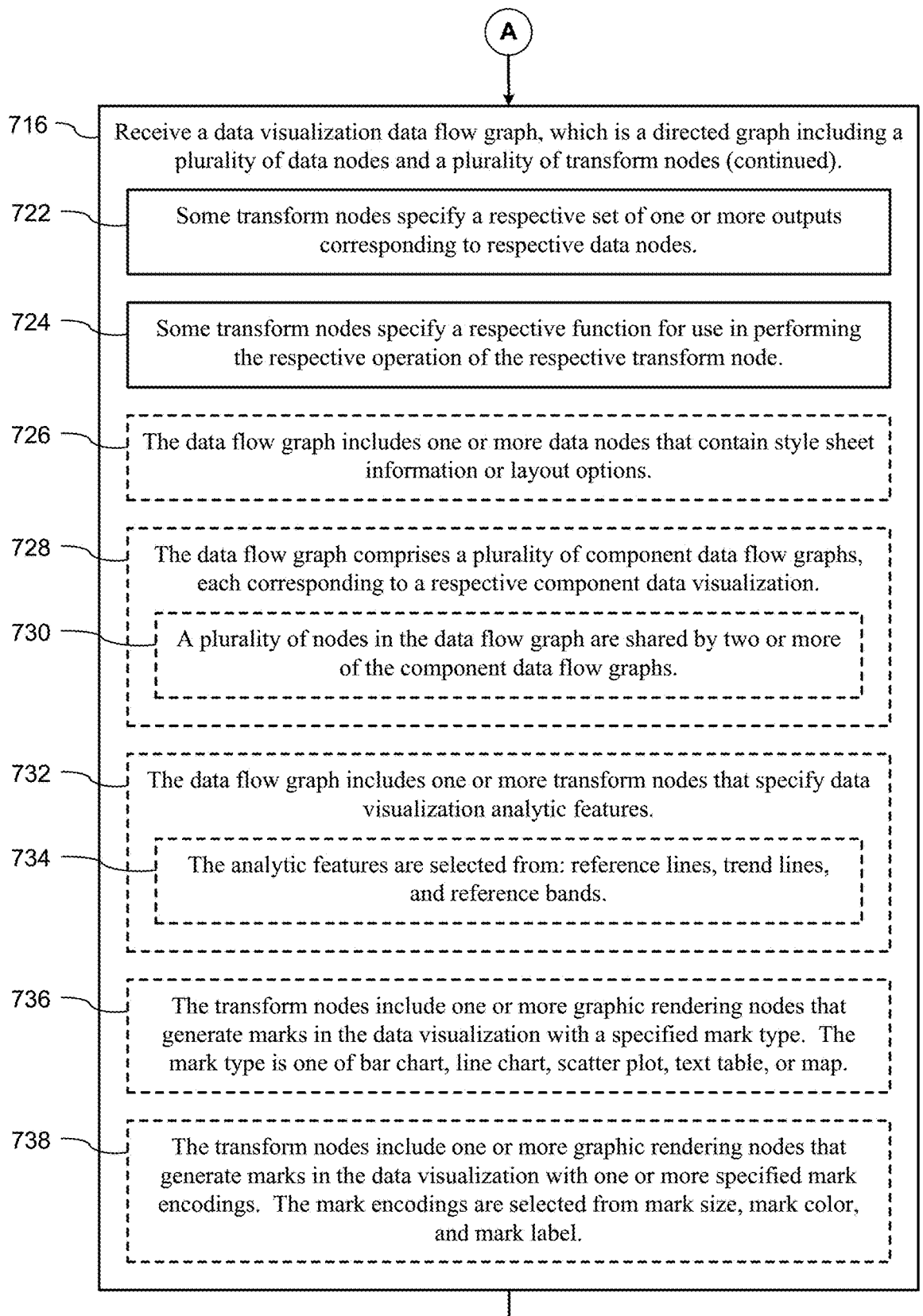
Figure 7C:
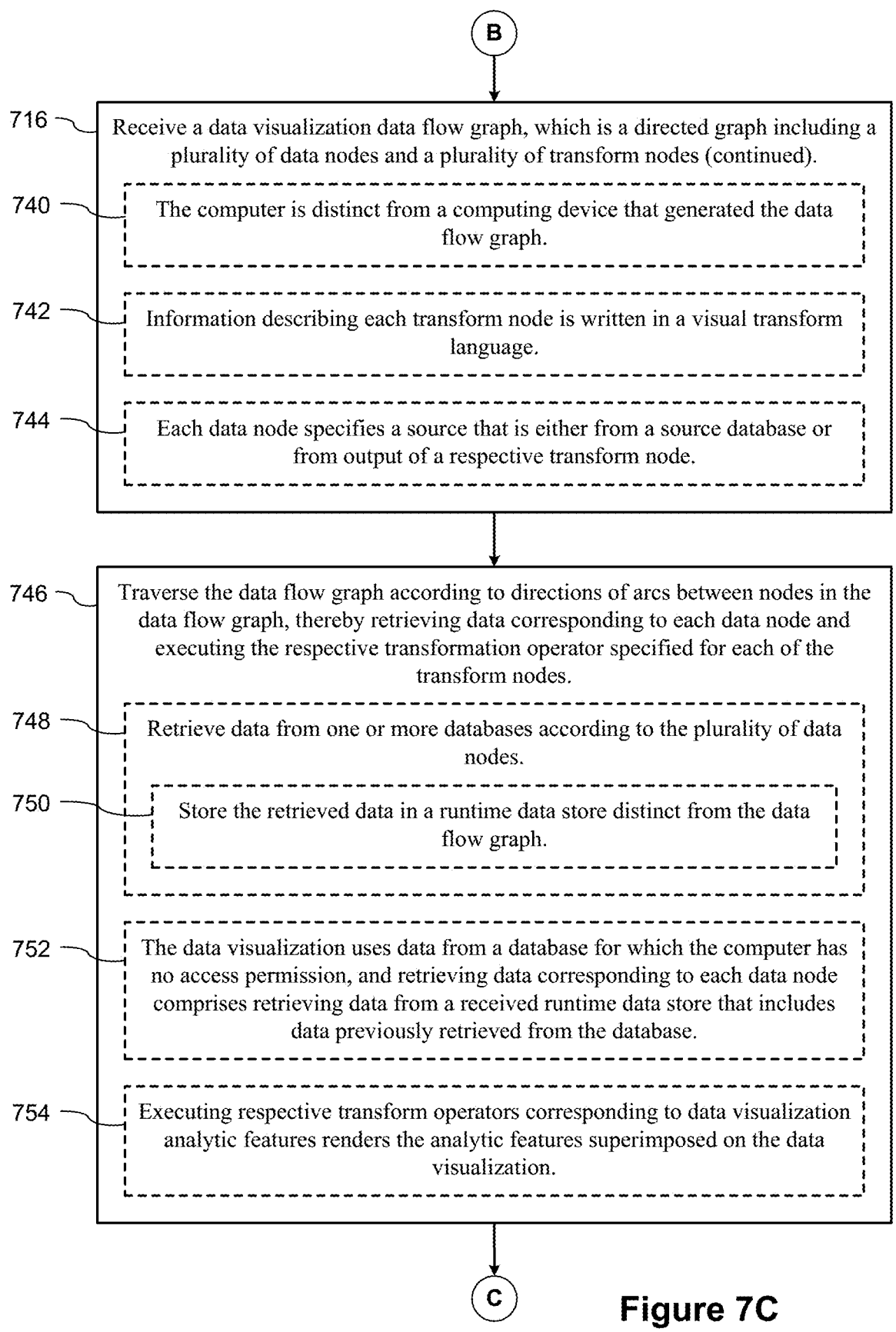
Figure 7D:
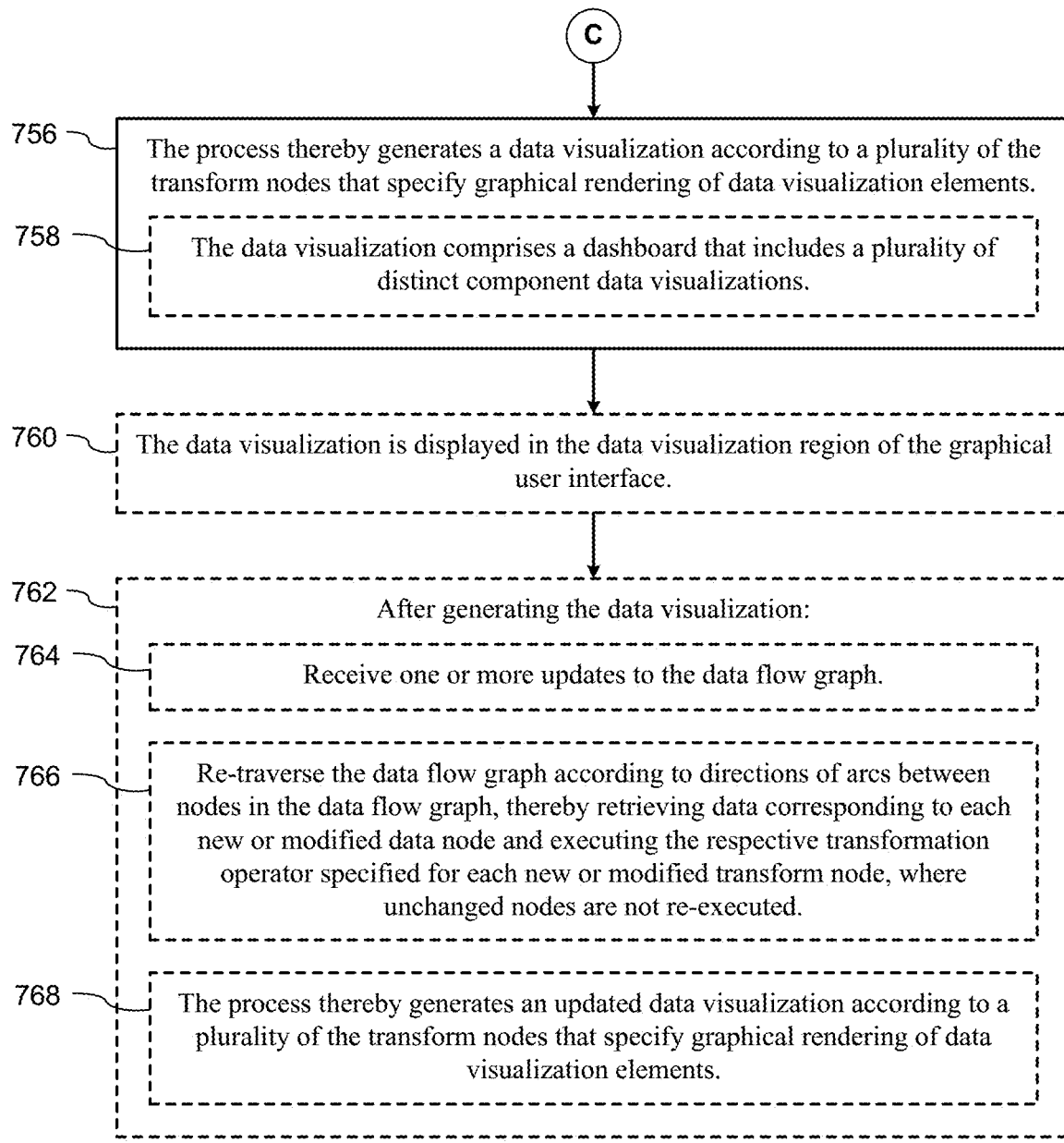

FIGS. 5H-5J illustrate that data flow graphs 110 can also include information to generate analytic features for data visualizations. FIG. 5H illustrates a fixed reference line 550, which can be rendered by the data visualization virtual machine 114 in some implementations. FIG. 5I illustrates an average line 552 and confidence bands 554, which can be rendered by the data visualization virtual machine 114 in some implementations. FIG. 5J illustrates a trend line 556, which can be rendered by the data visualization virtual machine 114 in some implementations. Trend "lines" can be fitted using various models, including linear (as in FIG. 5J), polynomial, exponential, logarithmic, sinusoidal, and so on.

FIGS. 6A-6E provide a process flow 600 for building (602) data visualization data flow graphs 110 according to some implementations. The process 600 is performed (604) by a computer having one or more processors and memory storing one or more programs configured for execution by the one or more processors, as illustrated in FIGS. 2 and 3 above.

Some implementations display (606) a graphical user interface 102 on a computer display, where the graphical user interface includes a schema information region 410 and a data visualization region 412, as illustrated in FIG. 4. The schema information region 410 includes (608) multiple field names. Each field name is associated (608) with a data field from the specified databases. In some implementations, the data visualization region 412 includes (610) a plurality of shelf regions (e.g., shelf regions 420, 422, 424, and 426) that determine characteristics of the data visualization. Each shelf region is configured (612) to receive user placement of one or more of the field names from the schema information region 410. Some implementations build (614) a visual specification 228 according to user selection of one or more of the field names and user placement of each user-selected field name in a respective shelf region in the data visualization region.

The process receives (616) a visual specification 228 that defines characteristics of a data visualization to be rendered based on data from one or more specified databases 106. In some implementations, the data visualization characteristics defined by the visual specification 228 include (618) mark type and one or more encodings of the marks. In some implementations, the mark type is (620) one of: bar chart, line chart, scatter plot, text table, or map. Various mark types are illustrated above in FIGS. 5A-5G. In some implementations, the one or more encodings are selected (622) from: mark size, mark color, and mark label. Although mark encodings can be useful to display more information visually, mark encodings are an optional feature. The process also receives (624) metadata for the specified databases 106.

The data visualization compiler 104 uses (626) the received metadata and received visual specification to form a data visualization data flow graph 110, which is a directed graph including a plurality of data nodes 116 and a plurality of transform nodes 118. In some implementations, the data visualization compiler 104 forms (628) the data visualization data flow graph 110 using various visualization parameters 108, such as one or more style sheets and/or one or more layout options.

In some implementations, the visual specification comprises (630) a plurality of component visual specifications. For example, a dashboard may include multiple individual data visualizations, each having its own visual specification. In this scenario, the "visual specification" for the dashboard includes the visual specifications for each of the component data visualizations.

In some instances, a user chooses to include various analytic features in a data visualization 120, as illustrated in FIGS. 5H-5J above. In this scenario, some implementations form (632) the data visualization data flow graph 110 using an analytic specification that defines the desired data visualization analytic features. The data visualization compiler 104 forms (632) one or more transform nodes corresponding to each analytic feature, which are configured to construct the corresponding analytic features for superposition on the data visualization. In some implementations, the analytic features are selected (634) from: reference lines, trend lines, and reference bands.

The data flow graph 110 has a plurality of data nodes 116 and a plurality of transform nodes 118. In some implementations, information describing each transform node 118 is written (636) in a visual transform language (VTL). A sample VTL is described below. In these implementations, the VTL information is subsequently interpreted by the virtual machine 114 to render the data visualization 120. In some implementations, a subset of the transform nodes specify (640) graphical rendering of data visualization elements. That is, some transform nodes produce the actual data visualization rendering, whereas other transform nodes produce data that is used by other transform nodes.

In some implementations, each data node 116 specifies (638) a source that is either from the one or more databases 106 or from output of a respective transform node 118.

Some implementations create data flow graphs 110 that include only transform nodes. In some of these implementations, there are "transform nodes" that retrieve data from a data source 106 (or from the run-time data store). In these implementations, each transform node retrieves the data it needs, and if the data is not in the run-time data store, the transform node retrieves it from the appropriate data source.

In some implementations, after forming the data visualization data flow graph 110, the optimizer 226 modifies (642) the data visualization data flow graph 110 to reduce subsequent runtime execution time when the data visualization is rendered. In some implementations, modifying the data visualization data flow graph includes (644) forming a parallel execution path of a first transform node and a second transform node when it is determined that the first transform node and the second transform node are independent. For example, the virtual machine 114 can execute multiple threads simultaneously, so identifying which transform nodes can execute in parallel can reduce the overall processing time.

In some implementations, modifying the data visualization data flow graph 110 includes (646) removing a processing step of saving output data to a data store 112 when the output data is used only by subsequent transform nodes (e.g., keep the output data in memory for a next transform node).

In some implementations, modifying the data visualization data flow graph 110 includes (648) combining two or more nodes into a single node when each of the two or more nodes operates on the same inputs and a single node can perform the operations corresponding to the two or more nodes in parallel. For example, one transform node computes a sum of a set of data values and another transform node computes the maximum of the same set of data values, the two nodes can be combined, resulting in a single scan through the set of values.

Each transform node specifies (650) a respective set of one or more inputs for retrieval, where each input corresponds to a respective data node. In addition, each transform node specifies (652) a respective transformation operator that identifies a respective operation to be performed on the respective one or more inputs. Examples of transformation operators are provided below. Some transform nodes specify (654) a respective set of one or more outputs corresponding to respective data nodes.

Some transform nodes 118 specify (656) a respective function for use in performing the respective operation of the respective transform node. For example, if the input to a transform node 118 is an array of values, a specified function may be applied to each of the input values to create a corresponding array of output values. As a specific example, if the array of input values are numbers, the function could be "multiply by 2," resulting in an output array whose values are double the input values.

In this way, the data visualization compiler 104 builds (658) a data visualization data flow graph 110 that can be executed to render a data visualization 120 according to the visual specification 228 using the one or more databases 106. In some cases, the data visualization 120 is (660) a dashboard that includes a plurality of distinct component data visualizations, where each component data visualization is based on a respective one of the component visual specifications.

Implementations provide an application 222 (or web application 322) for interactive visual analysis of a data set, and thus a user commonly changes what data is being viewed or how the data is viewed. Therefore, it is common to "redo" a generated data flow graph 110. For example, after forming (662) the data visualization data flow graph 110, the process receives (664) user input to modify the visual specification (e.g., using the user interface 102). In response to receiving the updated visual specification 228, the data visualization compiler 104 updates the data visualization data flow graph 110 according to the modified visual specification. In some instances, updating the data flow graph 110 includes (666) identifying one or more transformation nodes affected by the modified visual specification, and updating (670) only the identified one or more transformation nodes while retaining unaffected transformation nodes without change. Because the specific changes are known and the dependencies are known, the data visualization compiler rebuilds the data flow graph 110 efficiently.

In some implementations, the data used by the virtual machine 114 will be retrieved dynamically while building the data visualization. In other implementations, the data visualization compiler retrieves (672) data from the one or more specified databases according to the plurality of data nodes and stores (674) the retrieved data in a runtime data store distinct from the data visualization data flow graph 110.

In some implementations, the process 600 transmits (676) the data visualization data flow graph 110 to a computing device distinct from the computer that generates the data flow graph 110. In some implementations, data retrieved and stored in a runtime data store 112 is transmitted (682) to the computing device along with the data flow graph 110. The data visualization 120 is subsequently rendered (678) by the computing device according to the data visualization data flow graph 110. In some implementations, the computing device retrieves (680) data from the one or more databases 106 according to the plurality of data nodes 116 in the data flow graph 110.

FIGS. 7A-7D provide a process flow 700 for a data visualization virtual machine 114 to generate a data visualization 120 using a data visualization data flow graph 110 according to some implementations. The process 700 uses (702) virtual machine 114 for interactive visual analysis of a data set. The process 700 is performed (704) by a computer having one or more processors and memory storing one or more programs configured for execution by the one or more processors.

Some implementations display (706) a graphical user interface 102 on a computer display, where the graphical user interface includes a schema information region 410 and a data visualization region 412, as illustrated in FIG. 4. The schema information region 410 includes (708) multiple field names. Each field name is associated (708) with a data field from the specified databases. In some implementations, the data visualization region 412 includes (710) a plurality of shelf regions (e.g., shelf regions 420, 422, 424, and 426) that determine characteristics of the data visualization. Each shelf region is configured (712) to receive user placement of one or more of the field names from the schema information region 410. In some implementations, the data flow graph 110 is built (714) according to user selection of one or more of the field names and user placement of each user-selected field name in a respective shelf region in the data visualization region.

The data visualization virtual machine 114 receives (716) a data visualization data flow graph 110, which is a directed graph including a plurality of data nodes 116 and a plurality of transform nodes 118. Each transform node 118 specifies (718) a respective set of one or more inputs for retrieval, each input corresponding to a respective data node 116. Each transform node 118 specifies (720) a respective transformation operator that identifies a respective operation to be performed on the respective one or more inputs. Transform operators, and how they are applied is described in more detail below.

Some of the transform nodes 118 specify (722) a respective set of one or more outputs corresponding to respective data nodes. Some implementations include transform nodes have no direct output; these transform nodes are executed for their "side effects." Some transform nodes 118 specify (724) a respective function for use in performing the respective operation of the respective transform node. The usage of transform operators and functions (and the difference between the two) is described below. In general, the operator defines the basic operation of the transform node, whereas a function is applied to individual input values.

In some implementations, the data flow graph (110) includes (726) one or more data nodes 116 that contain other information 108, such as style sheet information or layout options.

In some implementations, the data flow graph (110) comprises (728) a plurality of component data flow graphs, each corresponding to a respective component data visualization. For example, a dashboard may include two or more separate data visualizations. In some implementations, the data visualization compiler initially generates a separate data flow graph 110 for each of the component data visualizations, then combines the data flow graphs 110 into a single data flow graph 110 that has the information for all of the component data visualizations. In some instances, some nodes in the combined data flow graph 110 are shared by two or more of the component data flow graphs. In some instances, a plurality of the nodes in the combined data flow graph 110 are shared (730) by two or more of the component data flow graphs.

In some implementations, the data flow graph 110 includes (732) one or more transform nodes 118 that specify data visualization analytic features, such as the analytic features illustrated in FIGS. 5H-5J. In some implementations, the analytic features are selected (734) from: reference lines, trend lines, and reference bands.

A data flow graph 110 includes some nodes for graphic rendering (i.e., actually rendering the desired data visualization). In some implementations, the transform nodes 118 include (736) one or more graphic rendering nodes that generate marks in the data visualization with a specified mark type. In some implementations, the mark type is (736) one of bar chart, line chart, scatter plot, text table, or map. In some implementations, the transform nodes 118 include (738) one or more graphic rendering nodes that generate marks in the data visualization with one or more specified mark encodings. In some implementations, the mark encodings are selected (738) from mark size, mark color, and mark label.

In some instances, the computer that executes the virtual machine 114 is (740) distinct from a computing device that generated the data flow graph 110. In some implementations, information describing each transform node is written (742) in a visual transform language. In some implementations, each data node specifies (744) a source that is either from a source database or from output of a respective transform node.

The virtual machine 114 traverses (746) the data flow graph 110 according to directions of arcs between nodes in the data flow graph. The virtual machine thereby retrieves (746) data corresponding to each data node 116 and executes (746) the respective transformation operator specified for each of the transform nodes 118. A "traversal" typically includes multiple processing threads executing in parallel, which results in completing the traversal more quickly. Nodes that are independent of each other can be processed independently. In a traversal, all of the inputs to a node must be processed before the node itself is processed. In some implementations, the data visualization compiler 104 identifies traversal threads, and saves the traversal threads as part of the data flow graph 110. Then at runtime, the virtual machine 114 uses the traversal threads specified in the data flow graph 110.

In some implementations, during the traversal the virtual machine 114 retrieves (748) data from one or more databases 106 according to the plurality of data nodes 116. The virtual machine 114 then stores (750) the retrieved data in a runtime data store 112 distinct from the data flow graph 110. In some implementations, at least some of the data is retrieved from the runtime data store 112 rather than from the databases 106.

In some implementations, the data visualization 120 uses (752) data from a database 106 for which the computer has no access permission. In this case, retrieving data corresponding to each data node comprises (752) retrieving data from a received runtime data store that includes data previously retrieved from the database 106.

In some implementations, executing respective transform operators corresponding to data visualization analytic features renders (754) the analytic features superimposed on the data visualization. Some analytic features are illustrated in FIGS. 5H-5J.

In this way, the process 700 generates (756) a data visualization according to a plurality of the transform nodes 118 that specify graphical rendering of data visualization elements. In some instances, the data visualization 120 is (758) a dashboard that includes a plurality of distinct component data visualizations. In some implementations, the data visualization 120 is displayed (760) in the data visualization region 412 of the graphical user interface 102.

Implementations provide an application 222 (or web application 322) for interactive visual analysis of a data set, and thus a user commonly changes what data is being viewed or how the data is viewed. Therefore, it is common to "redo" a generated data flow graph 110. For example, after generating (762) the data visualization, the virtual machine 114 sometimes receives (764) one or more updates to the data flow graph 110. The virtual machine 114 then re-traverses (766) the data flow graph 110 according to directions of arcs between nodes in the updated data flow graph. The virtual machine thus retrieves (766) data corresponding to each new or modified data node 116. The virtual machine executes (766) the respective transformation operator specified for each new or modified transform node, and executes transform nodes whose input data has changed. Unchanged nodes are not re-executed (766). In this way, the process 700 generates (768) an updated data visualization according to a plurality of the transform nodes that specify graphical rendering of data visualization elements. The overhead for creating the updated data visualization is limited to those data nodes 116 and transform nodes 118 that must be re-evaluated.

According to some implementations, creating a dashboard involves a variety of operations, including operations performed in an interpreter pipeline and operations for layout out the dashboard. In some implementations, the operations of a data interpreter include densification (e.g., adding data marks to fill out a view), local data joins, calculated fields, local filters, totals, forecasting, table calculations, and hiding data.

In some implementations, the operations of a partition interpreter include partitioning data into panes, sorting, and partitioning data into pages. In some implementations, the operations of an analytic interpreter include constructing trend lines, reference lines, and reference bands.

In some implementations, the operations of a visual interpreter include laying out views such as marks (stacked bars, tree maps, bubbles, etc.), mark labels, zero lines background lines/bands, axes, and headers. A visual interpreter may also lay out annotations, compute legends, and encode marks (e.g., color, shape, or size). Some implementations include a brush interpreter.

In some implementations, the operations of a visualization support interpreter include legends (quantitative & categorical), quick filters, parameter controls, page controls, and map legends.

In some implementations, the operations for dashboard layout include simple layouts, flow containers (e.g., using feedback from sizing of legends, quick filters, visualizations, etc.), and miscellaneous zones (e.g., text, title, bitmap, and web).

In some implementations, a data visualization includes an interpreter pipeline, which uses input such as the visual specification and a style sheet and determines how to render the corresponding data visualization 120. A dashboard layout module uses input such as the zone collection and the style sheet, and determines how to render the dashboard.

In the disclosed implementations, these pipelines record the transformations necessary to render rather than actually performing the transformations. These pipelines are transform builders, creating a data flow graph 110 that is subsequently used by a data visualization virtual machine 114 to render a data visualization. This separates portions of the model used to generate the transforms from portions of the model needed by the transforms. For example, applying a filter on Sales affects the transformations that are built, while the specific range used by the filter is input data used to apply the transformations.

An important aspect of the data visualization data flow graphs 110 are the transform nodes 118 included in the graphs. Each transform node 118 specifies a set of inputs and an operator type. Examples of operator types include "map" (apply a function to every element of an array) and "sort" (use a function that knows how to sort an array and sort other arrays in the table the same way). Transform operators are described in more detail with respect to FIG. 8 below. For some operator types, a transform node creates a set of outputs.

In addition, some operators use a specified function. These functions are pure in the sense that their only inputs are explicitly passed in and their only outputs are explicitly returned. Some functions figure out where to place tick marks. Some functions apply an "arbitrary" rule for determining how to filter a data set. Some implementations define a specific functional language/syntax that may be used to write functions. Some implementations provide a built-in set of parameterized functions. Some virtual machines 114 are implemented to support all of the possible functions uses by transform nodes 118. In some implementations, a small runtime virtual machine 114 is created for a specific data visualization (e.g., for a remote client). In some implementations, the small runtime virtual machine includes interpreters just for the functions it needs to produce the specific data visualization.

After data is retrieved from a data source or computed by a transformation node, it is stored in a runtime data store 112. In some implementations, the data is stored like a dictionary in (key, value) pairs. The values can be atomic values (e.g., Boolean, integer, float, string, date, datetime, duration), tuples (an ordered set of elements, each having a specified data type), arrays (e.g., an ordered set of elements all having the same data type), a table (e.g., a collection of named column arrays, all having the same cardinality), or a nested dictionary. In some implementations, the keys are paths, where the pieces of the path providing navigation through nested tables and dictionaries. Some implementations support "special" data values, such as NULL, wildcard, many-values, or missing.

Combining transform nodes that know about their inputs and outputs with a data model that houses these inputs and outputs creates a data flow graph 110, which describes how data flows to create a data visualization. Having a data flow graph 110 enables the data visualization compiler 104 to reason globally about the data transformations and perform various optimizations. Some of the performance optimizations are described below.

FIG. 8 identifies some of the operators used by transform nodes in accordance with some implementations. The "fields" column in FIG. 8 refers to the information needed to define a transform node that uses the given operator. The letter i indicates that the transform node must specify the input (e.g., keys to look up data in the runtime data store 112). The letter o indicates that the transform node must specify a key for the output. The letter f indicates that a function must be specified to use by the operator. The letter c indicates that an additional constant must be specified to use as input. Note that keys may also be specified for use when initializing a function. For example, consider a function that maps each element in an array in order to convert to pixel space. Creating the function takes a one-time input to specify the range of pixels for scaling. The pixel range that is input comes from the data model, while the individual values in the array are passed one at a time to the resulting function.

The descriptions in FIG. 8 indicate succinctly how the operator is used. For example, the "reduce" operator takes an array of values as the input, a uses a specified function to output a single value. The "map" operator takes an array as input and produces a new array by performing the specified function on each element of the input array.

In some implementations, applying a node's operator is wrapped in a "try-catch" block. If an exception is thrown, every node that depends on its output is marked as invalid and skipped. This allows the maximum amount of a dashboard to remain valid in the face of errors. In some implementations, when a portion of a data visualization or dashboard is invalid due to an exception during processing, the application 222 grays out the relevant portion of the data visualization or dashboard.

Some implementations have a user interface that interacts with the data flow graph 112. The data flow graph 112 can be used to describe many UI interactions. For example, data flows into a bitmap (e.g., by rendering the computed marks in pixel coordinates) and back out (e.g., a mouse click can be the input to transformations that figure out what was clicked on, and the transformations turn the click into data that flows back in to the original data flow graph). In another example, data can flow into a UI widget (e.g., a quick filter) and back out (e.g., when the user clicks on an item in a quick filter, it changes the set of items that are filtered, which flows back into the original data flow graph).

In some implementations, the data visualization compiler 104 always generates data flow graphs 110 without feedback loops. However, some scenarios are naturally described with a feedback loop. For example, consider the layout of flow containers in a dashboard that contains multiple data visualization. The container's decision on how to layout its children impacts how the data visualizations are laid out, but the layout for each of the children can change the container's decision. Some implementations preclude such scenarios. Other implementations allow feedback loops, but during execution limit the number of feedback iterations.

By identifying the complete set of transforms in the data flow graph, there is ample opportunity for significant performance gains by manipulating the data flow graph 110. Some implementations cull redundant nodes. For example, consider a scenario where multiple producers (also known as builders) each create nodes that require computing MAX (Sales). Some implementations reduce these to a single transform without having to create a special caching scheme for different kinds of redundancy. Some implementations run nodes in parallel. Since the data flow graph 110 knows the inputs and outputs for each transform node, independent transforms can run in parallel. In some implementations, two transform nodes are identified as independent when neither one uses an input that derives from the output of the other. This is particularly effective on computing devices that have multiple CPUs/cores, where separate threads of the virtual machine can use distinct processors.

Some implementations combine operations. For example, if separate nodes are created to compute MAX(Sales), MIN(Sales), AVG(Sales) and STDEV(Sales), the optimizer 226 can combine these transforms into a single loop. In some implementations, the combination of these transforms becomes a single transform node that replaces the original nodes. In some instances, this results in a transform node with a more complex structure.

Some implementations identify sorting and filtering operations that are not required. For example, if a set of columns is only used for looking up values (e.g., they are on a level of detail shelf in order to appear in a tooltip), there is no need to filter or sort those columns.

If a user performs an action that changes the desired visualization before the previous data visualization has been fully computed, implementations abort the current set of transformations and start them over. Some user actions result in changes to the data flow graph 110. Implementations track which nodes are unaffected by the user action, and which of those have already been executed. Any transform node that has changed or was not computed previous will be computed. This incremental process more efficiently adapts better to interactive visual analysis. Some disclosed data visualization applications 222 implement incremental updates by maintaining a state flag for each node that indicates if it is "dirty." When an input changes, all of the nodes that need to recompute as marked as dirty. When a graph traversal is interrupted by user action, a new pass marks additional nodes as dirty. Nodes that were dirty last time and did not get computed remain dirty. If a user change creates any new transform nodes, the new nodes are initially marked as dirty because they have not been computed.

In some implementations, the database is queried by the data visualization compiler 104 for all the data needed in order to apply filters locally, even if this results in including more data. One advantage is that filter changes done using a quick filter or filter action, can be handled locally (without a trip to the data source 106).

In general this isn't always possible because the data set may be too big. The actual value of "too big" can vary depending on whether the client is using a desktop application 222, a server application, a mobile application, or a browser application 322.

However, some implementations have heuristics to determine when this is viable (e.g., number of records, the device type, which data visualization application is in use, the type of the data source, historical information about the data source, available memory on the computing device, a query log of previous queries, etc.). Some implementations allow the user to specify when it is okay ok to query for the entire domain based on the user's knowledge of the data source.

Because it is not always possible to query the entire data set (e.g., without filtering or aggregating at the data source), some implementations provide a transform that can query for data the client does not yet have. This enables remote clients to have local interactions (e.g., change the filter), but may require sending additional data (without any need to change the data flow graph).

Runtime Components

In some implementations, there are five or more high-level aspects for implementing a data visualization virtual machine. A first aspect is a visual transform language (VTL) that is used for defining the nodes in a data flow graph. A second aspect is the set of transform functions, which are used by the transform operators. A third aspect is the data visualization compiler 104. A fourth aspect are the visual transform producers 224, which generate portions of a data flow graph. In some implementations, the producers 224 are part of the data visualization compiler 104. A fifth aspect is the data visualization virtual machine 114. The virtual machine 114 handles interruptions (e.g., interruptions caused by a user changing the desired data visualization in some way), exceptions (e.g., unexpected errors in execution), feedback loops in the data flow graph (if allowed), and certain optimizations that are implemented at runtime rather than during generation of the data flow graph.

A Visual Transform Language (VTL) is used to describe the data transformations. Each transform node knows its inputs and outputs, and describes how to apply an operator (e.g. map, reduce, filter) to the input data using a specified transform function. In some implementations, VTL nodes (e.g., operators and transform functions) are stateless. Some implementations include a transform registry, which stores transform functions by name and optional type. The implementation of the VTL specifies how the transform nodes interact with the run time data store 112. The runtime data store 112 is where data is stored. This includes tables, arrays, dictionaries, tuples, and primitive data values.

Many of the operators used for transform nodes require a transform function. Transform functions are described in more detail below. Transform functions range from very simple (e.g., compute a maximum) to the complex (e.g., compute axis tick marks or layout a tree map). Some transform functions are "templatized" to work with multiple data types, but other transform functions require inputs with fixed data types.

A data visualization virtual machine 114 (VM) takes data from one or more data sources 106 and a set of transformation nodes 118 in a data flow graph 110, and produces transformed data as output. The final transformations render the desired data visualization. Typically, transform functions and operators are required to be pure. That is, they produce the same output given the same input and have no side effects. However, the transform functions for the "impure" operators can have side effects, such as rendering a data visualization or creating an output file.

Implementations provide a virtual machine for each supported platform. Note that the virtual machines are not necessarily functionally equivalent because each platform has its own performance characteristics. The native client for each virtual machine 114 runs multiple threads. In virtual machines that use JavaScript, the JavaScript client may be configured to operate in single threaded mode in order to support old browsers while remaining responsive during computation.

If the user performs an action before the data visualization has been fully computed, implementations abort the current set of transformations and start them over. This provides a user interface that doesn't block while generating a data visualization.

Some implementations allow limited feedback loops. That is, the data flow graph 110 has one or more loops. In some implementations where feedback loops are allowed, the virtual machine tracks the number of visits to each transform node and limits the number of visits to a small finite number (e.g., raising an exception is the limit is exceeded).

Some implementations address feedback loops by versioning of data store keys, which allows the graph traversal to remain agnostic about how many times a loop has been run.

The compile-time optimizers 226 can perform certain types of optimizations. Other optimizations are better handled by the virtual machine. In some implementations, the shape of the dependency graph is used to determine how to run nodes in parallel. Some nodes can run parallel loops when appropriate (e.g., the "map" operator, as described below). In some implementations, the virtual machine combines operations. For example, if there are nodes to compute MAX(Sales) and MIN(Sales), some implementations combine these transforms into a single scan of the underlying data values.

In some implementations, when data is added to a data source 106 (e.g., new rows are added to a source table), many operators can perform an incremental update rather than having to reprocess all the data that has already been processed. For example, suppose MIN(Sales) and Max (Sales) have already been computed for a data set with a million rows. When five new rows are added, some implementations just process the additional five rows rather than rescanning a million rows.

A data visualization compiler 104 takes VTL node descriptions, creates a VTL dependency data flow graph, runs the data flow graph through a series of optimizers, and resolves the functions (e.g., converts the generic "max" function into max<int>when the function will be applied to an array of integers).

The data visualization compiler 104 includes optimizers 226. In some implementations, the optimizers run only on certain platforms (e.g., running on desktop and server, but not on other clients, such as a browser). The optimizations include: taking a flat list of VTL nodes and turning them into a dependency graph; eliminating unused or redundant nodes; and avoid unnecessary sorting and filtering operations.

Producers reason about the semantic model (e.g., the visual specification, data fields, and so on) and turn the information into data nodes 116 and transform nodes 118 that can be evaluated by a virtual machine.

Runtime Data Store

A data flow graph 110 includes a set of transform nodes 118, which define data transformations. The nodes have no "state." Instead, they operate on the runtime data store 112, taking some data from the store 112 as input and creating output that is written to the store 112. In some implementations, the values in the store are immutable, but can have multiple versions. The store 112 can be serialized and shipped to remote clients or persisted for testing.

In some implementations, the primitive data types for the data store 112 include Boolean, integer (e.g., 64 bit and 32 bit), real (double and single precision), string (e.g., Unicode, including collation, fixed length or variable length), date (year, month, day), datetime (date+hour, minute, second). Some implementations also support defined enumerations.

Some implementations support multiple types of collections. In general, an ordered collection is referenced by an index and an unordered collection is referenced by a key. Each collection data type knows the data type(s) of its children. In some implementations, the collection data types include arrays (an ordered homogeneous collection), where each element has a primitive data type or one of the collection data types. In some implementations, arrays are limited to being one-dimensional. Some implementations allow one-dimensional and two- dimensional arrays.

In some implementations, the collection data types include "dictionaries," which are unordered heterogeneous collections. Some implementations support a "set" collection type, which is an unordered homogeneous collection. Some implementations support a "table" collection type, which is an unordered collection of arrays of the same size, column oriented. Some implementations support a "tuple" collection type, which is an ordered heterogeneous collection.

The collection data types can be nested, and thus very complex data types can be constructed.

Some implementations support various special values, such as Normal, Null, All, Wildcard, Skipped, NoAccess, Ragged, Error, ManyValues, and Missing. Some implementations support a limited subset of these special values, such as normal and null.

In some implementations, the transform nodes 118 specify their input(s) and output(s) using paths that include keys and subkeys in the run time store 112. In some implementations, the top level of the store 112 is a dictionary that houses any type of values, including other dictionaries.

In some implementations, the paths used for the run time data store 112 consist of a sequence of one or more keys. The keys in the sequence provide navigation through nested tables, tuples, dictionaries, and so on. A "/" (slash) is used to indicate navigation within nested values. For example, "data/filtered" first looks up the "data" key in the dictionary to find a second dictionary where it looks up the "filtered" key. An array index is considered to be a key. For example, the path "data/list/5" specifies the 5th element in the specified array.

Some implementations support versioning of data elements. In some of these implementation, a key can include a version number (e.g., added to it after a colon). This is useful when running a value through a series of transformations so unique names for keys are not required at each step. For example, "data/table:5" is the fifth version of "data/table."

Some implementations support partitioning a table into subtables. When a table is partitioned into multiple tables, each sub table can be referenced by indices enclosed in square brackets. For example, "data/table[0,1]" references a table in a two-dimensional array of tables.

Implementations where the run-time data store 112 is immutable support an important class of optimizations. In many cases, data can be referenced instead of copied. For example, consider a large table that is run through a series of transformations. These transformations may sort, filter or partition based on a single array in the table. However, the intermediate results may not need to be visualized. Rather than fully materializing each array in the table after each transformation, some implementations keep an extra array of indices that describes the ordering and presence of the rows. If the optimizer determines that materializing the current state of the arrays is useful (perhaps to do a series of map or reduce operations across them), it can do that.

Visual Transform Language

Some implementations use a Visual Transform Language (VTL), which is a functional language that describes the work necessary to transform raw data into a data visualization. The visual transform language uses a separate data model called the runtime data store 112 and has no state. Transform nodes using the visual transform language can be serialized and shipped to remote clients or persisted for testing. Each transform node 118 (also referred to as a "VTL node") can perform a single transformation and contains the following information: an operator type (e.g. map, reduce, or filter), inputs, outputs, and for some operators, a transform function for the operator to use. Most operators are "pure" in the sense that a given set of input always produces the same result. The "impure" operators are described below with respect to FIG. 9G.

To describe the visual transform language, the notation 902 shown in FIG. 9A is used herein. For each symbol or group of symbols in the first column of the notation table 902, the notation table 902 provides a description in the second column.

Operators modify the data store 112. In some implementations, all values in the data store 112 are immutable (i.e., once a value is written, it does not change). This makes it simpler to reason about the overall transform graph and easy to copy values that are referenced in the output without being modified.

Transform functions typically are not passed an entire table or any of the arrays, which enables the virtual machine 114 to choose not to materialize some values. For example, if one operator sorts a table and the next one filters it, the virtual machine 114 may create a list of row indices reflecting the sort and filter operations rather than actually having to produce fully sorted and filtered tables. Most transform functions take individual values, so the implementation details of the collections the operators work on don't matter. Some operators, such as setValue, can force an array or table to be materialized.

In some implementations, any operator that can take a transform function can also accept a transform generating function that takes additional input. In some instances, the additional input is used to initialize the transform function. In some instances, the additional input is a parameter that determines how the function executes. The transform generating functions are omitted from the tables in FIGS. 9B-9G and 10A-10T for brevity. These tables describe each of the operators, their inputs, their outputs, and transform functions. Typical implementations include other operators as well as those listed in these figures.

FIGS. 9B and 9C provide a summary 904 and 906 of operations that can act on an array, table, or set. The input/output for these operators can work in any of the following ways:
use an array as input and create a new array as output;
use an array within a table as input and create a copy of the table with the new array added as output;
use an array of tables as input and create an array of tables as output.

Some of these operators require additional input to specify how to traverse the data. Some of the operators can take a set as input and/or produce a set as output.

The table operator summary 908 in FIG. 9D identifies the operators that can use a table as input and create a table as the output. The array operator summary 910 in FIG. 9E identifies the operators that can use an array as input and create a value or set as the output. The miscellaneous operator summary 912 in FIG. 9F identifies other pure operators that do not fit into the categories of operators in FIGS. 9D and 9E.

The summary of "impure" operators 914 in FIG. 9G describes the input and output operators. All operators and transform functions, other than "input" and "output" are pure. That is, they always write identical output to the store 112 given identical inputs. They do not depend on external state and they do not modify anything. The input and output operators are used to interact with the outside world, querying databases, outputting to the screen, and so on. These features of the input and output operators imposes restrictions on how the virtual machine can evaluate the data flow graph 110.

FIGS. 10A-10T provide descriptions of the operators, including sample usage, sample input data, a transform declaration, and the resulting output data. In some implementations, there is a registry of named transform functions.

FIG. 10A-1 shows the usage 1002 for the "constant" operator. The constant operator creates a constant valued array from a single input. This operator uses an input array or table to determine the cardinality of the output array, and creates a new array populated with the constant value. An example 1004 of the "constant" operator is provided in FIG. 10A-2.

FIG. 10B-1 shows the usage 1006 for the "copy" operator. The copy operator makes a new copy of a value (or just adds a reference under a new name in a data store 112 whose values are immutable). The copy operator is similar to "setValue," but setValue forces the input to be materialized, whereas copy does not. An example 1008 of the "copy" operator is provided in FIG. 10B-2.

FIG. 10C-1 shows the usage 1010 for the "createDict" operator. The createDict operator takes an array of tuples and an index in those tuples and creates a dictionary using tuple[index] as the key. An example 1012 of the "createDict" operator is provided in FIG. 10C-2.

FIG. 10D-1 shows the usage 1014 for the "createTable" operator. The createTable operator takes one or more tables and one or more arrays and creates a new table consisting of the all the arrays. All of the arrays must have the same size. An example 1016 of the "createTable" operator is provided in FIG. 10D-2.

FIG. 10E-1 shows the usage 1020 for the "distinct" operator. The distinct operator takes an array as input and creates a new set consisting of the unique elements in the original array. An example 1022 of the "distinct" operator is provided in FIG. 10E-2.

FIG. 10E-1 shows the usage 1024 for the "filter" operator. One version of the filter operator takes an array or set as input and filters it down to the elements that pass the filter test. Another version of the filter operator takes an array in a table as input and filters the entire table down to the rows that pass the filter test for that array. The specified transform function determines if an element should be included in the filtered results. The filter operator can optionally take a transform function that takes additional input used to determine the actual filter function. A first example 1026 of the "filter" operator is provided in FIG. 10E-2, and a second example 1028 is provided in FIG. 10E-3.

FIG. 10G-1 shows the usage 1030 for the "index" operator. The index operator takes a table as input and creates a new table with an additional array containing the index of each row. The version of the index operator that takes an array of tables as input also uses a specified "strategy" that determines how to traverse the data. An example 1032 of the "index" operator is provided in FIG. 10G-2.

Figures 1, 10H:
Figures 2, 10H:

FIG. 10H-1 shows the usage 1034 for the "input" operator. The input operator is used to get input from an external resource. The input operator takes one or more values as function input and may add one or more values to the data store. The input operator may produce different results each time it's called, typically because it depends on an external resource such as a database or file, which is subject to change. An example 1036 of the "input" operator is provided in FIG. 10H-2.

FIG. 10I-1 shows the usage 1038 for the "map" operator. The map operator takes an array as input and applies a specified transform function to each element of the array to create a new array. The map operator can optionally take a transform function that takes additional input used to determine the actual map function (e.g., an additional input to initialize the map function). A first example 1040 of the "map" operator is provided in FIG. 10I-2, and a second example 1042 of the "map" operator is provided in FIG. 10I-3.

FIG. 10J-1 shows the usage 1044 for the "output" operator. The output operator sends output to an external resource, such as a file or display screen. The output operator takes one or more values as function input and performs an operation that is not put into the data store 112. An example 1046 of the "output" operator is provided in FIG. 10J-2.

FIG. 10K shows the usage 1048 for the "partition" operator. The partition operator takes an array in a table as input and partitions the table into multiple tables. The specified transform function determines which table each row should be placed into. The partition operator can optionally take a transform function that takes additional input used to determine the actual partition function. Typically, the partition operator only splits a table based on rows as described in FIG. 10K, so each row remains intact. Some implementations also enable partitioning based on columns.

FIG. 10L-1 shows the usage 1050 for the "reduce" operator. The reduce operator takes an array as input and applies a specified transform function to each element and previous result to create a single value. The reduce operator can also take a set as input and apply the specified commutative transform function to each element and previous result to create a single value. When the input is a set, the specified transform function should be commutative so that it does not depend on the order in which the elements are processed. A set has no specified order for its elements, so the output should be independent of the arbitrary order in which the elements are processed. The reduce operator can optionally take a transform function that takes additional input used to determine the actual map function. An example 1052 of the "reduce" operator is provided in FIG. 10L-2.

FIG. 10M-1 shows the usage 1054 for the "restrict" operator. The restrict operator takes a table and a list of names as input and creates a table that just consists of the named arrays. An example 1056 of the "restrict" operator is provided in FIG. 10M-2.

FIG. 10N-1 shows the usage 1058 for the "scan" operator. The scan operator takes an array as input and applies a specified transform function to each element and previous result to create a new array. The version of the scan operator that takes an array of tables as input also uses a "strategy" describing how to traverse the data. The scan operator can optionally take a transform function that takes additional input used to determine the actual map function. An example 1060 of the "scan" operator is provided in FIG. 10N-2.

FIG. 10O-1 shows the usage 1062 for the "setValue" operator. The setValue operator takes a single value as input and creates a single output. The setValue operator can optionally take a transform function that takes additional input used to determine the actual function. Note that when an array or table is specified as an input, the setValue operator forces the value to be materialized. In some instances, materializing values can be expensive. A first example 1064 of the "setValue" operator is provided in FIG. 10O-2, and a second example 1066 of the "setValue" operator is provided in FIG. 10O-3.

FIG. 10P-1 shows the usage 1068 for the "slice" operator. The slice operator takes an array in a table as input and filters the entire table down to the rows that pass the slice test for that array. The specified transform function determines if an element should be included in the filtered results based on the row index. The version of the slice operator that takes an array of tables as input also uses a "strategy" describing how to traverse the data. The slice operator can optionally take a transform function that takes additional input used to determine the actual slice function. An example 1070 of the "slice" operator is provided in FIG. 10P-2.

FIG. 10Q-1 shows the usage 1072 for the "sort" operator. In one version, the sort operator takes an array or set as input and sorts the elements into an array based on the specified transform function. In another version, the sort operator takes an array in a table as input and sorts the entire table based on the sort order of the given array. The specified transform function determines the ordering for each pair of element (i.e., given a pair of elements, which of the two elements should come first). The version of the sort operator that takes an array of tables as input also uses a specified strategy that describes how to traverse the data. The sort operator can optionally take a transform function that takes additional input used to determine the actual sort function. An example 1074 of the "sort" operator is provided in FIG. 10Q-2.

FIG. 10R-1 shows the usage 1076 for the "transforms" operator. The transforms operator applies a series of transforms. The transforms operator takes a set of values as input and produces a set of outputs. The parent inputs are mapped to child inputs coming in and child outputs are mapped to parent outputs going back out. The child transforms may create intermediate values that are not used as output from the set of transforms, which allows the virtual machine to perform various optimizations. An example 1078 of the "transforms" operator is provided in FIG. 10R-2. In this example, the series of transforms includes index, filter, map, and sort.

FIG. 10S-1 shows the usage 1080 for the "zip" operator. The zip operator takes two arrays as input and outputs a new array, where each element in the new array is a tuple consisting of the corresponding elements from each array. An example 1082 of the "zip" operator is provided in FIG. 10S-2.

FIG. 10T-1 shows the usage 1084 for the "zipWith" operator. The zipWith operator takes two arrays as input and outputs a new array, where each element of the new array is the result of applying a transform function to the corresponding elements from each array. An example 1086 of the "zipWith" operator is provided in FIG. 10T-2.

One of skill in the art recognizes that various sets of operators may be used, with varying sets of parameters. The exemplary set of operators listed here is not intended to be complete or exclusive, and implementations use various names to specify the functionality described here.

VTL Producers

A producer 224 has two pieces that can run independently as information is available. The first piece is to create transforms. The input to creating the transforms are various models, including the visual specification 228 and metadata from the selected data sources 106. The output of a producer 224 is a set of VTL nodes that describe the data transformations needed. A second piece is to build the runtime data store 112. The input to this piece includes both models (e.g., the style sheet) the data (e.g., query results from the data sources). While running this second piece, the producers add data to the data store 112, which will later serve as input to the transformations.

Note that some model changes may only an update to the input data, not an update to the set of transforms. For example, a dashboard's style sheet has no impact on which transforms are run, but may affect the data used by the transforms.

Some implementations follow this basic flow for building a data visualization, starting from the description in the user interface:

A user creates or edits a data visualization description, typically using a user interface 102. When the user commits the changes, messages are sent out to the appropriate producers 224.
- In response to specific model-changed messages, the appropriate producers are run;
- if needed, new transform nodes are created;
- if needed, new data is retrieved and added to the data store;
- If transforms have changed, the data visualization compiler 104 is run to create a new transform graph 110;
- The minimal set of affected nodes is (re)computed; new nodes are automatically marked as dirty;
- input data is examined to see what has changed, with corresponding nodes and dependent nodes marked as dirty; and
- The appropriate subset of the graph is evaluated to create a new data store, reusing the previous data store as needed (e.g., using references to existing data when possible)

For remote clients, the data flow graph 110 and data store 112 are sent in the presentation model. The client has knowledge about which commands require a round trip to the server versus just updating the data store and rerunning the transforms.

In some implementations, the granularity of information known about changes is described by an EditMessage enumeration. FIGS. 11A and 11B provide a table 1100 that illustrates what happens based on receiving various messages, including: whether to recreate nodes (1104), whether to recreate data (1106), and whether to rerun the transforms (1108). In general, the actions taken depend on the type 1102 of the received message. As asterisk in a box indicates that the action is taken.

In some implementations, when a user changes something in the user interface, the producers have enough information to know when to recreate the transforms and when to regenerate new input data.

In some implementations, there are scenarios where there is not enough information. For example, the visual specification 228 includes filters. If a user changes just the domain of a filter, only the input data needs to change, whereas adding a filter requires a change to the data and the set of transforms. Some implementations have similar issues with Datasource and ZoneCollection.

Some implementations address this issue by detecting when a new transform look exactly like an old transform. This enables the virtual machine 114 to reuse the results of the previous computations. For example, if only a trend line in a data visualization is modified, some implementations are able to avoid recomputing other aspects of the data visualization, such as table calculations.

Note that sometimes the nodes that need to be rerun has a scope that is greater than expected. For example, a layout container in a dashboard lays out its contents based on details about that content. Thus a change to a visualization in a layout container can impact how the dashboard lays out other content in the same container and hence the size of other visualizations can change as well.

In some implementations, the producers include a data interpreter, a partition interpreter, an analytic interpreter, a visual interpreter, a brush interpreter, a visualization support layout module, a dashboard layout module, and a rendering module.

Some implementations are able to replace just a portion of the overall transforms or data store. For example, a set of transforms and data get created for a dashboard. Later, a single data visualization inside the dashboard changes. Implementations replace just the portion of the transforms and data that is affected by the change. Implementations also figure out what portion of the input data has changed so that a minimal number of transforms are rerun. Some implementation use immutability of the data store to simplify this process.

Producers output a list of nodes that describe transforms to perform. These transforms may get rearranged or manipulated during subsequent compilation (e.g., the transforms in the graphs may run in parallel, or unused nodes may be culled), but the nodes themselves are not changed. By retaining the original list, some implementations can swap in the new transforms and rerun the compiler to create a new data flow graph.

Producers output data used as input to the transforms. In some implementations, this only creates new data, and does not modify existing data. Combining this with nodes that know their inputs and outputs, implementations are able to reuse the results of previous transforms while just rerunning the portion of the graph affected by the new inputs.

Runtime Optimizations

The disclosed runtime environments enable a wide variety of optimizations.

One optimization involves parallel execution across nodes. This can be implemented when two nodes are independent. That is, neither node depends on the output of the other node. For example, as illustrated in FIG. 12A, when there is a first node that computes SUM(Sales) and a second node that computes Sum(Profit), and the two sums run over the same set of records, they can run in parallel. When producers create nodes with fine grained information about their inputs and outputs, it is easy for the virtual machines 114 to parallelize the operations.

Another optimization is parallel execution within nodes. The semantics of some operators allow the virtual machine to do portions of the work in parallel. For example, with the map operator, the transform function can be applied to elements in any order. The work can be parallelized according to the processor bandwidth. In order for this to work, transform functions can't involve a state and cannot reference global variables. Some implementations annotate transform functions to enable more parallelism within a node. For example, if a function passed to a "reduce" operator is commutative, it does not have to be applied sequentially.

Another optimization is to make decisions up front. The more decisions that are made during the compilation and optimization phases, the faster the evaluation phase will be. Evaluation may involve tight loops, so faster execution occurs when decisions are made outside of the loop. In addition, incremental updates benefit from having made decisions earlier. To make early decisions, implementations typically resolve data types before evaluation. For example, when there is an array of integers, implementations can specialize the transform function to work with integers. In some implementations, producers resolve as much as possible based on the information at hand rather than leaving decisions to the transforms.

Some optimizations involve leveraging the CPU cache. When an operator is applied to an array, some implementations get a substantial speedup by leveraging how CPUs cache memory. Processing is faster if everything in the array is contiguous and as small as possible. Therefore, some implementations use arrays where all of the elements have the same data type rather than tracking the data type of each data element separately. Pulling the type outside of the array results in less memory use and faster access.

Some implementations optimize processing by not materializing intermediate tables. For example, when applying a series of filter and sort operators to a table, there is generally no reason to fully filter and sort every array in the table at every step of the way. Some implementations instead modify an array of row indices associated with the table. If data later becomes useful (e.g., to leverage the CPU cache) or necessary (e.g., because an operator needs to examine an array or table), the table can be materialized. This is illustrated in FIG. 12B, when intermediate states do not need to be materialized.

In some implementations, operators are designed so that they hide how arrays and tables are stored. The details of iteration are left up to the Runtime as much as possible.

Some implementations limit the use of operators such as setValue. Because setValue can accept an arbitrary input, the Runtime can't reason about whether or not it would be best to materialize the input (and therefore must materialize it).

Some implementations balance the decision to materialize with leveraging the CPU cache, where having elements in an array in a contiguous block speeds up processing when there is a series of operations on the same array.

Some implementations optimize processing by compressing data. In some cases, compressing data means less data that needs to be swapped in and out of memory. For example, when the Runtime determines an array will be referenced multiple times and has low cardinality, some implementations compress the data, which has benefits similar to leveraging the CPU cache. In some instances, this optimization includes hiding iteration across arrays from transform functions.

Some implementations optimize processing by reusing a previous data store. The set of nodes creates a dependency graph (the data flow graph 110). Each node outputs new data, and does not modifying existing data. The result is a record of all the intermediate values from the previous computation. If a new action changes input data but not the graph, some implementations just rerun the nodes affected by the new data, reusing all the intermediate results from the previous computation.

Another scenario involving reuse is when computation of the graph was interrupted part way through because the user initiated a new action before the previous one was complete. Implementations reuse the appropriate previous results while evaluating the nodes that were skipped. Note that some sub-graphs have to be considered atomic. For example, when the user interface updates state such as filters and selection.

Reuse is balanced against overall memory usage. In some implementations, the balancing process does the following:
- do not materialize intermediate values;
- detect intermediate values that won't be useful for incremental updates and deletes them; and
- when the memory is constrained, remove all intermediate values that aren't needed for later computations.

Some implementations optimize processing by leveraging immutability when copying. Because the values in the data store don't change, some copy operations can be very cheap. For example, when a new table is created by adding a new array to an existing table, the existing data is not copied. The new table just references the old arrays. An example is illustrated in FIG. 12C, where a Sales table is modified by adding a new column.

Some implementations optimize processing by combining operations. For example, when doing a series of reduce operators on the same array, some implementations combine these operators into a single execution loop rather than executing multiple loops. Some implementations similarly combine operations when running an array through a series of map operations. As example of operations that can be combined is provided in FIG. 12D. Another way to combine operations is to turn a generalized operator into a hand-optimized function. For example, a tight loop that adds numbers is faster than having a reduce operator use the add transform function. Some implementations can also take advantage of vectorized add operations when available on the device hanrdware..

Some implementations optimize processing by culling redundant or unneeded nodes. Different producers may require the same transforms, such as computing MAX (Sales). Some implementations detect such redundant nodes and eliminate them. In some instances, a producer adds a node in expectation that a later step will need it, but the expectation is wrong. When unneeded nodes are detected, they can be eliminated.

Some implementations optimize processing using lazy evaluation. Based on the required outputs, it is possible to avoid evaluating some nodes when their results aren't needed yet. In some cases this occurs because nodes are created to support a UI feature that hasn't been triggered.

Some implementations perform partial evaluation of some nodes after determining that the entire results aren't needed yet. For example, there may be views that are expensive to compute even though most of the results are scrolled off the screen and hence aren't needed yet. Some implementations work backwards through the nodes and figure out that a set of transforms is required only on the first 50 rows rather than all 10,000,000. The remainder can either be computed as needed or progressively computed in the background during idle.

Some implementations optimize processing using distributed computation. Because the data flow graph 110 specifies the work to be done and the dependencies, distributing the work across multiple machines (or multiple processors on one machine) can improve performance when there are extensive calculations. In each case, the virtual machine 114 decides when the benefit of doing transforms on multiple processors is worth the cost of transporting the data across machines. Distributing the processing can be particularly effective for a dashboard that has some fairly natural boundaries (e.g., the individual data visualizations), where the computations are fairly isolated, and the amount of data to transport is reasonably constrained (e.g., the intermediate results do not all have to be transported).

FIGS. 13A-13M-3 provide an example of a data visualization 120 created in accordance with some implementations. This example data visualization 120 includes a title 1302 and a legend 1304, which shows how different companies are displayed in different colors based on their rates of growth. The data visualization 120 also includes an x-axis 1308 and a y-axis 1306. These axes are calibrated based on the displayed data. The data visualization 120 also includes a quick filter 1310, which allows a user to interactively choose which types of companies are displayed. Here, all of the types except "Database" are selected for inclusion. In some of the figures below, the abbreviation "qf" is used to refer to the quick filter.

Figure 13A:
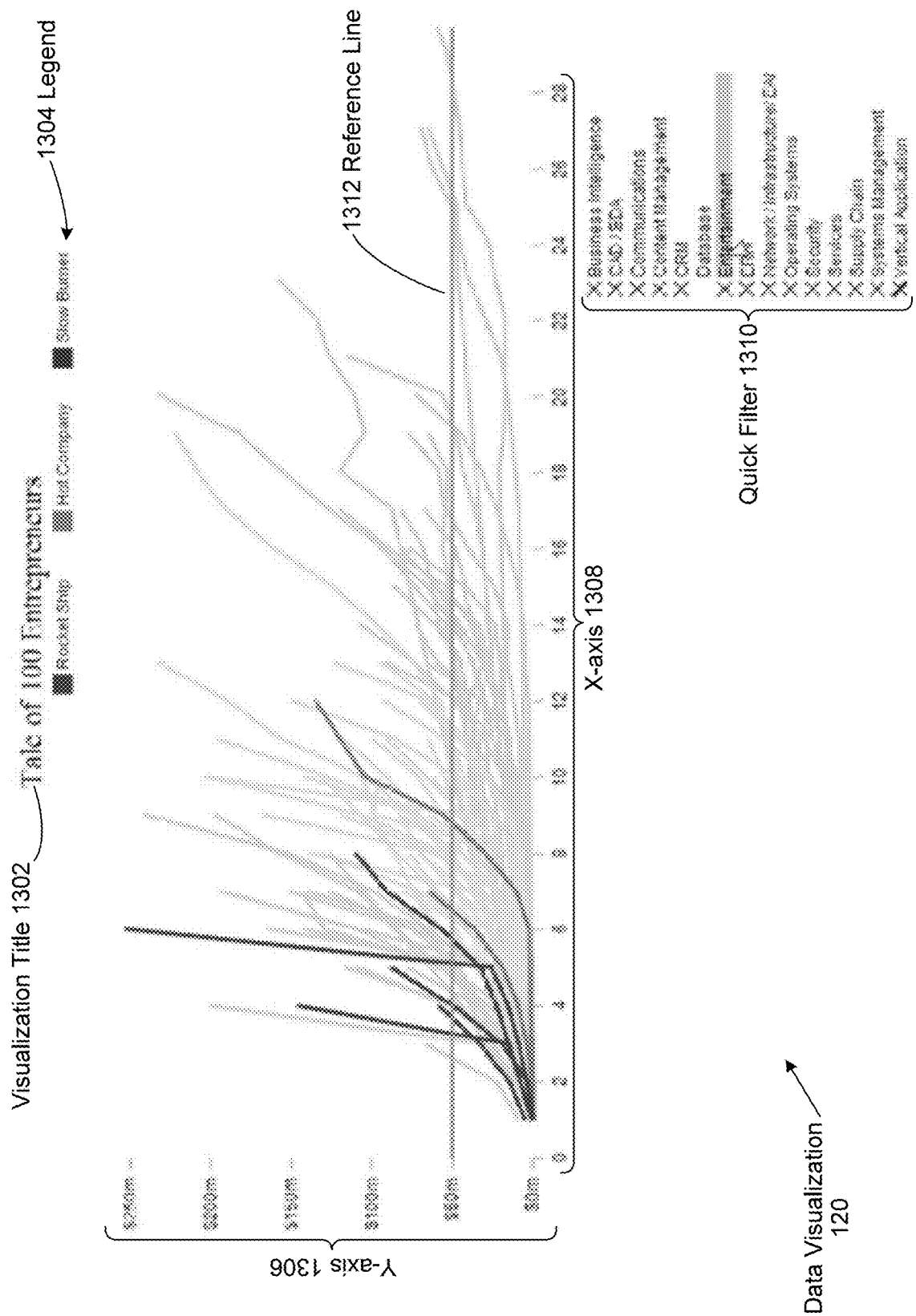
Figure 13B:
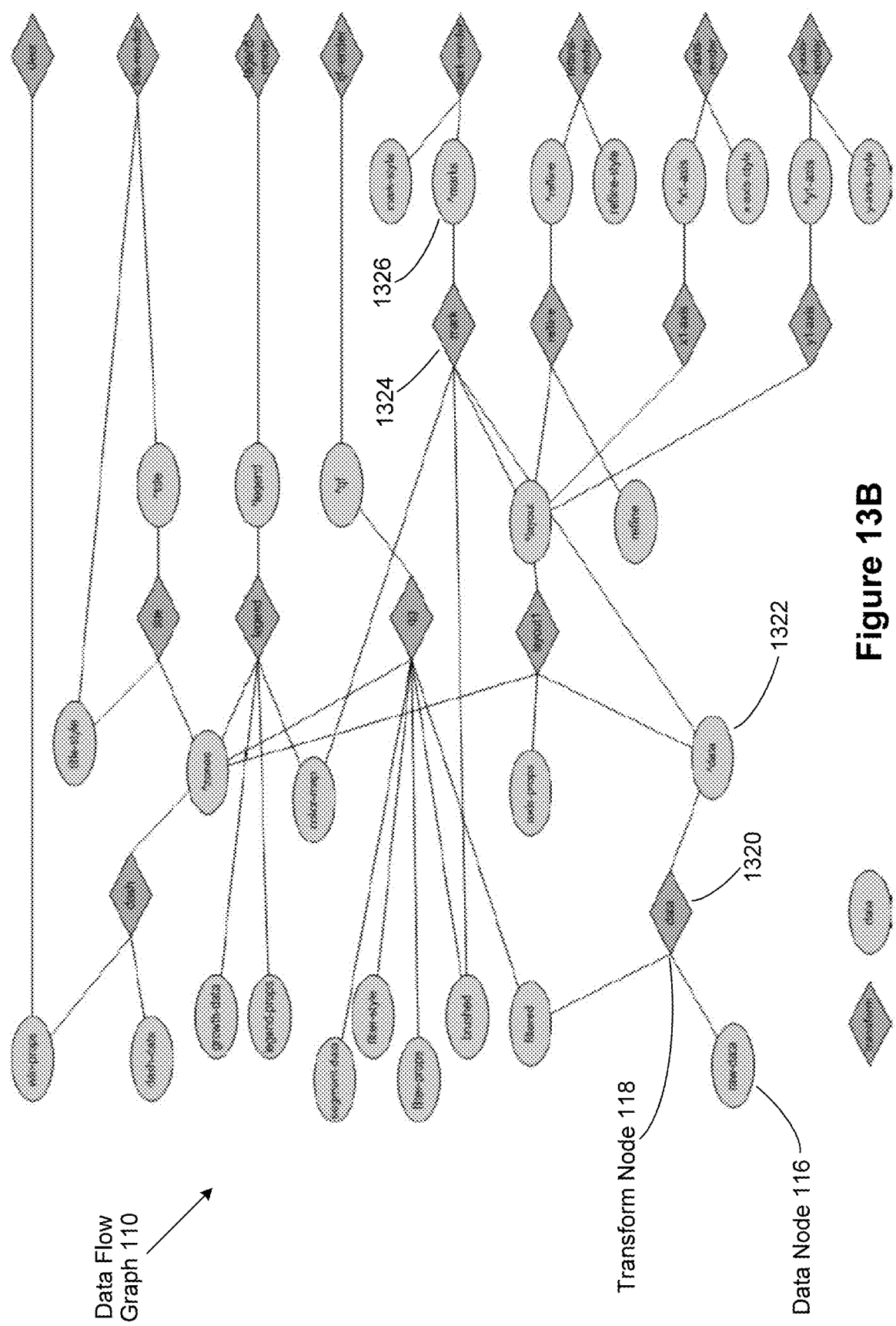

FIG. 13B provides an overall data flow graph 110, which includes both data nodes 116 and transform nodes 118. In this illustration, data nodes 116 are drawn as ovals and transform nodes 118 are drawn as diamonds. In some implementations, the data flow graph 110 is created by a set of producers 224. In some implementations, each producer 224 is responsible for a different aspect (or aspects) of the data visualization. In some implementations, there are producers 224 for each of: Data, Zones, Visualization Title, Visualization Layout, Marks, Reference Line (sometimes abbreviated "refine"), X-axis, Y-axis, Legend, Quick Filter, and Rendering.

Figures 1, 2, 13C:
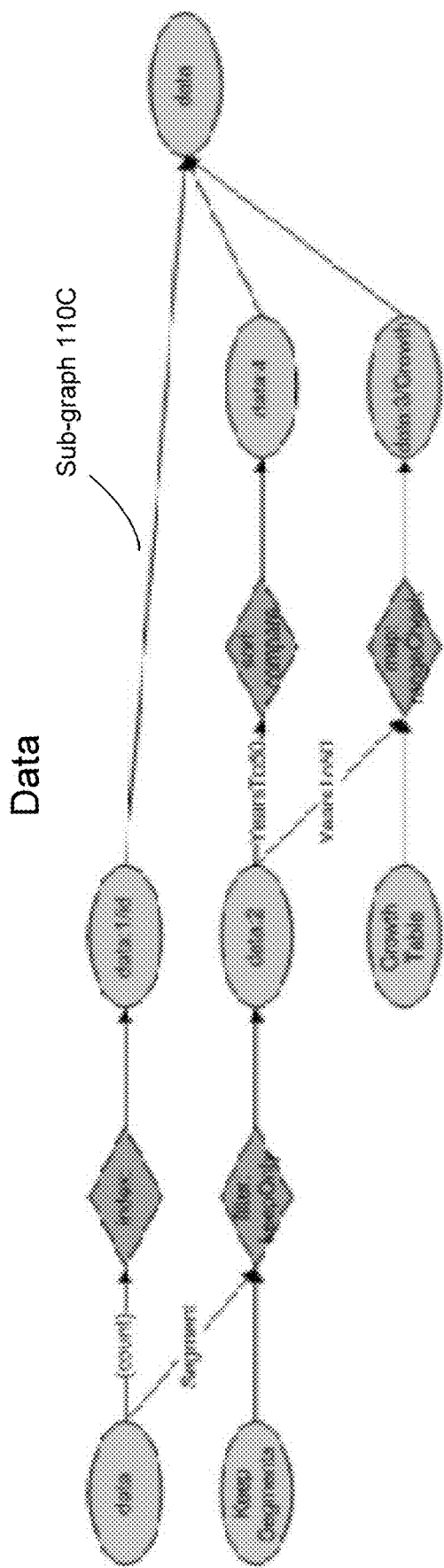

FIGS. 13C-1-13C-5 illustrate information for the data visualization 120 created by a "data" producer. In this case, there is a sub-graph 110C, as illustrated in FIG. 13C-1. In some implementations, the sub-graph 110C shown in FIG. 13C-1 corresponds to the nodes 1320 and 1322 shown in FIG. 13B. FIGS. 13C-2, 13C-4, 13C-3, and 13C-5 illustrate the input data, output data, transforms, and transform functions used within this sub-graph.

FIGS. 13D-1-13D-4 illustrate the processing for creating zones within a data visualization. In some implementations, a Zones producer 224 builds the relevant nodes for the data flow graph 110.

FIGS. 13E-1-13E-4 illustrate the processing for creating a visualization title for the sample data visualization. Even for this simple element, the process must know where to place the title (which can depend on other data visualization elements), the text for the title, as well as the font characteristics.

FIGS. 13F-1-13F-4 illustrate the processing for creating the overall layout of the data visualization 120. In some implementations, a Visual Layout producer 224 builds the relevant nodes for the data flow graph 110.

Figures 1, 13G:
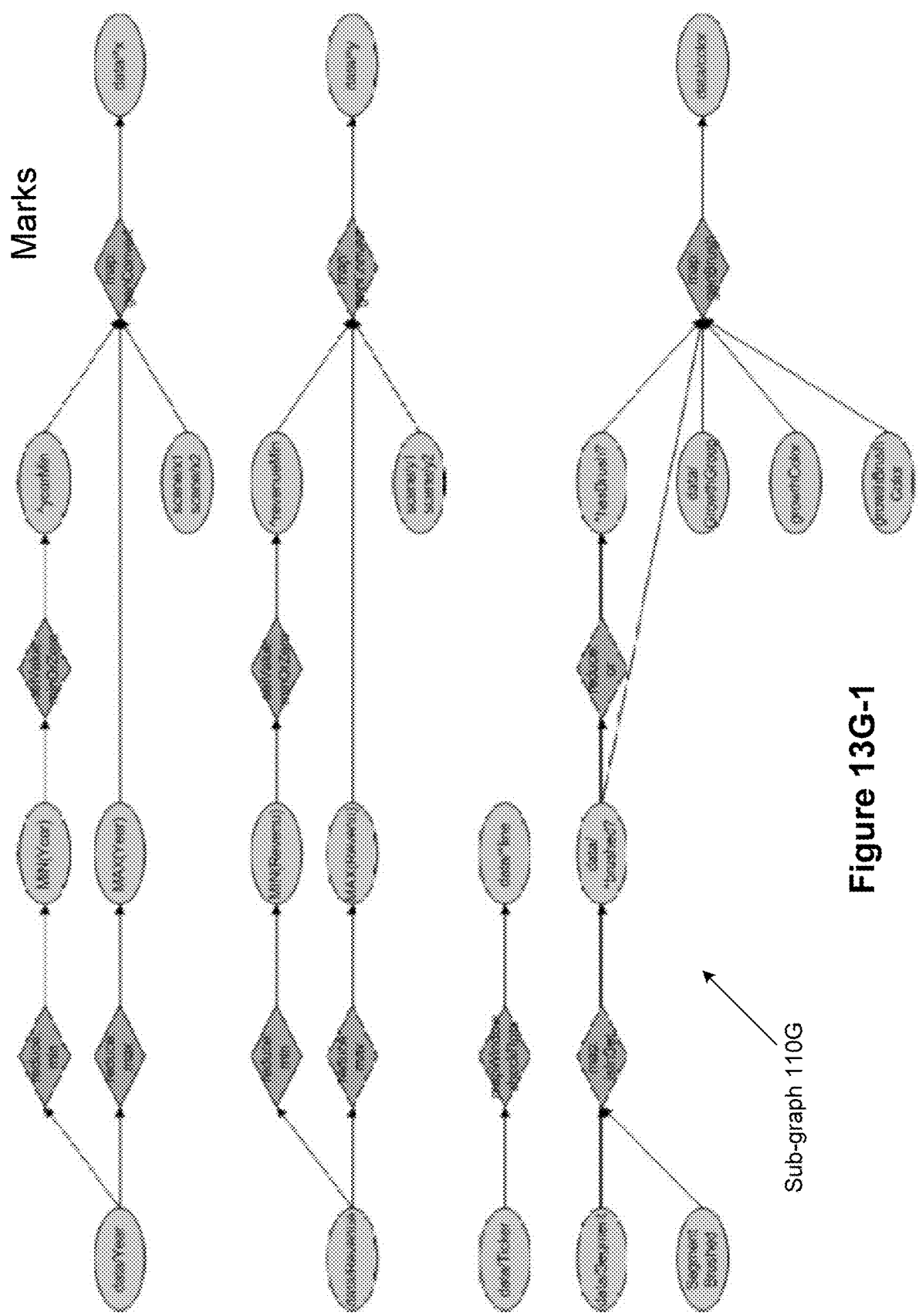

FIGS. 13G-1-13G-5 illustrate the processing to create the visual marks for the data visualization. FIG. 13G-1 illustrates a sub-graph 110G created by a Marks producer 224. In some implementations, the sub-graph 110G shown in FIG. 13G-1 corresponds to the nodes 1324 and 1326 shown in FIG. 13B. FIGS. 13G-2, 13G-3, 13G-4, and 13G-5 illustrate the input data, output data, transforms, and transform functions used within this sub-graph.

FIGS. 13H-1-13H-4 illustrate the processing for creating the reference line 1312 in FIG. 13A. In some implementations, a Reference Line producer 224 (or analytic element producer) builds the relevant nodes for the data flow graph 110.

FIGS. 13I-1-13I-4 illustrate the processing for creating the X-axis 1308 in FIG. 13A. In some implementations, an X-axis producer 224 builds the relevant nodes for the data flow graph 110.

FIGS. 13J-1-13J-4 illustrate the processing for creating the Y-axis 1306 in FIG. 13A. In some implementations, a Y-axis producer 224 builds the relevant nodes for the data flow graph 110.

FIGS. 13K-1-13K-4 illustrate the processing for creating the Legend 1304 in FIG. 13A. In some implementations, a Legend producer 224 builds the relevant nodes for the data flow graph 110.

FIGS. 13L-1-13L-4 illustrate the processing for creating the Quick Filter 1310 in FIG. 13A. In some implementations, a Quick Filter producer 224 builds the relevant nodes for the data flow graph 110.

FIGS. 13M-1-13M-3 illustrate the processing for the rendering of the data visualization 120. As shown in FIG. 13M-3, the rendering process does not create data output like the other types of transformations. Instead, the functions render the data visualization 120. In some implementations, a Rendering producer 224 builds the relevant nodes for the data flow graph 110.

Some implementations of a data visualization application support two or more distinct modes of operation. Some implementations include an authoring mode in which a user builds or modifies a data visualization using an interface such as the user interface 102 illustrated above in FIG. 4. Commonly the user interface 102 includes a schema region and shelves or other controls to define the data visualization. Authoring changes the model used to create the transform nodes in the data flow graph. In some implementations, when a user is using a lightweight browser-based data visualization application, the majority of the work to build and update the data flow graph is done at the server. That is, most updates in authoring mode require a roundtrip to the server. In some implementations, the data visualization application resides on the user's client device, and the data flow graph is built and modified on that client device.

Some implementations support a second mode of operation that is referred to as "interactor mode." In interactor mode, the user just changes the input data, which does not fundamentally alter the data flow graph. Interactor mode includes various user interface selections, such as quick filters. In some implementations, a quick filter can specify a data field and enable a user to quickly select values for that data field. For example, a quick filter may be set up for "region," and a user can tag which regions to include in the data visualization. In interactor mode, some implementations support "legends," which enable users to select which items are highlighted. Like quick filters, choosing which data marks to highlight can be done without fundamentally altering the data flow graph. In interactor mode, some implementations enable a user to select marks in a displayed dashboard, which may be used to filter or highlight related marks in other data visualizations on the dashboard.

Quick filters and highlighting are just two examples of data that a user can change in interactor mode. More generally, a user can change any type of input data that can reuse the existing set of transforms in the data flow graph.

In some implementations, the input data can include user selection of data marks, and the user interface provides selection feedback (e.g., by drawing an outline around the selected marks and fading out the other marks). The updated data visualization with selection feedback reuses the same transforms in the data flow graph, and only requires an incremental traversal.

In some implementations, the input data can include font, color, lineweight, and other characteristics for the axes, marks, annotations, and other objects in the data visualization. Changes to these styling characteristics can be applied to a data visualization using the existing transforms in the data flow graph, applying an incremental traversal of the affected nodes.

In some implementations, the input data can include size and position of data visualization objects (or entire data visualizations), and re-traversal of the data flow graph can layout the objects in a dashboard accordingly.

In some implementations, the input data can include the cursor position, and some transforms use the cursor position to display details corresponding to data marks or other objects at the cursor position (e.g., in a tooltip). The cursor position can also be used to identify displayed buttons that allow you do perform operations (e.g., a button to keep-only/exclude the selected marks). Note that such buttons are part of the data visualization displayed by traversing the data flow graph.

In some implementations, an incremental traversal of the data flow graph to build a new data visualization generates an animated transition between the old version of the data visualization and the new version.

These are some examples of incremental updates that can alter the display of a data visualization without rebuilding the data flow graph. By performing an incremental re-traversal of the data flow graph, implementations are able to execute the updates rapidly.

In some implementations, a browser client usually operates as an interactor, so most of what a user can do in the visualization is done without a roundtrip to the server.

In some implementations, traversal of the data flow graph can be distributed across multiple computers. For example, in some implementations the data visualization virtual machine moves parts of the graph traversal to other machines. In some instances, some of the transform node work is performed at a server (e.g., computation intensive tasks). Some implementations leverage the R programming language for some analytical features, and the virtual machine running on a client device sends a request to the server to construct the analytic features. The server runs the computations and sends back the results. In some implementations, a transform node encapsulates the information needed to offload certain computations to a known server. In some implementations, distributing the traversal across multiple computers can be performed at runtime based on available resources. However, the data visualization compiler 104 typically determines at compile time which portions of the data flow graph can be traversed independently.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of using a virtual machine for interactive visual analysis, comprising:
at a computer having one or more processors and memory storing one or more programs configured for execution by the one or more processors:
   generating a data visualization by executing a data visualization data flow graph comprising a directed graph having a plurality of nodes, wherein each of the plurality of nodes specifies either a data retrieval operation or a data transformation operation and the data visualization comprises visual marks having a first set of characteristics, including a first mark type and one or more first visual mark encodings;
   receiving user input to specify a second mark type and/or one or more second visual mark encodings; and
   in response to receiving the user input:
      updating a portion, less than all, of the data visualization data flow graph according to the second mark type and/or the one or more second visual mark encodings; and
      generating an updated data visualization by executing updated nodes of the data visualization data flow graph without executing nodes not updated according to the user input.

2. The method of claim 1, wherein:
each node that specifies a transformation operation includes:
   a respective set of one or more inputs for retrieval, each input corresponding to a respective node that specifies a data retrieval operation; and
   a respective transformation operator to be performed on the respective set of one or more inputs.

3. The method of claim 1, wherein executing the data visualization data flow graph comprises:
traversing the data visualization data flow graph according to directions of arcs between nodes in the data visualization data flow graph, thereby retrieving data corresponding to each node that specifies data retrieval and executing the respective transformation operator specified for each of the nodes that specifies a data transformation operation.

4. The method of claim 3, wherein executing the updated nodes of the data visualization data flow graph comprises:
traversing the updated data visualization data flow graph according to directions of arcs between nodes in the updated data visualization data flow graph, thereby retrieving data corresponding to each new or modified node that specifies data retrieval and executing the respective transformation operator specified for each new or modified node that specifies a transformation operation, without re-executing unchanged nodes.

5. The method of claim 1, wherein the updated data visualization is generated according to a plurality of nodes that specify graphical rendering of data visualization elements.

6. The method of claim 1, wherein executing the data visualization data flow graph further comprises:
retrieving data from the one or more specified databases according to nodes that specify data retrieval; and
storing the retrieved data in a runtime data store distinct from the data visualization data flow graph.

7. The method of claim 1, further comprising:
displaying a graphical user interface on a computer display, wherein the graphical user interface includes a schema information region and a data visualization region, the schema information region includes multiple field names, each field name is associated with a data field from a selected database, the data visualization region includes a plurality of shelf regions that determine the characteristics of the data visualization, and each shelf region is configured to receive user placement of one or more of the field names from the schema information region; and the data visualization data flow graph is generated according to user selection of one or more of the field names and user placement of each user-selected field name in a respective shelf region in the data visualization region.

8. The method of claim 7, further comprising:
displaying the data visualization in the data visualization region of the graphical user interface.

9. The method of claim 1, wherein the mark type is selected from the group consisting of bar, line, dot, text, and geographic regions.

10. The method of claim 1, wherein the one or more encodings are selected from the group consisting of mark size, mark color, and mark label.

11. A system for running a virtual machine for interactive visual analysis, comprising:
one or more processors;
memory; and
one or more programs stored in the memory and configured for execution by the one or more processors, the one or more programs comprising instructions for:
generating a data visualization by executing a data visualization data flow graph comprising a directed graph having a plurality of nodes, wherein each of the plurality of nodes specifies either a data retrieval operation or a data transformation operation and the data visualization comprises visual marks having a first set of characteristics, including a first mark type and one or more first visual mark encodings;
receiving user input to specify a second mark type and/or one or more second visual mark encodings; and
in response to receiving the user input:
updating a portion, less than all, of the data visualization data flow graph according to the second mark type and/or the one or more second visual mark encodings; and
generating an updated data visualization by executing updated nodes of the data visualization data flow graph without executing nodes not updated according to the user input.

12. The system of claim 11, wherein:
each node that specifies a transformation operation includes:
a respective set of one or more inputs for retrieval, each input corresponding to a respective node that specifies a data retrieval operation; and
a respective transformation operator to be performed on the respective set of one or more inputs.

13. The system of claim 11, wherein executing the data visualization data flow graph comprises:
traversing the data visualization data flow graph according to directions of arcs between nodes in the data visualization data flow graph, thereby retrieving data corresponding to each node that specifies data retrieval and executing the respective transformation operator specified for each of the nodes that specifies a data transformation operation.

14. The system of claim 13, wherein executing the updated nodes of the data visualization data flow graph comprises:

traversing the updated data visualization data flow graph according to directions of arcs between nodes in the updated data visualization data flow graph, thereby retrieving data corresponding to each new or modified node that specifies data retrieval and executing the respective transformation operator specified for each new or modified node that specifies a transformation operation, without re-executing unchanged nodes.

15. The system of claim 11, wherein the updated data visualization is generated according to a plurality of nodes that specify graphical rendering of data visualization elements.

16. The system of claim 11, wherein executing the data visualization data flow graph further comprises:
retrieving data from the one or more specified databases according to nodes that specify data retrieval; and
storing the retrieved data in a runtime data store distinct from the data visualization data flow graph.

17. The system of claim 11, further comprising:
displaying a graphical user interface on a computer display, wherein the graphical user interface includes a schema information region and a data visualization region, the schema information region includes multiple field names, each field name is associated with a data field from a selected database, the data visualization region includes a plurality of shelf regions that determine the characteristics of the data visualization, and each shelf region is configured to receive user placement of one or more of the field names from the schema information region; and the data visualization data flow graph is generated according to user selection of one or more of the field names and user placement of each user-selected field name in a respective shelf region in the data visualization region.

18. The system of claim 11, wherein the mark type is selected from the group consisting of bar, line, dot, text, and geographic regions.

19. The system of claim 11, wherein the one or more encodings are selected from the group consisting of mark size, mark color, and mark label.

20. A non-transitory computer readable storage medium storing one or more programs configured for execution by a computer system having one or more processors and memory, the one or more programs comprising instructions for:
generating a data visualization by executing a data visualization data flow graph comprising a directed graph having a plurality of nodes, wherein each of the plurality of nodes specifies either a data retrieval operation or a data transformation operation and the data visualization comprises visual marks having a first set of characteristics, including a first mark type and one or more first visual mark encodings;
receiving user input to specify a second mark type and/or one or more second visual mark encodings; and
in response to receiving the user input:
updating a portion, less than all, of the data visualization data flow graph according to the second mark type and/or the one or more second visual mark encodings; and
generating an updated data visualization by executing updated nodes of the data visualization data flow graph without executing nodes not updated according to the user input.

* * * * *